United States Patent
Kneißl et al.

(10) Patent No.: US 12,294,422 B2
(45) Date of Patent: May 6, 2025

(54) EFFICIENT COMMUNICATION TO CONFIGURE SENSOR NODES

(71) Applicant: Fraunhofer-Gesellschaft zur Förderung der angewandten Forschung e.V., Munich (DE)

(72) Inventors: Jakob Kneißl, Erlangen (DE); Gerd Kilian, Erlangen (DE); Robert Koch, Erlangen (DE); Karol Bieg, Erlangen (DE); Dominik Soller, Erlangen (DE); Josef Bernhard, Erlangen (DE); Markus Siebenhaar, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 532 days.

(21) Appl. No.: 17/518,133

(22) Filed: Nov. 3, 2021

(65) Prior Publication Data
US 2022/0060218 A1     Feb. 24, 2022

Related U.S. Application Data

(63) Continuation of application No. PCT/EP2020/062653, filed on May 7, 2020.

(30) Foreign Application Priority Data

May 10, 2019   (DE) ..................... 10 2019 206 836.7

(51) Int. Cl.
*H02J 7/00*      (2006.01)
*H04B 5/00*      (2024.01)
(Continued)

(52) U.S. Cl.
CPC ................. *H04B 5/72* (2024.01); *H04B 5/00* (2013.01); *H04L 27/10* (2013.01)

(58) Field of Classification Search
None
See application file for complete search history.

(56) References Cited

U.S. PATENT DOCUMENTS

| | | |
|---|---|---|
| 2,381,097 A | 8/1945 | Adams |
| 3,098,220 A | 7/1963 | De Graaf |

(Continued)

FOREIGN PATENT DOCUMENTS

| | | |
|---|---|---|
| CH | 365640 A | 11/1962 |
| CN | 1967940 A | 5/2007 |

(Continued)

OTHER PUBLICATIONS

Final Office Action dated Jan. 3, 2024, issued in U.S. Appl. No. 17/454,321 (copy not provided).

(Continued)

*Primary Examiner* — Tuan A Tran
(74) *Attorney, Agent, or Firm* — McClure, Qualey & Rodack, LLP

(57) ABSTRACT

The method includes a step of generating a magnetic signal with an electromagnetic functional unit, wherein the electromagnetic functional unit is an actuator of a loudspeaker of the device or wherein the electromagnetic functional unit is an electromagnetic resonant circuit connected to the device, wherein the magnetic signal carries the data to be transferred from the device to the other device: Furthermore, the method includes a step of detecting the magnetic signal with an electromagnetic resonant circuit of the other device in order to obtain the data to be transferred from the device to the other device, wherein the magnetic signal is FSK-modulated, wherein a resonance frequency of the electromagnetic (Continued)

resonant circuit of the other device and a carrier frequency of the FSK-modulated magnetic signal are tuned with respect to each other.

8 Claims, 21 Drawing Sheets

(51) Int. Cl.
  *H04B 5/72* (2024.01)
  *H04L 27/10* (2006.01)

(56) References Cited

U.S. PATENT DOCUMENTS

| | | |
|---|---|---|
| 3,764,746 A | 10/1973 | Libby |
| 4,415,769 A | 11/1983 | Gray |
| 5,684,837 A | 11/1997 | Chen |
| 5,887,176 A | 3/1999 | Griffith et al. |
| 6,593,845 B1 | 7/2003 | Friedman et al. |
| 6,870,475 B2 | 3/2005 | Fitch et al. |
| 7,254,366 B2 | 8/2007 | Palermo |
| 7,307,521 B2 | 12/2007 | Funk et al. |
| 7,574,173 B2 | 8/2009 | Terranova et al. |
| 7,750,435 B2 | 7/2010 | Rofougaran |
| 7,808,389 B2 | 10/2010 | Finkenzeller |
| 7,831,205 B2 | 11/2010 | Jack et al. |
| 7,903,041 B2 | 3/2011 | LeVan |
| 7,975,907 B2* | 7/2011 | Yoshida ............ H04B 5/28 |
| | | 235/375 |
| 8,174,360 B2 | 5/2012 | Finkenzeller |
| 8,188,854 B2 | 5/2012 | Yamashita |
| 8,190,086 B2 | 5/2012 | Sasaki et al. |
| 8,240,562 B2 | 8/2012 | Washiro |
| 8,254,990 B2 | 8/2012 | Hawker et al. |
| 8,413,895 B2 | 4/2013 | Ota et al. |
| 8,437,695 B2 | 5/2013 | Chatterjee et al. |
| 8,532,570 B2 | 9/2013 | Fukami et al. |
| 8,538,332 B2 | 9/2013 | Huomo et al. |
| 8,611,817 B2 | 12/2013 | Kalanithi et al. |
| 8,643,473 B2 | 2/2014 | Suzuki |
| 8,675,908 B2 | 3/2014 | Pierce et al. |
| 8,711,656 B1 | 4/2014 | Paulson |
| 8,744,520 B2 | 6/2014 | Maeda |
| 8,774,291 B2* | 7/2014 | Ghovanloo ......... A61N 1/3727 |
| | | 375/259 |
| 8,872,385 B2* | 10/2014 | Kinoshita ............ H02J 50/80 |
| | | 307/104 |
| 8,872,386 B2* | 10/2014 | Mach ................ H02J 50/80 |
| | | 307/104 |
| 8,909,162 B2 | 12/2014 | Ilkov et al. |
| 8,915,428 B1 | 12/2014 | Post |
| 8,941,353 B2* | 1/2015 | Di Guardo ............ H04L 5/14 |
| | | 320/108 |
| 8,942,624 B2* | 1/2015 | Singh ............... H02J 50/20 |
| | | 307/104 |
| 9,001,881 B2 | 4/2015 | Okamura et al. |
| 9,022,285 B2 | 5/2015 | Graylin |
| 9,048,884 B2 | 6/2015 | LeVan |
| 9,065,488 B2 | 6/2015 | Kim et al. |
| 9,071,289 B2 | 6/2015 | McFarthing |
| 9,099,886 B2* | 8/2015 | DiGuardo ............ H02J 50/12 |
| 9,126,514 B2* | 9/2015 | Soar .................. H02J 50/10 |
| 9,142,997 B2 | 9/2015 | Kim et al. |
| 9,160,417 B2 | 10/2015 | Kim et al. |
| 9,166,439 B2 | 10/2015 | Low et al. |
| 9,167,377 B2 | 10/2015 | Clarke |
| 9,240,827 B2 | 1/2016 | Brockenbrough et al. |
| 9,287,735 B2 | 3/2016 | Ryu et al. |
| 9,306,626 B2 | 4/2016 | Hall et al. |
| 9,379,784 B2 | 6/2016 | Dhayni |
| 9,401,768 B2 | 7/2016 | Inha |
| 9,413,432 B2 | 8/2016 | Huh et al. |
| 9,455,771 B2 | 9/2016 | Dobyns |
| 9,608,327 B1 | 3/2017 | Tai et al. |
| 9,673,866 B2 | 6/2017 | Ikeda |
| 9,716,967 B2 | 7/2017 | Takeuchi |
| 9,787,364 B2 | 10/2017 | Moore et al. |
| 9,793,961 B2 | 10/2017 | Charrat |
| 9,812,254 B2 | 11/2017 | Wakabayashi |
| 9,831,924 B2 | 11/2017 | Lin |
| 9,846,796 B2 | 12/2017 | Rezayee |
| 9,859,950 B2 | 1/2018 | Shao et al. |
| 9,872,089 B2* | 1/2018 | Ha .................... H04B 5/79 |
| 9,872,109 B2 | 1/2018 | Miller |
| 9,893,570 B2* | 2/2018 | Beyer ............... H04L 25/4902 |
| 9,893,716 B2* | 2/2018 | Chakraborty ......... H03J 1/0008 |
| 9,894,468 B2 | 2/2018 | Brown et al. |
| 9,912,174 B2 | 3/2018 | Soar |
| 9,965,411 B2 | 5/2018 | Hall |
| 9,973,039 B2* | 5/2018 | Morreale ............ H02J 50/402 |
| 10,009,069 B2 | 6/2018 | Kerselaers et al. |
| 10,014,721 B2* | 7/2018 | Singh ............... H02J 50/10 |
| 10,038,476 B2 | 7/2018 | Kim et al. |
| 10,039,084 B2 | 7/2018 | Bernhard et al. |
| 10,050,677 B1 | 8/2018 | Thoen |
| 10,074,837 B2 | 9/2018 | Miller et al. |
| 10,075,018 B2* | 9/2018 | Park .................. H02J 50/402 |
| 10,097,978 B2 | 10/2018 | Hoffmann |
| 10,177,900 B2 | 1/2019 | Michel et al. |
| 10,263,470 B2 | 4/2019 | Joye et al. |
| 10,270,168 B2 | 4/2019 | Kanno |
| 10,332,676 B2 | 6/2019 | Teggatz et al. |
| 10,355,525 B2* | 7/2019 | Singh .................. H04B 5/26 |
| 10,360,485 B2 | 7/2019 | Liu et al. |
| 10,367,265 B2 | 7/2019 | Richardson et al. |
| 10,430,701 B2 | 10/2019 | Lee et al. |
| 10,439,449 B2 | 10/2019 | Alonso et al. |
| 10,461,812 B2 | 10/2019 | Zhou et al. |
| 10,476,553 B2 | 11/2019 | Qiu et al. |
| 10,511,349 B2 | 12/2019 | Kahlman |
| 10,574,297 B2 | 2/2020 | Moore et al. |
| 10,593,470 B1 | 3/2020 | Lekas et al. |
| 10,615,648 B2* | 4/2020 | Malkin ............... H04B 5/79 |
| 10,630,073 B2 | 4/2020 | Taya |
| 10,666,325 B2 | 5/2020 | Zhou et al. |
| 10,702,644 B2* | 7/2020 | Stark ................. H01Q 1/36 |
| 10,715,935 B2 | 7/2020 | Andersen |
| 10,720,964 B2 | 7/2020 | Woerlee et al. |
| 10,811,913 B2 | 10/2020 | Qiu et al. |
| 11,050,299 B2 | 6/2021 | Kanto |
| 11,757,490 B2 | 9/2023 | Kilian |
| 2005/0237160 A1 | 10/2005 | Nolan et al. |
| 2007/0060221 A1 | 3/2007 | Burgan et al. |
| 2008/0173717 A1 | 7/2008 | Antebi et al. |
| 2009/0060243 A1 | 3/2009 | Michaelis |
| 2009/0219137 A1 | 9/2009 | Forster |
| 2010/0081379 A1 | 4/2010 | Cooper |
| 2011/0031928 A1 | 2/2011 | Soar |
| 2011/0050164 A1 | 3/2011 | Partovi et al. |
| 2011/0140852 A1 | 6/2011 | Wuidart |
| 2011/0300801 A1 | 12/2011 | Kerselaers |
| 2011/0309687 A1 | 12/2011 | Bohori et al. |
| 2012/0001593 A1* | 1/2012 | Di Guardo ............ H04L 5/14 |
| | | 320/108 |
| 2012/0007442 A1 | 1/2012 | Rhodes et al. |
| 2013/0094680 A1 | 4/2013 | Allen et al. |
| 2013/0127259 A1 | 5/2013 | Lohr et al. |
| 2013/0143486 A1 | 6/2013 | Zhu et al. |
| 2013/0147279 A1* | 6/2013 | Muratov ............ H02J 7/00036 |
| | | 307/104 |
| 2013/0147281 A1 | 6/2013 | Kamata |
| 2013/0217334 A1 | 8/2013 | Yu et al. |
| 2013/0281016 A1 | 10/2013 | McFarthing |
| 2013/0295845 A1 | 11/2013 | Maenpaa |
| 2014/0080412 A1 | 3/2014 | Kang et al. |
| 2014/0343703 A1 | 11/2014 | Topchy et al. |
| 2014/0369170 A1 | 12/2014 | Inha et al. |
| 2015/0035374 A1 | 2/2015 | Park et al. |
| 2015/0041534 A1 | 2/2015 | Rayner et al. |
| 2015/0115735 A1 | 4/2015 | Singh et al. |
| 2015/0155918 A1 | 6/2015 | Van Wageningen |
| 2015/0349896 A1 | 12/2015 | Post et al. |
| 2016/0049800 A1 | 2/2016 | Tanaka |

(56) References Cited

U.S. PATENT DOCUMENTS

| | | | |
|---|---|---|---|
| 2016/0057542 | A1 | 2/2016 | Pasek |
| 2016/0067396 | A1* | 3/2016 | Stark ................. H04B 5/79 |
| 2016/0124573 | A1 | 5/2016 | Rouaissia |
| 2016/0156387 | A1 | 6/2016 | Ota |
| 2016/0276877 | A1 | 9/2016 | Weale |
| 2017/0041715 | A1 | 2/2017 | Jumani et al. |
| 2017/0070080 | A1 | 3/2017 | Kang et al. |
| 2017/0117879 | A1 | 4/2017 | Chakraborty et al. |
| 2017/0118714 | A1 | 4/2017 | Kaechi |
| 2017/0141604 | A1 | 5/2017 | Park |
| 2017/0187245 | A1 | 6/2017 | Uchida |
| 2017/0188129 | A1 | 6/2017 | Sindia |
| 2017/0213831 | A1 | 7/2017 | Nakai |
| 2017/0239560 | A1 | 8/2017 | Muratov et al. |
| 2017/0256989 | A1 | 9/2017 | Yoshii |
| 2017/0289671 | A1 | 10/2017 | Patel et al. |
| 2017/0352951 | A1 | 12/2017 | Lee |
| 2018/0083670 | A1 | 3/2018 | Nakano et al. |
| 2018/0108994 | A1 | 4/2018 | Lee |
| 2018/0132019 | A1 | 5/2018 | Riedel |
| 2018/0143223 | A1 | 5/2018 | Taya |
| 2018/0181952 | A1 | 6/2018 | Enriquez et al. |
| 2018/0187447 | A1 | 7/2018 | Gharabegian |
| 2018/0324915 | A1 | 11/2018 | Luccato |
| 2018/0364310 | A1 | 12/2018 | Taya |
| 2019/0036347 | A1 | 1/2019 | Arasaki |
| 2019/0208336 | A1 | 7/2019 | Andersen |
| 2020/0019955 | A1 | 1/2020 | Lee et al. |
| 2020/0076474 | A1 | 3/2020 | Daga et al. |
| 2020/0143611 | A1 | 5/2020 | Shin et al. |
| 2020/0169299 | A1 | 5/2020 | Latham et al. |
| 2020/0274404 | A1 | 8/2020 | Sankar |
| 2021/0152216 | A1 | 5/2021 | Kilian et al. |
| 2021/0175929 | A1 | 6/2021 | Kilian et al. |
| 2021/0360339 | A1 | 11/2021 | Schlicht et al. |
| 2022/0060218 | A1 | 2/2022 | Kneißl |

FOREIGN PATENT DOCUMENTS

| | | |
|---|---|---|
| CN | 101900613 B | 7/2012 |
| CN | 102957454 B | 3/2013 |
| CN | 203014937 U | 6/2013 |
| CN | 103187984 B | 7/2013 |
| CN | 103187993 B | 7/2013 |
| CN | 103187998 B | 7/2013 |
| CN | 103187999 A | 7/2013 |
| CN | 103825661 A | 5/2014 |
| CN | 104158305 B | 11/2014 |
| CN | 105591675 A | 5/2016 |
| CN | 106019955 A | 10/2016 |
| CN | 106233802 A | 12/2016 |
| CN | 106452510 A | 2/2017 |
| CN | 206302413 U | 7/2017 |
| CN | 107102724 A | 8/2017 |
| CN | 107154682 A | 9/2017 |
| CN | 107437961 A | 12/2017 |
| CN | 107852548 A | 3/2018 |
| CN | 107852548 B | 3/2018 |
| CN | 108259069 A | 7/2018 |
| CN | 109586768 A | 4/2019 |
| CN | 111092636 A | 5/2020 |
| DE | 10 2011 082 098 B4 | 4/2014 |
| DE | 10 2013 227 141 A1 | 6/2015 |
| DE | 20 2017 102047 U1 | 7/2017 |
| DE | 10 2018 212 957 B3 | 1/2020 |
| DE | 10 2018 214 716 A1 | 3/2020 |
| DE | 10 2019 201 152 B3 | 6/2020 |
| DE | 10 2019 206 848 B3 | 8/2020 |
| EP | 1 250 026 A1 | 10/2002 |
| EP | 1 654 813 A1 | 5/2006 |
| EP | 1 688 016 A1 | 8/2006 |
| EP | 1 869 842 A1 | 12/2007 |
| EP | 1 981 176 A1 | 10/2008 |
| EP | 2 023 661 A1 | 2/2009 |
| EP | 2 119 029 A1 | 11/2009 |
| EP | 2 159 929 A2 | 3/2010 |
| EP | 2 211 579 A1 | 7/2010 |
| EP | 2 338 238 A1 | 6/2011 |
| EP | 2 347 522 A1 | 7/2011 |
| EP | 2 367 294 A1 | 9/2011 |
| EP | 2 579 554 A1 | 4/2013 |
| EP | 2 625 653 A2 | 8/2013 |
| EP | 2 688 078 A1 | 1/2014 |
| EP | 2 740 223 A1 | 6/2014 |
| EP | 2 773 087 A1 | 9/2014 |
| EP | 2 777 128 A2 | 9/2014 |
| EP | 3 022 823 A1 | 5/2016 |
| EP | 3 161 933 A1 | 5/2017 |
| EP | 3 168 953 A1 | 5/2017 |
| EP | 3 312 808 A1 | 4/2018 |
| EP | 3 427 391 A1 | 1/2019 |
| EP | 3 480 918 A1 | 5/2019 |
| GB | 2 441 051 A | 2/2008 |
| GB | 2 444 799 A | 6/2008 |
| JP | H06-104957 A | 4/1994 |
| JP | 2003-152606 A | 5/2003 |
| JP | 2006-121339 A | 5/2006 |
| JP | 2007-006123 A | 1/2007 |
| JP | 2010-284066 A | 12/2010 |
| JP | 5034850 B2 | 9/2012 |
| JP | 5431033 B2 | 3/2014 |
| JP | 5456625 B2 | 4/2014 |
| JP | 2016-192761 A | 11/2016 |
| JP | 6139732 B2 | 5/2017 |
| KR | 2005-0033764 A | 4/2005 |
| KR | 2015-0114063 A | 10/2015 |
| KR | 2016-0040484 A | 4/2016 |
| KR | 2016-0102786 A | 8/2016 |
| KR | 2016-0122615 A | 10/2016 |
| KR | 10-1763030 B1 | 7/2017 |
| KR | 10-1797563 B | 11/2017 |
| KR | 10-1870877 B1 | 6/2018 |
| RU | 2 566 792 C1 | 10/2015 |
| TW | 201328226 A | 7/2013 |
| WO | 2005/015766 A1 | 2/2005 |
| WO | 2005/055654 A1 | 6/2005 |
| WO | 2006/109032 A1 | 10/2006 |
| WO | 2007/135434 A1 | 11/2007 |
| WO | 2008/071924 A2 | 6/2008 |
| WO | 2008/071925 A1 | 6/2008 |
| WO | 2010/025157 A1 | 3/2010 |
| WO | 2010/029446 A1 | 3/2010 |
| WO | 2012/038664 A1 | 3/2012 |
| WO | 2013/022207 A1 | 2/2013 |
| WO | 2013/069472 A2 | 5/2013 |
| WO | 2014/205201 A1 | 12/2014 |
| WO | 2015/031016 A1 | 3/2015 |
| WO | 2015/096930 A1 | 7/2015 |
| WO | 2015/101120 A1 | 7/2015 |
| WO | 2015/197443 A1 | 12/2015 |
| WO | 2016/037045 A1 | 3/2016 |
| WO | 2016/076498 A1 | 5/2016 |
| WO | 2016/076736 A1 | 5/2016 |
| WO | 2016/153589 A2 | 9/2016 |
| WO | 2016/154762 A1 | 10/2016 |
| WO | 2016/202284 A1 | 12/2016 |
| WO | 2017/036864 A1 | 3/2017 |
| WO | 2017/138789 A1 | 8/2017 |
| WO | 2017/144387 A1 | 8/2017 |
| WO | 2017/153164 A1 | 9/2017 |
| WO | 2019/172610 A1 | 9/2019 |
| WO | 2020/004940 A1 | 1/2020 |
| WO | 2020/229309 A3 | 1/2021 |

OTHER PUBLICATIONS

Chinese language office action dated Sep. 27, 2023, issued in application No. CN 202080011903.3.
English language translation of office action dated Sep. 27, 2023 (pp. 8-13 of attachment).
German language office action dated Mar. 21, 2023, issued in application No. EP 19 746 069.4.

(56) References Cited

OTHER PUBLICATIONS

International Search Report and International Preliminary Examination Report issued in application No. PCT/EP2021/067848.
Wikipedia entry "Lautsprecher" https://de.wikipedia.org/wiki/Lautsprecher.
Wikipedia entry "Lautsprecher"—English language translation (pp. 1-29 of attachment).
"Haus und Wohnung: Telefon-Mithörverstärker;" Spocks Elektronik-Labor : Haus und Wohnung: Telefon-Mithörverstärker; http://www.trigonal.de/sel/huw_09.htm; pp. 1-2.
Verman, S., et al.; "AudioDAQ: Turning the Mobile Phone's Ubiquitous Headset Port into a Universal Data Acquisition Interface;" Embedded Network Sensor Systems; ACM; Nov. 2012; pp. 1-14.
Date unknown Wikipedia entry "Optimalfilter;" https://de.wikipedia.org/wiki/Optimalfilter.
Wikipedia entry "Optimalfilter;" English language translation (pp. 1-9 of attachment).
"Der Parallelschwingkreis;" https://elektroniktutor.de/analogtechnik/par_swkr.html; pp. 1.
"File: (G)MSK-Spektrum;" https://en.wikipedia.org/wiki/Minimum-shift_keying#/media/File:GMSK_PSD.png, zuletzt geöffnet; Apr. 2019; pp. 1-3.
Wikipedia entry "Pulsdauermodulation;" https://de.wikipedia.org/wiki/Pulsdauermodulation.
Wikipedia entry "Pulsdauermodulation;" English language translation (pp. 1-11 of attachment).
Wikipedia entry "UART-Kommunikation;" https://de.wikipedia.org/wiki/Universal_Asynchronous_Receiver_Transmitter.
Wikipedia entry "UART-Kommunikation;" English language translation (pp. 1-12 of attachment).
"Short Range Devices; Low Throughput Networks (LTN); Protocols for radio interface A;" ETSI TS 103 357 V1.1.1; Jun. 2018; pp. 1-113.
"N-Channel Silicon Junction Field Effect Transistor for Impedance Converter of ECM;" Data Sheet; Junction Filed Effect Transistor 2SK3230; 2002; pp. 1-8.
Date unknown Wikipedia Entry "Kapazitätsdiode;" https://de.wikipedia.org/wiki/Kapazit%C3%A4tsdiode.
Wikipedia Entry "Kapazitätsdiode;" English language translation (pp. 1-5 of attachment).
Salzburger, L.; "Mythen der Elektronikenwicklung;" https://fahrplan.events.ccc.de/camp/2015/Fahrplan/system/attachments/2671/original/Mythen_der_Elektronikentwicklung_v2.pdf; pp. 1-117.
Kollman, R., et al.; "Fallstricke beim Einsatz von MLCCs;" https://www.analog-praxis.de/fallstricke-beim-einsatz-von-mlccs-a-535573/; Aug. 2015; pp. 1-5.
Digi-Key Electronics; "Protecting Inputs in Digital Electronics;" Eingangsschutzdiode Mikrocontroller; https://www.digikey.com/en/articles/techzone/2012/apr/protecting-inputs-in-digital-electronics; Apr. 2012; pp. 1-9.
"RFID Transponder Inductors;" Premo; pp. 30-61.
Microchip Technology, Inc; "microIDTM 125 kHz RFID System Design Guide;" Dec. 1998; pp. 1-161.
Wikipedia Entry "Spule (Elektrotechnik);" https://de.wikipedia.org/w/index.php?title=Spule_(Elektrotechnik)&oldid=200834434; Jun. 2020.
Wikipedia Entry "Spule (Elektrotechnik);" English language translation (pp. 1-7 of attachment).
Wikipedia Entry "SMD-Ferrit;" https://de.wikipedia.org/w/index.php?title=Ferrit&oldid=157277430; Aug. 2016; pp. 1.
International Search Report dated Dec. 21, 2021, issued in application No. PCT/EP2021/067848.
LAN/MAN Standards Committee; "IEEE Standard for Low-Rate Wireless Networks; Amendment 2: Low Power Wide Area Network (LPWAN) Extension to the Low-Energy Critical Infrastructure Monitoring (LECIM) Physical Layer (PHY);" 2020; pp. 1-46.
Notice of Allowance dated May 13, 2024, issued in U.S. Appl. No. 17/388,889 (copy not provided).
Written Opinion dated Jun. 15, 2022, issued in application No. PCT/EP2021/067848.
Non-Final Office Action dated Jul. 3, 2023, issued in U.S. Appl. No. 17/181,492 (copy not provided).
Non-Final Office Action dated Jul. 13, 2023, issued in U.S. Appl. No. 17/454,321 (copy not provided).
Non-Final Office Action dated Jul. 15, 2024, issued in U.S. Appl. No. 17/181,492 (copy not provided).
Non-Final Office Action dated Jul. 16, 2024 issued in U.S. Appl. No. 17/454,321 (copy not provided).
Final Office Action dated Dec. 30, 2024, issued in U.S. Appl. No. 17/454,321.
Final Office Action dated Feb. 18, 2025 issued in application No. U.S. Appl. No. 17/181,492.

* cited by examiner

300

↓

Tuning the electromagnetic resonant circuit
by switching at least one pin of the microcontroller,
with which the at least one tuning element is connected,
to one of several different operating modes. — 302

Charging the two capacitors connected in series prior to
generating a magnetic signal with the electromagnetic
resonant circuit by:

switching the third pin, for a defined charging time TL,
to an output mode in which a supply potential
is provided at the respective pin, and
switching the third pin, after the defined charging time TL,
to a high-impedance input mode. — 312

Switching the second pin of the microcontroller to a pull-up
input mode only in active phases of a wake-up mode
which checks whether a magnetic signal with
a wake-up sequence is received. — 322

↓

Fig. 20

EFFICIENT COMMUNICATION TO CONFIGURE SENSOR NODES

CROSS-REFERENCES TO RELATED APPLICATIONS

This application is a continuation of copending International Application No. PCT/EP2020/062653, filed May 7, 2020, which is incorporated herein by reference in its entirety, and additionally claims priority from German Application No. DE 10 2019 206 836.7, filed May 10, 2019, which is incorporated herein by reference in its entirety.

BACKGROUND OF THE INVENTION

Embodiments of the present invention concern a method for transmitting data between a device and another device. Some embodiments concern a device, another device, and a system having a device and another device. Some embodiments concern efficient communication to configure sensor nodes.

Conventionally, user-configurable devices, such as IoT nodes (e.g. sensor nodes) or wireless LAN cameras, are configured via a wired connection. However, this involves several electrical contacts at the device to be configured and at the user terminal device, e.g. a mobile telephone, used for the configuration of the device.

Alternatively, user-configurable devices may be configured via a radio connection. However, this involves dedicated transmission/reception components.

In addition, user-configurable devices may also be configured via an optical connection. However, this involves a line-of-sight connection and dedicated optical components.

Furthermore, user-configurable devices may be configured via an acoustic connection, e.g. as is common with smoke detectors. However, the use of an acoustic connection involves a microphone in the device.

In addition, use-configurable devices may be configured by means of magnetic coupling. Usually, NFC (NFC=Near-Field Communication) is used for this purpose, however, which involves additional NFC components in the device. This is further complicated by the fact that not all user terminal devices support NFC. For example, currently available iPhones® only support reading via NFC, but not writing.

In addition, the exploitation of the magnetic effect of loudspeakers is known. U.S. Pat. No. 2,381,097 A describes a so-called telephone monitoring amplifier which exploits the magnetic effect of loudspeakers. Here, the magnetic field of a loudspeaker is received, amplified and re-converted into an acoustic signal by a further loudspeaker.

U.S. Pat. No. 4,415,769 A describes an apparatus that enables to transmit and to receive signals via a telephone line by electromagnetic coupling to at least one inductive element of the telephone set.

U.S. Pat. No. 3,764,746 A describes a data coupler for coupling a data terminal to a telephone network without a direct conducting connection. Here, data signals are electromagnetically coupled from an induction coil into a loudspeaker of a telephone handset.

SUMMARY

According to an embodiment, a method for transferring data from a device to another device may have the steps of: generating a magnetic signal with an electromagnetic functional unit, wherein the electromagnetic functional unit is an actuator of a loudspeaker of the device or wherein the electromagnetic functional unit is an electromagnetic resonant circuit connected to the device, wherein the magnetic signal carries the data to be transferred from the device to the other device, detecting the magnetic signal with an electromagnetic resonant circuit of the other device in order to acquire the data to be transferred from the device to the other device, wherein the magnetic signal is FSK-modulated, wherein a resonance frequency of the electromagnetic resonant circuit of the other device and a carrier frequency of the FSK-modulated magnetic signal are tuned with respect to each other, wherein the electromagnetic resonant circuit of the other device is an LC resonant circuit.

According to another embodiment, a device may have: a signal generator configured to generate a FSK-modulated signal for driving an electromagnetic functional unit, wherein the electromagnetic functional unit is an actuator of a loudspeaker of the device or wherein the electromagnetic functional unit is an electromagnetic resonant circuit connected to the device, wherein the signal generator is configured to drive the electromagnetic functional unit with the FSK-modulated signal in order to generate, by means of the electromagnetic functional unit, a magnetic signal carrying data to be transferred from the device to the other device, wherein a carrier frequency of the FSK-modulated signal is tuned to a resonance frequency of an electromagnetic resonant circuit with which the other device detects the magnetic signal, wherein the electromagnetic resonant circuit of the other device is an LC resonant circuit.

According to another embodiment, another device may have: a microcontroller, and an electromagnetic resonant circuit for detecting a magnetic signal carrying data to be transferred from a device to the other device, wherein the microcontroller is configured to evaluate a signal provided by the electromagnetic resonant circuit and dependent on the detected magnetic signal in order to acquire the data to be transferred from the device to the other device which the magnetic signal carries, wherein the magnetic signal is FSK-modulated, wherein a resonance frequency of the electromagnetic resonant circuit and a carrier frequency of the FSK-modulated magnetic signal are tuned with respect to each other, wherein the electromagnetic resonant circuit is an LC resonant circuit According to another embodiment, another device may have: a microcontroller, and an electromagnetic resonant circuit, wherein the microcontroller is configured to generate a modulated square-wave signal for driving the electromagnetic resonant circuit depending on data to be transferred from the other device to a device, wherein the microcontroller is configured to drive the electromagnetic resonant circuit with the modulated square-wave signal in order to generate, by means of the electromagnetic resonant circuit, a magnetic signal carrying the data to be transferred from the other device to the device, wherein the resonance frequency of the electromagnetic resonant circuit and a carrier frequency of the modulated square-wave signal are tuned with respect to each other, wherein the electromagnetic resonant circuit is an LC resonant circuit.

Embodiments provide a method for transferring data from a device to another device. The method includes a step of generating a magnetic signal [e.g. a magnetic field] with an electromagnetic functional unit, wherein the electromagnetic functional unit is an actuator of a loudspeaker of the device or wherein the electromagnetic functional unit is an electromagnetic resonant circuit [e.g. a LC resonant circuit] connected to the device, wherein the magnetic signal carries the data to be transferred from the device to the other device.

In addition, the method includes a step of detecting [e.g. receiving] the magnetic signal with an electromagnetic resonant circuit [e.g. a LC resonant circuit] of the other device in order to obtain the data to be transferred from the device to the other device, wherein the magnetic signal is FSK-modulated [e.g. MSK-modulated or GMSK-modulated], wherein a resonance frequency of the electromagnetic resonant circuit of the other device and a carrier frequency of the FSK-modulated magnetic signal are tuned with respect to each other [e.g. are identical, e.g. with a tolerance of ±10% (or ±5%, or ±3%)] [e.g. so that the electromagnetic resonant circuit acts like a filter (a reception filter) or a matched filter [e.g. for the FSK-modulated magnetic signal]].

In embodiments, a data rate of the FSK-modulated magnetic signal is adapted to a frequency response of the electromagnetic resonant circuit [e.g. so that the electromagnetic resonant circuit acts like a filter a (reception filter) or a matched filter [e.g. for the FSK-modulated magnetic signal]].

In embodiments, the data rate of the FSK-modulated signal is smaller than or equal to a bandwidth between an upper and a lower cut-off frequency of the frequency response of the electromagnetic resonant circuit [e.g. so that the electromagnetic resonant circuit acts like a filter (a reception filter) or a matched filter [e.g. for the FSK-modulated magnetic signal]].

In embodiments, the bandwidth is a bandwidth of 3 dB, a bandwidth of 10 dB, or a bandwidth of 20 dB.

In embodiments, the FSK-modulated magnetic signal is a MSK-modulated or GMSK-modulated magnetic signal.

In embodiments, the magnetic signal is in frequency range of between 10 Hz and 22 KHz.

In embodiments, the magnetic signal is in the ultrasound frequency range starting from 16 KHz.

In embodiments, the step of generating the magnetic signal comprises: generating a FSK-modulated signal for driving the electromagnetic functional unit, and driving the electromagnetic functional unit with the FSK-modulated signal in order to generate, by means of the electromagnetic functional unit, the magnetic signal carrying the data to be transferred from the device to the other device.

For example, the data to be transferred from the device to the other device may be modulated onto the FSK-modulated signal.

For example, the generated FSK-modulated signal may be in the frequency range of between 10 Hz and 22 KHz.

For example, a ratio between the carrier frequency and the modulation bandwidth of the generated FSK-modulated signal may be smaller than 25%.

In embodiments, the generated FSK-modulated signal is generated with an audio signal generator of the device.

In embodiments, the generated FSK-modulated signal is generated with an audio signal generator connected to the device.

In embodiments, the magnetic signal is a first magnetic signal, wherein the method comprises a step of generating a modulated square-wave signal for driving the electromagnetic resonant circuit of the other device, wherein the modulated square-wave signal is generated depending on the data to be transferred from the other device to the device, wherein the method further comprises a step of driving the electromagnetic resonant circuit of the other device with the modulated square-wave signal in order to generate, by means of the electromagnetic resonant circuit of the other device, a second magnetic signal carrying the data to be transferred from the other device to the device, wherein the resonance frequency of the electromagnetic resonant circuit and a carrier frequency of the modulated square-wave signal are tuned with respect to each other (e.g. are identical, e.g. with a tolerance of ±10% (or ±5%, or ±3%)], wherein the method further comprises a step of detecting the second magnetic signal with the electromagnetic functional unit of the device in order to obtain the data to be transferred from the other device to the device.

In embodiments, the resonance frequency of the electromagnetic resonant circuit and a carrier frequency of the modulated square-wave signal are tuned with respect to each other so that, by means of the electromagnetic resonant circuit of the other device, the modulated square-wave signal is converted into a magnetic signal with a FSK-comparable modulation.

In embodiments, a data rate of the modulated square-wave signal is matched to the frequency response of the electromagnetic resonant circuit.

In embodiments, the data rate of the modulated square-wave signal is smaller than or equal to a bandwidth between an upper and a lower cut-off frequency of the frequency response of the electromagnetic resonant circuit.

In embodiments, the second magnetic signal is in the frequency range of between 10 Hz and 22 KHz.

In embodiments, the second magnetic signal is in the ultrasound frequency range starting from 16 KHz.

In embodiments, the magnetic signal is a first magnetic signal, wherein the first magnetic signal comprises a wake-up sequence preceding a transfer of the data to be transferred from the device to the other device, wherein the other device is switchable between different operation modes, wherein the operation modes include an energy-saving mode and a reception mode, wherein the other device switches from the energy-saving mode into the reception mode in specified time intervals [e.g. every 150 ms] in order to identify a transfer of the wake-up sequence, wherein the data to be transferred from the device to the other device is received by the other device as a response to the identification of the wake-up sequence, wherein the other device still remains in the reception mode for a defined time span after the reception of the data to be transferred from the device to the other device in order to be able to receive further data to be transferred from the device to the other device.

In embodiments, the method further comprises a step of determining an operation mode of the other device on the basis of the defined time span and the detection of the second magnetic signal or magnetic impulse, wherein the method comprises a step of generating a further magnetic signal with the electromagnetic resonant circuit of the device, wherein the further magnetic signal carries further data to be transferred from the device to the other device, wherein the further magnetic signal is provided with a wake-up sequence preceding the data to be transferred from the device to the other device if the determination of the operation mode of the other device shows that the other device is in the energy-saving mode, wherein the further magnetic signal is not provided with the wake-up signal preceding the data to be transferred from the device to the other device if the determination of the operation mode of the other device shows that the other device is in the reception mode.

In embodiments, the method further comprises a step of generating a second magnetic signal with the electromagnetic resonant circuit of the other device as a response to a reception of the data to be transferred from the device to the other device during a defined time span, wherein the second magnetic signal comprises data to be transferred from the other device to the device, wherein the method further comprises a step of detecting the second magnetic signal with the electromagnetic functional unit of the device in order to obtain the data to be transferred from the other device to the device, wherein a reception of the data to be transferred from the other device to the device indicates that the other device is in the reception mode.

In embodiments, the method further comprises a step of generating a magnetic impulse with the electromagnetic resonant circuit of the other device as a response to a reception of the data to be transferred from the device to the other device during the defined time span, wherein the magnetic impulse indicates a reception of the data to be transferred from the other device to the device, wherein the method further comprises a step of detecting the magnetic impulse with the electromagnetic functional unit of the device, wherein a reception of the magnetic impulse indicates that the other device is in the reception mode.

In embodiments, the method further comprises a step of determining the operation mode of the other device on the basis of the defined time span and the detection of the second magnetic signal or magnetic impulse, wherein the method comprises a step of generating a further magnetic signal with the electromagnetic resonant circuit of the device, wherein the further magnetic signal carries further data to be transferred from the device to the other device, wherein the further magnetic signal is provided with a wake-up sequence preceding the data to be transferred from the device to the other device if the determination of the operation mode of the other device shows that the other device is in the energy-saving mode, wherein the further magnetic signal is not provided with the wake-up signal preceding the data to be transferred from the device to the other device if the determination of the operation mode of the other device shows that the other device is in the reception mode.

In embodiments, the electromagnetic functional unit is an electromagnetic resonant circuit connected to the device.

In embodiments, the electromagnetic resonant circuit is connected to the device via an audio interface of the device.

In embodiments, the electromagnetic resonant circuit is connected via an audio interface of a wireless audio adaptor connected to the device.

In embodiments, the device is a user terminal or a computer [e.g. a control computer in the production of the other device].

In embodiments, the device is a mobile phone, a tablet, a PC or a Notebook.

In embodiments, the other device is a participant of a communication system.

In embodiments, the participant of the communication system is a IoT node or a WiFi camera.

In embodiments, the IoT node is a sensor node or an actuator node.

In embodiments, the other device is battery-operated and/or is operated by means of an energy-harvesting element.

Further embodiments provide a device with a signal generator configured to generate a FSK-modulated [e.g. GMSK-modulated or MKS-modulated] signal for driving an electromagnetic functional unit, wherein the electromagnetic functional unit is an actuator of a loudspeaker of the device or wherein the electromagnetic functional unit is an electromagnetic resonant circuit connected to the device, wherein the signal generator is configured to drive the electromagnetic functional unit with the FSK-modulated signal in order to generate, by means of the electromagnetic functional unit, a magnetic signal [e.g. a magnetic field] carrying data to be transferred from the device to the other device, wherein a carrier frequency of the FSK-modulated signal is tuned to a resonance frequency of an electromagnetic resonant circuit with which the other device detects the magnetic signal.

In embodiments, a data rate of the FSK-modulated signal is adapted to a frequency response of the electromagnetic resonant circuit with which the other device detects the magnetic signal.

In embodiments, the data rate of the FSK-modulated signal is smaller than or equal to a bandwidth between an upper and a lower cut-off frequency of the frequency response of the electromagnetic resonant circuit with which the other device detects the magnetic signal.

In embodiments, the bandwidth is a bandwidth of 3 dB, a bandwidth of 10 dB, or a bandwidth of 20 dB.

In embodiments, the magnetic signal is a first magnetic signal, wherein the electromagnetic functional unit is configured to detect a second magnetic signal carrying data to be transferred from the other device to the device, wherein the device [e.g. a processor of the device] is configured to evaluate a signal provided by the electromagnetic functional unit and dependent on the detected second magnetic signal in order to obtain the data to be transferred from the other device to the device which the second magnetic signal carries.

In embodiments, the electromagnetic functional unit comprises the electromagnetic resonant circuit, wherein the second magnetic signal is FSK-modulated, wherein a resonance frequency of the electromagnetic resonant circuit and the carrier frequency of the FSK-modulated second magnetic signal are tuned with respect to each other so that the electromagnetic resonant circuit acts like a reception filter or a matched filter [e.g. for the FSK-modulated second magnetic signal].

In embodiments, a data rate of the FSK-modulated second magnetic signal is adapted to a frequency response of the electromagnetic resonant circuit [e.g. so that the electromagnetic resonant circuit acts like a filter (reception filter) or a matched filter [e.g. for the FSK-modulated magnetic signal]].

In embodiments, the data rate of the FSK-modulated second magnetic signal is smaller than or equal to a bandwidth between an upper and a lower cut-off frequency of the frequency response of the electromagnetic resonant circuit [e.g. so that the electromagnetic resonant circuit acts like a filter (reception filter) or a matched filter [e.g. for the FSK-modulated magnetic signal]].

In embodiments, the bandwidth is a bandwidth of 3 dB, a bandwidth of 10 dB, or a bandwidth of 20 dB.

Further embodiments provide another device with a microcontroller and an electromagnetic resonant circuit for detecting a magnetic signal carrying data to be transferred from a device to the other device, wherein the microcontroller is configured to evaluate a signal provided by the electromagnetic resonant circuit and dependent on the detected magnetic signal in order to obtain the data to be transferred from the device to the other device which the magnetic signal carries, wherein the magnetic signal is FSK-modulated [e.g. MSK-modulated or GMSK-modulated], wherein a resonance frequency of the electromagnetic resonant circuit and a carrier frequency of the FSK-modulated magnetic signal are tuned with respect to each other (e.g. are identical, e.g. with a tolerance of ±10% (or ±5%, or ±3%)].

In embodiments, the resonance frequency of the electromagnetic resonant circuit and the carrier frequency of the FSK-modulated magnetic signal are tuned with respect to each other so that the electromagnetic resonant circuit acts like a reception filter or a matched filter [e.g. for the FSK-modulated magnetic signal].

In embodiments, a data rate of the FSK-modulated magnetic signal is adapted to a frequency response of the electromagnetic resonant circuit [e.g. so that the electromagnetic resonant circuit acts like a filter (reception filter) or a matched filter [e.g. for the FSK-modulated magnetic signal]].

In embodiments, the data rate of the FSK-modulated magnetic signal is smaller than or equal to a bandwidth between an upper and a lower cut-off frequency of the frequency response of the electromagnetic resonant circuit [e.g. so that the electromagnetic resonant circuit acts like a filter (reception filter) or a matched filter [e.g. for the FSK-modulated magnetic signal]].

In embodiments, the bandwidth is a bandwidth of 3 dB, a bandwidth of 10 dB, or a bandwidth of 20 dB.

In embodiments, the other device does not comprise a dedicated analog or digital reception filter [e.g. matched filter].

In embodiments, the magnetic signal is a first magnetic signal, wherein the microcontroller is configured to generate a modulated square-wave signal for driving the electromagnetic resonant circuit depending on the data to be transferred from the other device to the device, wherein the microcontroller is configured to drive the electromagnetic resonant circuit with the modulated square-wave signal in order to generate, by means of the electromagnetic resonant circuit, a second magnetic signal carrying the data to be transferred from the other device to the device, wherein the resonance frequency of the electromagnetic resonant circuit and a carrier frequency of the modulated square-wave signal are tuned with respect to each other [e.g. are identical, e.g. with a tolerance of ±10% (or ±5%, or ±3%)].

In embodiments, the resonance frequency of the electromagnetic resonant circuit and a carrier frequency of the modulated square-wave signal are tuned with respect to each other so that the modulated square-wave signal is converted, by means of the electromagnetic resonant circuit, into a magnetic signal with a FSK-comparable modulation.

In embodiments, a data rate of the modulated square-wave signal is adapted to the frequency response of the electromagnetic resonant circuit.

In embodiments, the data rate of the modulated square-wave signal is smaller than or equal to a bandwidth between an upper and a lower cut-off frequency of the frequency response of the electromagnetic resonant circuit.

In embodiments, the microcontroller is configured to provide the modulated square-wave signal at a IO pin or a PWM pin, wherein the electromagnetic resonant circuit is connected to the IO pin or the PWM pin of the microcontroller.

In embodiments, the microcontroller is configured to map, when generating the modulated square-wave signal, a respective bit of a bit sequence of the data to be transferred from the other device to the device to the square-wave signal with a frequency that depends on the respective bit until a value stored in an accumulator and being increased after each oscillation period of the square-wave signal by a number of clock cycles of the respective oscillation period reaches or exceeds a threshold value corresponding to a symbol duration in clock cycles, wherein the microcontroller is configured to reduce, after reaching or exceeding the threshold value, the value stored in the accumulator by a value corresponding to a symbol duration in clock cycles, and to map the respectively next bit of the bit sequence onto the square-wave signal.

In embodiments, the electromagnetic resonant circuit is [e.g. directly] connected to an input of a comparator or analog-digital converter of the microcontroller or of a comparator or analog-digital converter connected to the microcontroller, wherein the comparator or analog-digital converter is configured to output at an output a reception signal [e.g. a square-wave signal] that depends on the signal provided by the electromagnetic resonant circuit and present at the input.

In embodiments, the microcontroller is configured to identify (e.g. to count) in a symbol duration-wise manner [e.g. per symbol duration] a number of rising or falling edges of the reception signal in order to derive therefrom bits of a bit sequence of the data to be transferred from the device to the other device.

For example, a bit having a first value (e.g. logically 0) may be mapped by means of a first number of rising (or falling) edges (per symbol duration), wherein a bit having a second value (e.g. logically 1) may be mapped by means of a second number of rising (or falling) edges per symbol duration.

In embodiments, the microcontroller is configured to identify [e.g. to count] [e.g. by means of a timer with a capture function] numbers of clock cycles of oscillation periods [e.g. between rising edges or falling edges] of the reception signal in order to derive therefrom bits of a bit sequence of the data to be transferred from the device to the other device.

For example, the microcontroller may measure the duration between two rising or falling edges with the help of the timer capture function. This is done by the microcontroller counting the clocks (e.g., 8 MHz) between these edges.

For example, a bit with a first value (e.g. logically 0) may be mapped by a first number of clock cycles per oscillation period (e.g. 440 clock cycles per oscillation period) of the reception signal, wherein a bit with a second value (e.g. logically 1) may be mapped by a second number of clock cycles per oscillation period (e.g. 425 clock cycles per oscillation period) of the reception signal.

In embodiments, the microcontroller is configured to identify a start time [on the basis of a detected start bit such, e.g. a point in time of the detected start bit+a specified waiting time (e.g. 0.25-0.5 symbol durations)] of a first symbol of the reception signal in order to detect the first symbol of the reception signal, wherein the microcontroller is configured to increase, starting with the start time of the first symbol of the reception signal, after each detected oscillation period of the reception signal [e.g. by detecting a rising or falling edge of a subsequent oscillation period], a value stored in an accumulator [e.g. starting with a start value, e.g. zero] by a number of counted clock cycles of the respective oscillation period, wherein the microcontroller is configured to detect, after reaching or exceeding a threshold value that corresponds to a symbol duration in clock cycles, a subsequent symbol and to reduce the value stored in the accumulator by a value that corresponds to a symbol duration in clock cycles.

For example, the detection of the start bit is only done towards the end of the start bit. Thus, after the waiting time of 0.25-0.5 symbol durations, the middle of the first data symbol is reached.

In embodiments, the microcontroller is configured to count a number of clock cycles across one oscillation period of a respective detected symbol each in order to derive therefrom a respective bit of the bit sequence.

In embodiments, the microcontroller is configured to count an average value across at least two numbers of clock cycles of at least two oscillation periods of a respective detected symbol in order to derive therefrom a respective bit of the bit sequence.

For example, only a few averaged oscillation periods in the center of the respective symbol may be considered for the decision as to which bit was transferred by means of the symbol.

For example, the microcontroller may be configured to count a median across at least three numbers of clock cycles of at least three oscillation periods of a respective detected symbol in order to derive therefrom a respective bit of the bit sequence.

In embodiments, a bit sequence of the data to be transferred from the device to the other device comprises at least one group of several data bits [e.g. 8 data bits] each being preceded by a start bit and each having attached a stop bit, wherein a first start bit of the bit sequence is preceded by at least one stop bit, wherein the microcontroller is configured to detect a respective start bit of the bit sequence on the basis of a change of a number of clock cycles per oscillation period of the reception signal.

In embodiments, the microcontroller is configured to count [e.g. by means of a timer with a capture function] in a symbol duration-wise manner, as a response to the respective detected start bit, a number of clock cycles of at least one oscillation period [e.g. between rising edges or falling edges] of the reception signal in order to derive therefrom the data bits that follow the respective start bit.

In embodiments, the microcontroller is configured to change in specified time intervals [e.g. every 100 ms] from an energy-saving mode into a reception mode in order to identify, on the basis of a determined number of clock cycles of at least one oscillation period of the reception signal, a transfer of a wake-up sequence that precedes a transfer of the data to be transferred from the device to the other device, wherein the microcontroller is configured to receive the data to be transferred from the device to the other device on the basis of the identified transfer of the wake-up sequence.

In embodiments, the wake-up sequence comprises at least two groups of several specified data bits [e.g. 8 data bits] each being preceded by a start bit and each having attached at least one stop bit, wherein at least one of the at least two groups of several specified data bits comprises at least one pseudo start bit [e.g. a bit whose value corresponds to a value of a start bit].

For example, the last group of specified data bits may comprise a byte with the value 0xFF, wherein the at least one group of specified data bits that precedes the last group of specified data bits respectively comprises a byte with the value 0xF7.

In embodiments, a last group of the at least two groups of several specified data bits does not comprise a pseudo start bit.

In embodiments, the microcontroller is configured to detect a start bit of the wake-up sequence or a pseudo start bit of a group of specified data bits on the basis of a change of a number of clock cycles per oscillation period of the reception signal, wherein the microcontroller is configured to determine [e.g. to count] [e.g. by means of a timer with a capture function] in a symbol duration-wise manner, as a response to the respective detected start bit of pseudo start bit, a number of clock cycles of at least one oscillation period [e.g. between rising edges or falling edges] of the reception signal in order to derive therefrom bits following the respective detected start bit or pseudo start bit, wherein the microcontroller is configured to receive the data to be transferred from the device to the other device if the derived bits following the respective detected start bit or pseudo start bit match expected bits.

In embodiments, the microcontroller is configured to remain in the reception mode for a specified time span after the reception of the data to be transferred from the device to the other device in order to be able to receive further data to be transferred from the device to the other device.

In embodiments, the microcontroller is configured to not switch into the energy-saving mode as a response to a signal present at a pin of the microcontroller that indicates an external energy supply.

In embodiments, the microcontroller is configured to remain in the reception mode and to receive the further data to be transferred from the device to the other device if the data to be transferred from the device to the other device indicates that further data to be transferred from the device to the other device is pending.

In embodiments, the microcontroller is configured to generate, as a response to a reception of the data to be transferred from the device to the other device, a second magnetic signal with the electromagnetic resonant circuit, wherein the second magnetic signal carries data to be transferred from the other device to the device.

In embodiments, the microcontroller is configured to generate, as a response to a reception of the data to be transferred from the device to the other device, a magnetic impulse by means of the electromagnetic resonant circuit, wherein the magnetic impulse indicates a reception of the data to be transferred from the device to the other device.

In embodiments, a bit sequence of the data to be transferred from the device to the other device comprises at least one group of several data bits [e.g. 8 data bits] each being preceded by a start bit and each having attached a stop bit, wherein the microcontroller is configured to detect a respective start bit of the bit sequence on the basis of a change of a number of clock cycles per oscillation period of the reception signal, wherein the bit sequence of the data to be transferred from the device to the other device is preceded by a preamble bit sequence.

In embodiments, the preamble bit sequence comprises a group of several preamble bits [e.g. 8 preamble bits] each being preceded by a start bit and each having attached at least one stop bit.

In embodiments, the group of several preamble bits does not comprise a pseudo start bit [e.g. a bit whose value corresponds to a value of a start bit].

In embodiments, the group of several preamble bits corresponds to a byte with the value 0xFF.

In embodiments, the bit sequence of the data to be transferred from the device to the other device is preceded by a preamble bit sequence, wherein the preamble bit sequence comprises one start bit and nine stop bits that follow the start bit.

Further embodiments provide another device with a microcontroller and an electromagnetic resonant circuit, wherein the microcontroller is configured to generate a modulated square-wave signal for driving the electromagnetic resonant circuit depending on data to be transferred from the other device to a device, wherein the microcontroller is configured to drive the electromagnetic resonant circuit with the modulated square-wave signal in order to generate, by means of the electromagnetic resonant circuit, a magnetic signal carrying the data to be transferred from the other device to the device, wherein the resonance frequency of the electromagnetic resonant circuit and a carrier frequency of the modulated square-wave signal are tuned with respect to each other [e.g. are identical, e.g. with a tolerance of ±10% (or ±5%, or ±3%)].

Further embodiments provide a method for transferring data from a device to another device. The method includes a step of generating a magnetic signal [e.g. a magnetic field] with an electromagnetic functional unit, wherein the electromagnetic functional unit is an actuator of a loudspeaker of the device or wherein the electromagnetic functional unit is an electromagnetic resonant circuit [e.g. a LC resonant circuit] connected to the device, wherein the magnetic signal carries the data to be transferred from the device to the other device. In addition, the method includes a step of detecting [e.g. receiving] the magnetic signal with an electromagnetic resonant circuit [e.g. a LC resonant circuit] of the other device in order to obtain the data to be transferred from the device to the other device, wherein the magnetic signal is FSK-modulated [e.g. MSK-modulated or GMSK-modulated], and wherein a plurality of magnetic signals on a plurality of different carrier frequencies are generated with the electromagnetic functional unit, wherein, depending on a resonance frequency of the electromagnetic resonant circuit, at least one of the plurality of magnetic signals on at least one of the plurality of different carrier frequencies is detected with the electromagnetic resonant circuit [e.g. the LC resonant circuit].

In embodiments, the method further comprises a step of tuning the resonance frequency of the electromagnetic resonant circuit to the at least one of the plurality of carrier frequencies [e.g. so that the electromagnetic resonant circuit acts like a filter [reception filter] or a matched filter [e.g. for the FKS-modulated magnetic signal]].

In embodiments, the plurality of magnetic signals comprises different identifiers [e.g. headers], wherein the method further comprises a step of identifying a carrier frequency of the detected at least one magnetic signal on the basis of the identifier of the at least one magnetic signal, wherein the method further comprises a step of tuning the resonance frequency of the electromagnetic resonant circuit to the identified carrier frequency [e.g. so that the electromagnetic resonant circuit acts like a filter [reception filter] or a matched filter [e.g. for the FSK-modulated magnetic signal]].

In embodiments, the plurality of magnetic signals comprises different identifiers [e.g. headers], wherein the plurality of magnetic signals is a plurality of first magnetic signals, wherein the method further comprises a step of generating a second magnetic signal with the electromagnetic resonant circuit of the other device, wherein the second magnetic signal comprises information about the identifier or the carrier frequency of the detected at least one magnetic signal, wherein the method further comprises a step of detecting the second magnetic signal with the electromagnetic functional unit in order to obtain the information about the identifier or the carrier frequency of the detected at least one magnetic signal Embodiments concern a system for a cost-efficient and generally available method to configure devices, in particular sensor nodes.

BRIEF DESCRIPTION OF THE DRAWINGS

Embodiments of the present invention will be detailed subsequently referring to the appended drawings, in which:

FIG. 18 shows a flow diagram of a method for tuning an electromagnetic resonant circuit of a configuration interface of a participant of a communication system according to an embodiment of the present invention, FIG. 19 shows a flow diagram of a method for operating an electromagnetic resonant circuit of a configuration interface of a participant of a communication system according to an embodiment of the present invention, and FIG. 20 shows a flow diagram of a method for operating an electromagnetic resonant circuit of a configuration interface of a participant of a communication system according to an embodiment of the present invention.

DETAILED DESCRIPTION OF THE INVENTION

Figure 1:
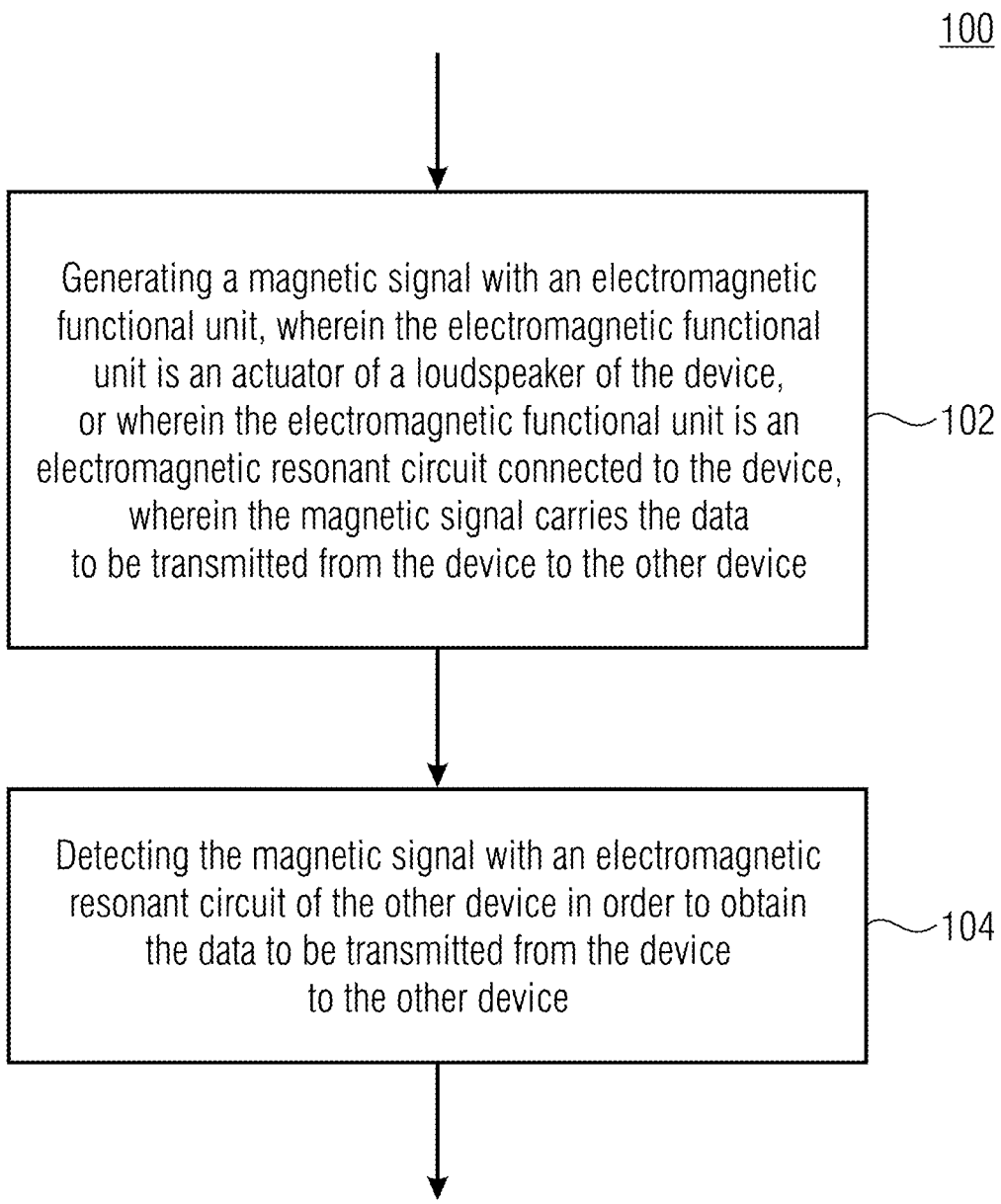
FIG. 1 shows a flow diagram of a method for transmitting data between a device and another device according to an embodiment of the present invention.

In the subsequent description of the embodiments of the present invention, the same elements or elements having the same effect are provided with the same reference numerals in the figures so that their description is interchangeable.

FIG. 1 shows a flow diagram of a method 100 for transmitting data between a device and another device according to an embodiment of the present invention. The method 100 includes a step 102 of generating a magnetic signal (e.g. a magnetic field) with an electromagnetic functional unit, wherein the electromagnetic functional unit is an actuator of a loudspeaker of the device or wherein an electromagnetic functional unit is an electromagnetic resonant circuit (e.g. LC resonant circuit) connected to the device, wherein the magnetic signal carries the data to be transmitted from the device to the other device. In addition, the method 100 includes a step 104 of detecting (e.g. receiving) the magnetic signal with an electromagnetic resonant circuit (e.g. LC resonant circuit) of the other device in order to obtain the data to be transmitted from the device to the other device.

In the following, embodiments of the method 100 for transmitting data between a device and another device shown in FIG. 1 are described in more detail based on FIGS. 2a to 2c.

Figure 2A:
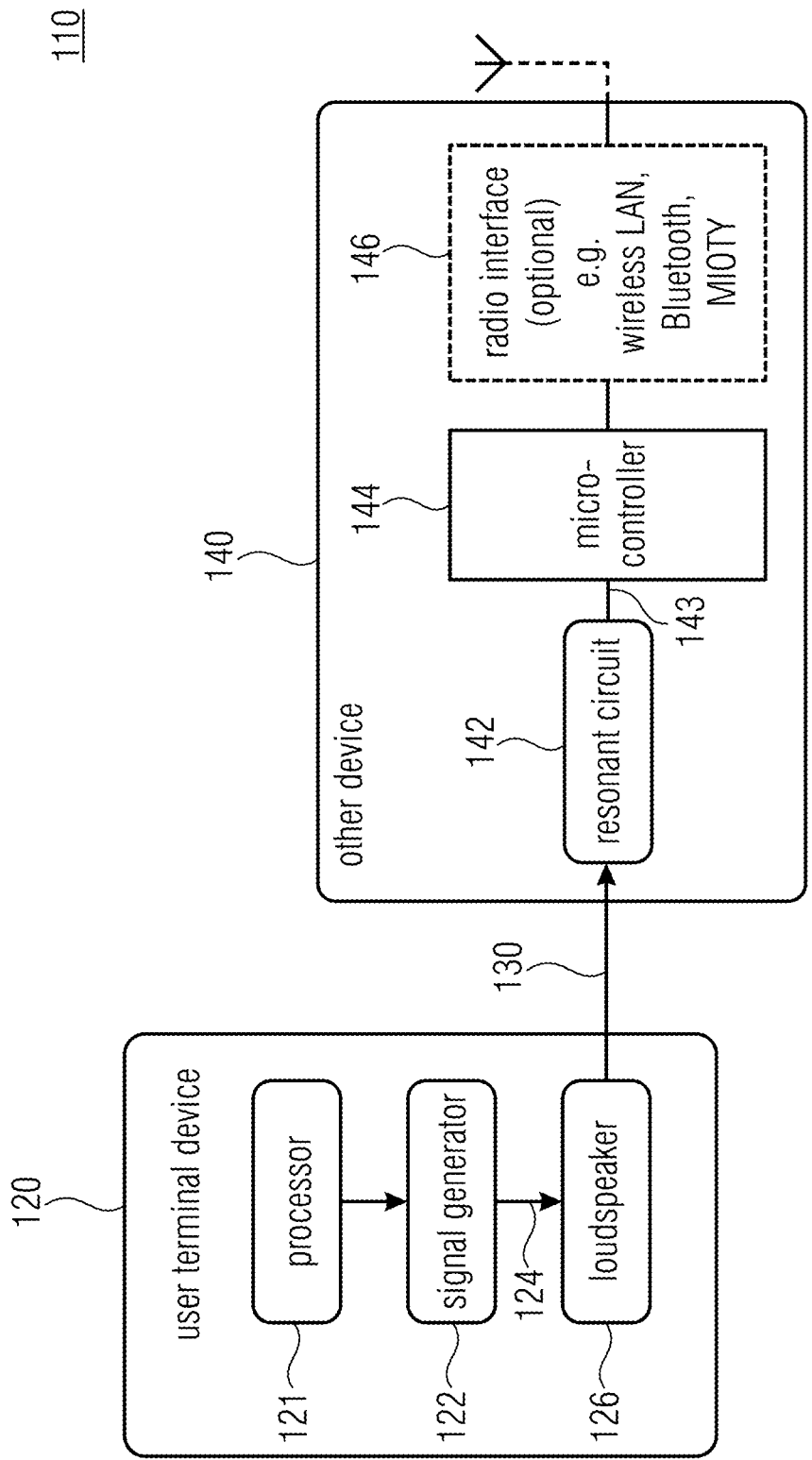
FIG. 2a shows a schematic block circuit diagram of a system with a device and another device according to an embodiment of the present invention.

FIG. 2a shows a schematic block circuit diagram of a system 110 with a user terminal device 120 (e.g. mobile telephone, tablet, notebook) and another device 140 according to an embodiment of the present invention.

The user terminal device 120 may comprise a signal generator 122 (e.g. an audio signal generator such as an amplifier) and a loudspeaker 126 with an electromagnetic actuator (e.g. an oscillator coil). The user terminal device 120 (or a processor 121 of the user terminal device 120, for example) may be configured to drive the signal generator 122 in order to generate a signal 124 for driving the electromagnetic actuator of the loudspeaker 126, and to drive the electromagnetic actuator of the loudspeaker 126 with the generated signal 124 in order to generate a (parasitic) magnetic signal 130 (e.g. a (parasitic) magnetic field) by means of the electromagnetic actuator of the loudspeaker 126, said signal carrying the data to be transmitted from the device 120 to the other device 140.

The other device 140 may comprise a microcontroller 144 and an electromagnetic resonant circuit 142 connected to the microcontroller 144. The electromagnetic resonant circuit 142 may be configured to detect the magnetic signal 130 (e.g. the magnetic field) carrying the data to be transmitted from the device 120 to the other device 140. The microcontroller 144 may be configured to evaluate a signal 143 (e.g. reception signal) provided by the electromagnetic resonant circuit 142 and depending on the detected magnetic signal in order to obtain the data to be transmitted from the device 120 to the other device 140 and carried by the magnetic signal 130.

Figure 2B:
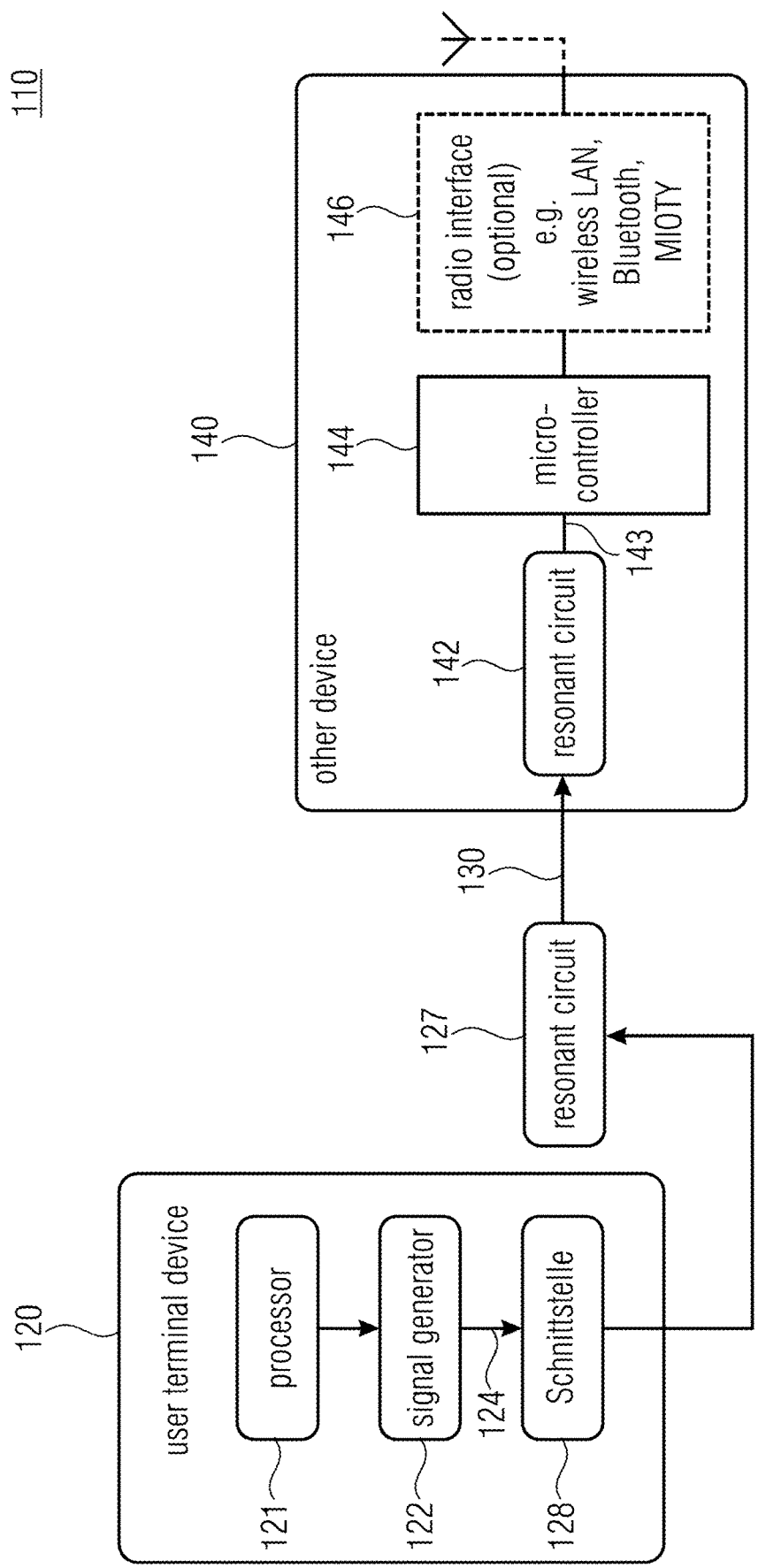
FIG. 2b shows a schematic block circuit diagram of a system with a device and another device according to a further embodiment of the present invention.

FIG. 2b shows a schematic block circuit diagram of a system 110 with a user terminal device 120 (e.g. mobile telephone, tablet, notebook) and another device 140 according to a further embodiment of the present invention.

In contrast to the embodiment shown in FIG. 2a, the magnetic signal 130 (e.g. magnetic field) is not generated with a loudspeaker 126 of the user terminal device 120 in the embodiment shown in FIG. 2b, but with an electromagnetic resonant circuit 127 (e.g. LC resonant circuit) connected to the user terminal device 120.

In detail, the user terminal device shown in FIG. 2b may comprise a signal generator 122 and an interface 128, wherein the electromagnetic resonant circuit 127 is connected to the user terminal device 120 via the interface 128.

The user terminal device 120 (or a processor 121 of the user terminal device 120, for example) may be configured to drive the signal generator 122 in order to generate a signal 124 for driving the electromagnetic resonant circuit 127, and to drive the electromagnetic resonant circuit 127 with the generated signal 124 in order to generate a magnetic signal (e.g. magnetic field) 130 by means of the electromagnetic resonant circuit 127, said signal carrying first data to be transmitted from the user terminal device 120 to the other device 140.

The signal generator 122 shown in FIGS. 2a and 2b may be an audio signal generator. Conventionally, such an audio signal generator 122 (e.g. an amplifier) may be configured to generate an audio signal 124 for driving a loudspeaker 126 of the user terminal device 120 or an audio reproduction device (e.g. headphones) connected to the user terminal device 120.

In the embodiment shown in FIG. 2a, the loudspeaker 126 of the user terminal device 120 is driven with the signal 124 generated by the audio signal generator 122 in order to generate the magnetic signal 130 carrying the first data.

On the other hand, in the embodiment shown in FIG. 2b, the electromagnetic resonant circuit 127 connected to the user terminal device 120 is driven with the signal 124 generated by the audio signal generator 122 in order to generate the magnetic signal 130 carrying the first data.

Here, the interface 128 via which the electromagnetic resonant circuit 127 is connected to the user terminal device 120 may be an audio interface. For example, the audio interface may be a wired audio interface such as a jack plug, a USB-C® audio terminal or a Lightning® audio terminal.

In the embodiment shown in FIG. 2b, the user terminal device 120 comprises the signal generator 122. Alternatively, the signal generator 122 may also be implemented externally to the user terminal device 120. For example, the signal generator 122 may be implemented in a wireless audio adaptor connected to the user terminal device 120. In this case, the user terminal device may be connected to the wireless audio adaptor via a wireless interface (as the interface 128) such as Bluetooth, wireless LAN or Certified Wireless USB, wherein the electromagnetic resonant circuit 127 is connected to the signal generator 122 implemented in the wireless audio adaptor via an audio interface (e.g. a jack plug, a USB-C® audio terminal or a Lightning® audio terminal).

In the following, further embodiments that may be applied to the embodiment shown in FIG. 2a and to the embodiment shown in FIG. 2b are described.

In embodiments, the electromagnetic resonant circuit 127 connected to the user terminal device 120 may comprise a coil and a capacitor. For example, the coil may be a ferrite coil having an inductivity of 20 pH to 20.000 pH and/or a volume of 0.5 cm³ or less.

In embodiments, the electromagnetic resonant circuit 142 of the other device 140 may comprise a coil and a capacitor. For example, the coil may be a ferrite coil having an inductivity of 20 pH to 20.000 pH and/or a volume of 0.5 cm³.

In embodiments, the generated signal 124 may be in the frequency range between 10 Hz and 22 kHz. Alternatively, the generated signal 124 may be in the ultrasound frequency range above 16 kHz, wherein an upper cut-off frequency of the generated signal 124 may be limited by the signal generator. For example, in the case of an audio signal generator, the upper cut-off frequency may be between 20 kHz and 22 kHz.

In embodiments, the data may be modulated onto the generated signal 124, e.g. by FSK (FSK=frequency shift keying), MSK (MSK=minimum shift keying) or GMSK (GMSK=Gaussian minimum shift keying). Obviously, any other modulation type may be used, such as ASK (ASK=amplitude shift keying), PSK (PSK=phase shift keying) or OOK (OOK=on-off keying, a type of amplitude shift keying in which the carrier is switched on and off).

In embodiments, a ratio between the carrier frequency and the modulation bandwidth of the generated signal may be lower than 25% (e.g. lower than 20% or lower than 15%).

In embodiments, the other device 140 may be a participant of a communication system, as is indicated in FIGS. 2a and 2b. In this case, the other device 140 may comprise a radio interface 146 for communication according to a radio standard such as wireless LAN, Bluetooth, MIOTY [9] or IEEE 802.15.4w. For example, the other device 140 may be an IoT node (IoT=internet of things) (e.g. a sensor node or actuator node) or a wireless LAN camera.

In embodiments, the data carried by the magnetic signal 130 may be configuration data. Here, the microcontroller 144 may be implemented to configure the other device 140 based on the configuration data.

For example, the participant may be configured on the basis of the data carried by the magnetic signal 130, e.g. it may be incorporated into the respective communication system. For example, the configuration data may comprise information in order to incorporate the user-configurable device 140 into a wireless network (e.g. sensor network or wireless LAN), such as a network name and a network key. Obviously, any other parameters may be assigned to the user-configurable device 140 by means of the configuration data, e.g. a frequency channel to be used, time slots to be used, or a hopping pattern to be used.

The arrangement shown in FIG. 2b may also be used for the bi-directional data transmission between the user terminal device 120 and the other device 140, as is subsequently explained on the basis of the embodiment shown in FIG. 2c.

Figure 2C:
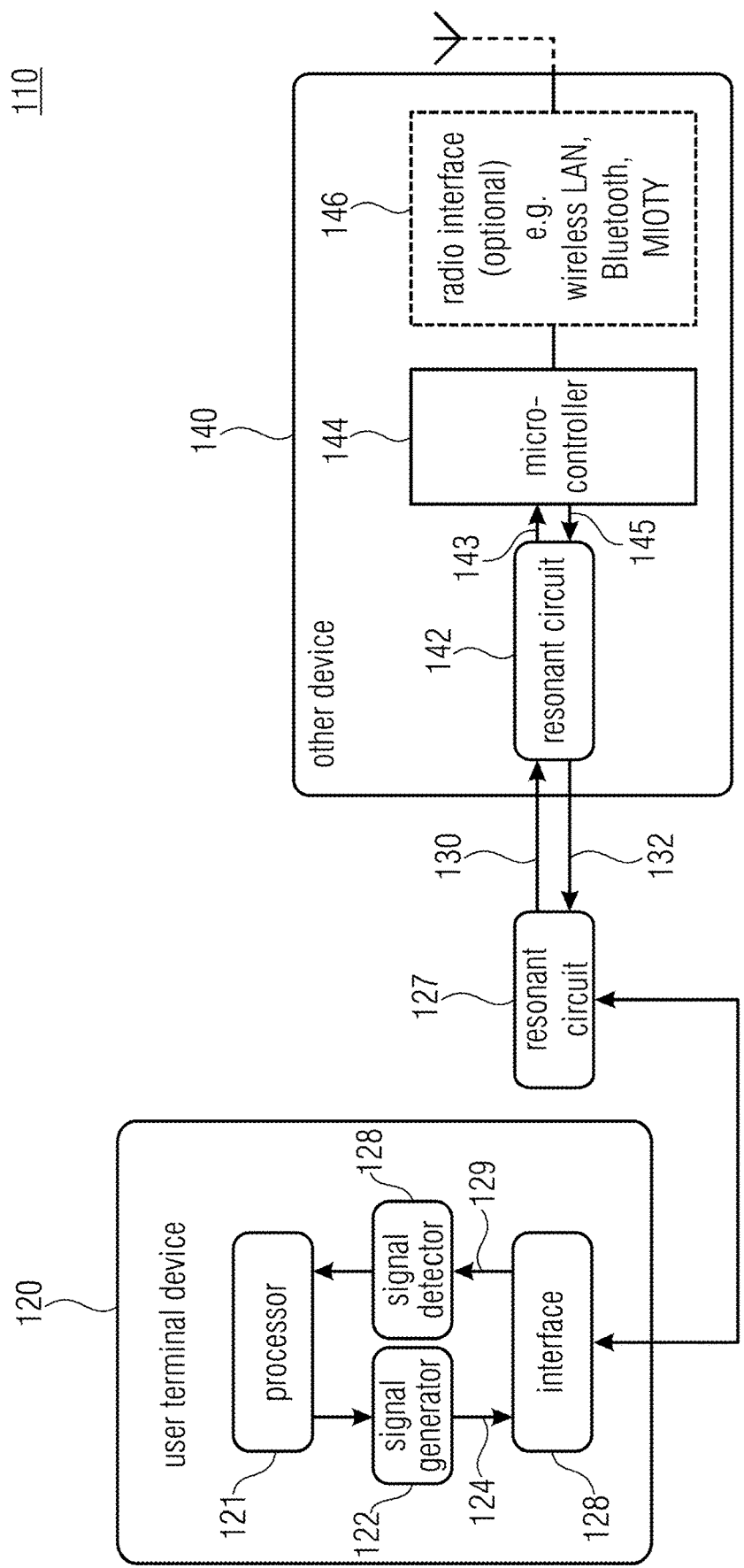
FIG. 2c shows a schematic block circuit diagram of a system with a device and another device according to a further embodiment of the present invention.

FIG. 2c shows a schematic block circuit diagram of a system 110 having a user terminal device 120 (e.g. a mobile telephone, tablet, notebook) and another device 140 according to a further embodiment of the present invention.

As can be seen in FIG. 2c, a first magnetic signal 130 may be transmitted from the user terminal device 120 to the other device 140, as has already been explained in detail with reference to FIG. 2b, whereas a second magnetic signal 132 may be transmitted from the other device 140 to the user terminal device 120.

In detail, the other device 140 may be configured to generate with the electromagnetic resonant circuit 142 a second magnetic signal 132 carrying data to be transmitted from the other device 140 to the user terminal device 120.

For example, the microcontroller 144 may be configured to generate a modulated transmission signal (e.g. square-wave signal) 145, and to drive the electromagnetic resonant circuit 142 with the modulated transmission signal (e.g. square-wave signal) 145 in order to generate the second magnetic signal 132 carrying the data to be transmitted from the other device 140 to the user terminal device 120.

The electromagnetic resonant circuit 127 of the user terminal device 120 may be configured to detect the second magnetic signal 130 (e.g. magnet field) carrying the data to be transmitted from the other device 140 to the user terminal device 120. Here, the user terminal device 120 may be configured to evaluate (e.g. by means of a signal detector 128 and the processor 121 of the user terminal device 120) a signal 129 provided by the electromagnetic resonant circuit 127 and depending on the detected second magnetic signal in order to obtain the data to be transmitted from the other device 140 to the user terminal device 120 and carried by the magnetic signal 130.

In embodiments, instead of the user terminal device 120, any other device, such as a computer (control computer), may be used in order to configure the other device 140, e.g. during manufacture, distribution, installation or maintenance of the other device 140.

Alternatively, a (e.g. battery-operated) controller that includes the signal generator 122, the electromagnetic resonant circuit 127 and, in the case of bi-directional communication, the signal detector 128 may be used.

1. Efficient Communication for the Configuration of Sensor Nodes

Due to the special circumstances of the hardware used for the transmission of data described in FIGS. 2a to 2c, data transmission methods usually known from communications engineering can only be used to a limited extent. In part, these data transmission methods known from communications engineering would exceed the permissible power consumption or the maximum possible price.

This is where the embodiments described in the following come in. A data transmission method which has a lower power consumption and/or which saves hardware costs on the side of the other device is described.

In this case, data may be transmitted to another device 140 with the same waveform in a unidirectional manner from a loudspeaker 126 of a user terminal device 120 or from an electromagnetic resonant circuit 127 connected to the user terminal device, or in a bi-directional manner between an electromagnetic resonant circuit 127 connected to the user terminal device or a computer, or a controller comprising the electromagnetic resonant circuit, and the other device 140. Here, the data transmission may be initiated by the device 120 (e.g. user terminal device, control computer or controller), wherein parameters may be set on the other device 140 by the device 120 and parameters may also be read by the other device 140.

1.1 Use of the Electromagnetic Resonant Circuit as a Reception (Matched) Filter Conventionally, when receiving a message in a receiver, the reception signal is filtered with a matched filter in order to optimize the signal-to-noise ratio of the reception symbols [4].

Such a matched filter is either implemented as analog hardware or is applied as a digital filter in digital signal processing.

However, in the case of the method for transmitting data described in FIGS. 2a to 2c, e.g. for the configuration of a sensor node, additional hardware for the implementation as an analog filter is typically too expensive, and digital processing is often not possible due to limited computing power.

Thus, the present invention is based on the idea of using the electromagnetic resonant circuit 142 or 127 (e.g. of the other device 140 or of the device 120) as a reception filter (e.g. matched filter) for the (e.g. FSK-, MSK-, or GMSK-modulated) magnetic signal 130 or 132, as is described in the following.

Figure 3:
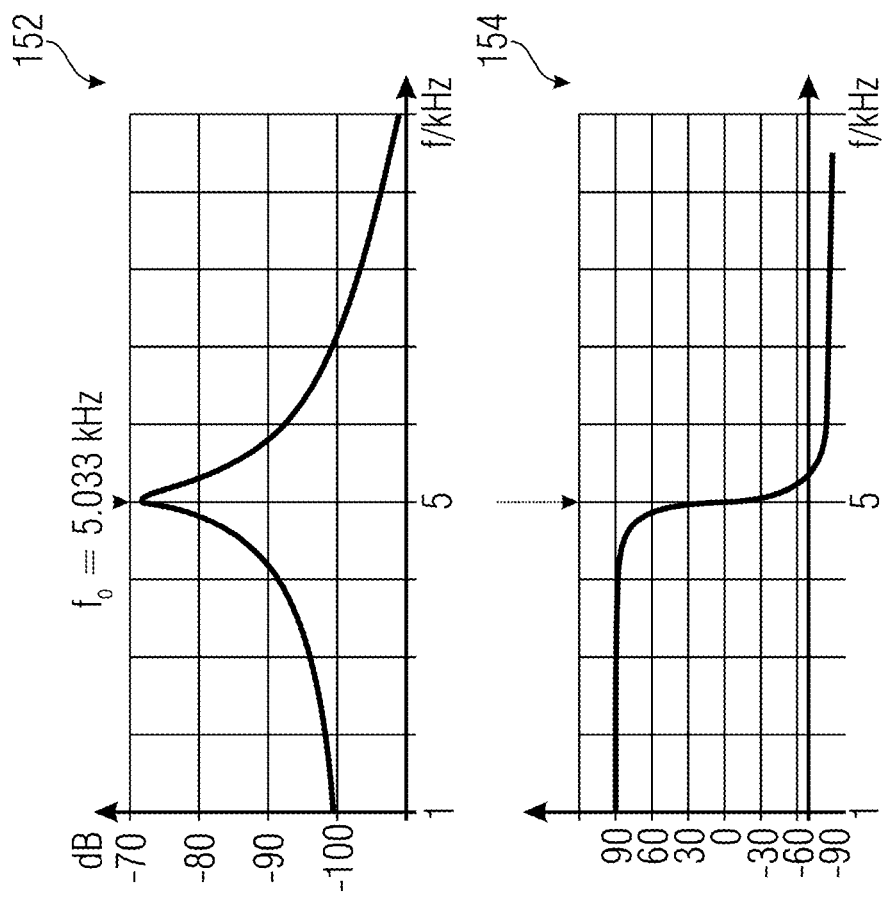
FIG. 3 shows a schematic block circuit diagram of an exemplary electromagnetic resonant circuit with exemplarily selected values with the resonance frequency $f_0$, and, in diagrams, a frequency response and a phase response of the exemplary electromagnetic resonant circuit.
Figure 3:
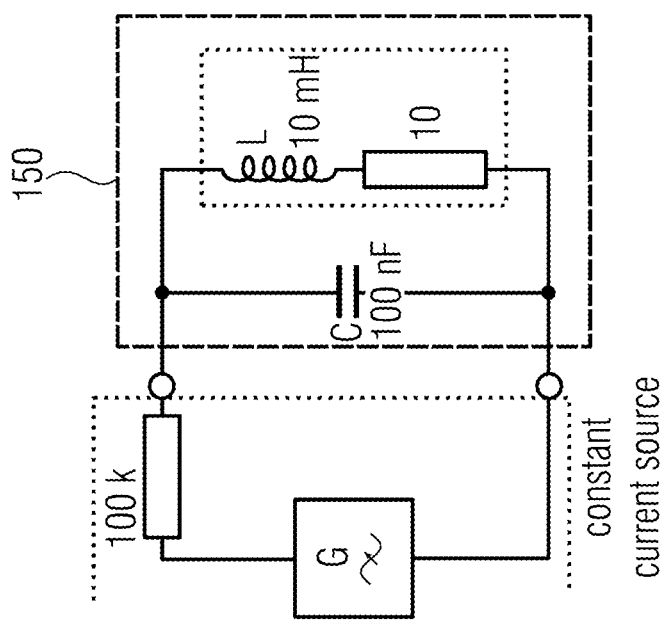

FIG. 3 shows a schematic block circuit diagram of an exemplary electromagnetic resonant circuit 150 with exemplarily selected values with the resonance frequency $f_0$ and, in diagrams, a frequency response 152 and a phase response 154 of the exemplary electromagnetic resonant circuit 150. Here, the ordinates describe the attenuation in dB and the phase in degrees, respectively, and the abscissas each describe the frequency in kHz.

Figure 4:
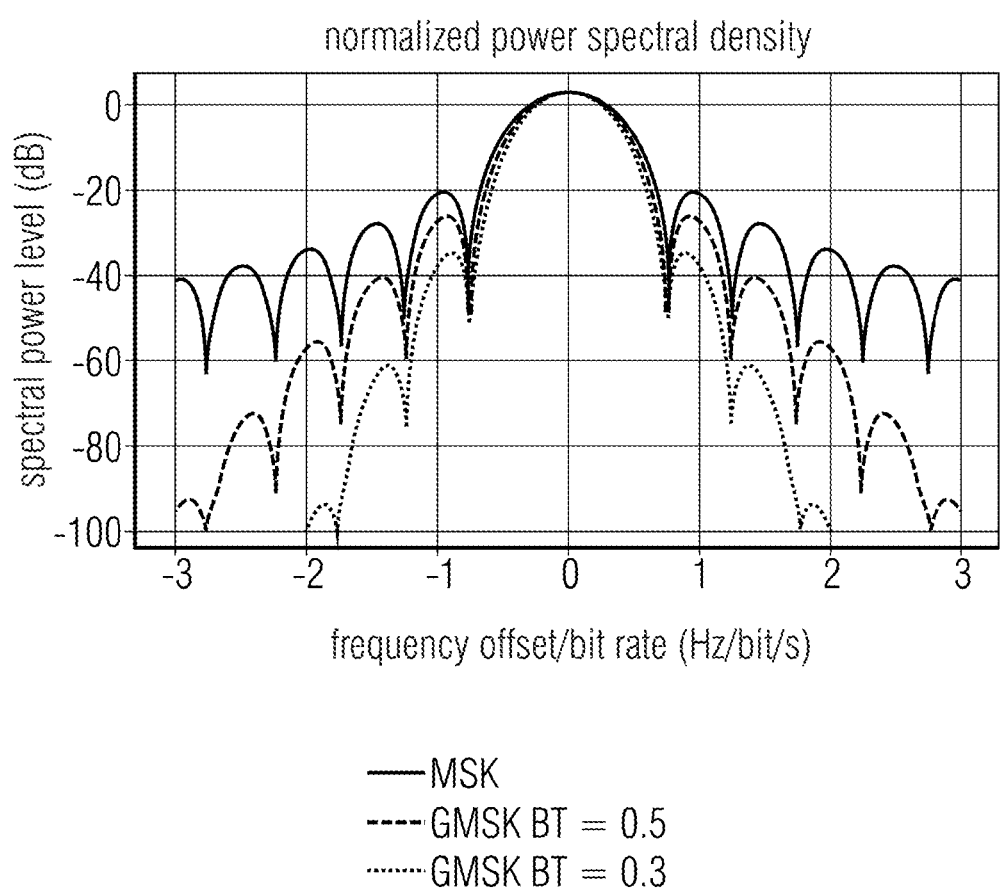
FIG. 4 shows in a diagram a frequency response of a MSK-modulated signal and two GMSK-modulates signals with different temporal bandwidths $B_T$ ($B_T$=0.5 and $B_T$=0.3)

FIG. 4 shows in a diagram a frequency response of a MSK-modulated signal and two GMSK-modulated signals with different temporal bandwidths $B_T$ ($B_T$=0.5 and $B_T$=0.3). Here, the ordinate describes the spectral power density in dB and the abscissa describes the frequency offset divided by the bit rate in Hz/bit/s.

A comparison of the frequency response of the exemplary resonant circuit and the frequency response of the GMSK-modulated signal with $B_T$=0.3 shows that both frequency responses have a certain similarity if the frequency response of the GMSK-modulated signal (corresponds to the matched filter) is shifted to the resonance frequency of the resonant circuit. This causes a shift of the carrier frequency of the modulation (e.g. FSK, MSK or GMSK modulation) to the resonance frequency of the resonant circuit.

The absolute width of the main lobe of the G(MSK) (in FIG. 4 normalized to Hz/bit/s) may be approximated to the width of the resonant circuit by appropriately selecting the symbol rate.

If the carrier frequency of the G(MSK) modulation is selected to be similar (e.g. equal) to the resonance frequency of the resonant circuit and the symbol rate is selected to be similar to the width of the resonant circuit (e.g. at the limit of 3 dB or 20 dB), the resonant circuit approximately functions as a matched filter (with small losses in performance).

In embodiments, the resonant circuit 142 or 127 (e.g. of the other device 140 or of the device 120) may be used as a matched filter by appropriately selecting the resonance frequency of the resonant circuit 142 or 127 (e.g. of the other device 140 or of the device 120) and the carrier frequency of the modulation (e.g. of the magnetic signal 130 or 132) as well as the data rate of the modulation.

Thus, in embodiments, additional hardware for filtering the signal with an analog matched filter or a subsequent digital filtering may be omitted, allowing the costs for the other device 140 to be optimized.

Before the data may be extracted from the filtered signal, the signal is mixed from the selected carrier frequency into the base band. This may either be done in an analog form using a mixer or in a digital form by multiplying with a complex rotary phasor.

An alternative and more cost-efficient possibility for recovering the symbols is described in section 1.3.

1.2 Using an IO Pin or a PWM Pin of the Microcontroller for Generating the Transmission Signal If a bidirectional communication is to take place beside the unidirectional communication from the user terminal device 120 (or control computer) to the other device 140, a signal has to be transmitted from the other device 140 as well.

Conventionally, a DAC (DAC=Digital-to-Analog Converter) of the microcontroller is used to this end so that the desired signal is digitally generated and may then be applied to an antenna by means of the DAC. However, inexpensive microcontrollers often do not have built-in DACs, or the requirements of the built-in DAC do not meet the necessary specification (e.g. with respect to power consumption or sample rate).

Alternatively, a radio chip may be used for generating the transmission signal, however, this leads to additional hardware costs. In addition, conventional radio chips may normally not be used at frequencies in the audio range, as described with respect to FIGS. 2a to 2c.

However, microcontrollers usually have IO pins (input/output pins) that may be selectively switched to a first voltage level (e.g. high, high voltage level) or a second voltage level (e.g. low, low voltage level). Thus, in embodiments, an analog square-wave signal 145 may be generated as the transmission signal. The frequency of this square-wave signal 145 may be adapted by selecting the change rate (change between high and low).

In embodiments, the square-wave signal 145 may be alternatively provided by means of a PWM pin (pulse-width modulation [7]). For an efficient control, the duty cycle may be set to approximately 50%, for example. The frequency of the square-wave signal 145 may here also be adjusted by accordingly selecting the PWM period duration.

Using the approach of section 1.1, according to which the resonant circuit 142 may be used as a matched filter for the modulation, and the generated square-wave signal 145 of the microcontroller 144, the modulated transmission signal (modulated magnetic signal 132) may be generated in a cost-efficient manner, as is described in more detail based on the following example.

As an example, the following parameters are assumed:
carrier frequency of the modulated signal: $f_c$=18.5 kHz
modulation type: differential MSK modulation with $f_{sym}$=1200 Sym/s
hardware: resonant circuit with resonance frequency at $f_r$=18.5 kHz The (G)MSK represents a frequency modulation method in which the information is introduced into the carrier frequency of the signal. By selecting the differential (G)MSK, the following correlation applies:
bit with logical value "0": sinusoidal signal of the duration $1/f_{sym}$=0.8333 ms on the frequency $f_0=f_c-f_{sym}/4$=18.2 kHz
bit with logical value "1": sinusoidal signal of the duration $1/f_{sym}$=0.8333 ms on the frequency $f_1=f_c+f_{sym}/4$=18.8 kHz If a bit with the value "0" is to be transmitted, the IO pin of the microcontroller 144 generates a square-wave signal 145 of the duration of 0.8333 ms with the frequency of 18.2 kHz. If a bit with the value "1" is to be transmitted, it accordingly generates a square-wave signal 145 with the duration 0.8333 ms at the frequency 18.8 kHz. If several bit are to be transmitted successively, there is a seamless transition without a temporal pause between the bits.

The calculation 18.2 kHz*0.83333 ms≈15.1667, or 18.8 kHz*0.83333 ms≈15,667 shows that the symbol duration is not a multiple of the period duration of the oscillation of the transmission signal (square-wave signal 145). Thus, in embodiments, the microcontroller 144 may be configured such that an interrupt is triggered after each period of oscillation. In this case, the duration of the last oscillation (measured in clock cycles of a counter) is added up in an accumulator. If the added-up time is equal to or exceeds the time of the symbol duration of 0.83333, the microcontroller changes the period of the PWM signal to the period of oscillation of the next symbol and subtracts from the accumulator a number which corresponds as exactly as possible to the symbol duration. The accumulator may be set to 0 for the start of each transmission.

This ensures correct symbol timing. Thus, the first of the approximately 15 period of oscillations per symbol at most has an incorrect period duration. However, since sampling (see below) takes place approximately in the middle of the 15 oscillations, this is negligible.

The generated square-wave signal 145 may subsequently be applied to the resonant circuit 142 with the resonance frequency at approximately 18.5 kHz. This generates a filtering that approximates the (G)MSK signal. All frequencies are attenuated according to the frequency response of the filter, wherein the desired frequencies at 18.2 kHz and 18.8 kHz are attenuated less than the undesired frequencies of the square-wave signal.

In embodiments, a square-wave signal 145 easy to be generated by a microcontroller 144 may be converted into a MSK- or GMSK-modulated transmission signal 132 (MSK- or GMSK-modulated magnetic signal) by appropriately selecting the resonance frequency of the resonant circuit 142 and the carrier frequency of the modulation as well as the data rate of the modulation.

In embodiments, a given symbol timing may be maintained by accumulating each period duration, switching to the period of oscillation given for each symbol and subtracting a symbol duration from the accumulator if the time in the accumulator larger>=symbol duration.

1.3 Using a Comparator/Timer with a Capturing Function for the Demodulation

Section 1.1 showed how to realize a matched filtering of the reception signal (MSK- or GMSK-modulated signal) with the help of a resonant circuit in a cost-efficient manner.

After this filtering, the reception signal 143 usually has to be digitized in order to extract the transmitted bits by means of demodulation.

As mentioned above, cost-efficient microcontrollers 144 usually do not have an ADC, or its characteristics are not sufficient, so that conventional direct digital processing is not possible.

In order to still be able to perform the demodulation with the available hardware, the modulation used may be considered more closely. If a frequency modulation method (FSK, GFSK, MSK, GMSK) is used, the information is transmitted in the frequency, as mentioned in the previous section.

With 2-(G)FSK or a G(MSK), two frequencies are available. Thus, exactly one bit is encoded, wherein the information is in the selection of the frequency.

According to the symbol duration, one or the other frequency is selected for the transmission of a bit. In other words, during the transmission of a bit, a pure tone of the frequency $f_0$ or the frequency $f_1$ is transmitted. Due to the limited symbol duration, there is a convolution of the pure tone with a square-wave signal in the time domain.

If the received signal 143 that has already passed through the matched filter due to the resonant circuit 142 is applied to a comparator (in which the second input is switched to a reference potential such as ground, for example), the output of the comparator changes with each change of sign of the received signal 143.

The duration between the rising (or falling) edges or the number of rising (or falling) edges of the comparator output during a symbol duration may be counted in the microcontroller 144.

As an alternative to the built-in comparator, an external one may be used or it may be replaced by a transistor circuit (cf. section 2.4).

Considering the above example of section 1.2, with a transmitted bit with the value "0", there would be 15.16667 periods and therefore also 15.16667 falling or rising edges during a symbol duration of 0.8333 ms. With a transmitted bit with the value "1", there would accordingly be 15.6667 falling or rising edges. These edges may be counted by the microcontroller 144, e.g. by means of a counter. For example, the symbol duration may be realized via a timer and the edges may be processed by means of interrupts, e.g. by increasing a counter value of the counter.

Alternatively, the duration may also be counted in clock cycles between the rising or falling edges. For example, at a clock rate of 8 MHz, there are 440 cycles for a bit with the value "0" and 425 cycles for a bit with the value "1" between the respectively falling or respectively rising edges.

To this end, the hardware may use a capture function of the timer of the microcontroller.

Thus, with a certain tolerance range of six clock cycles, for example, a demodulation of the bits may be reproduced. Thus, the following applies for the section 1.2:

434 clock cycles counter≤446→bit "0"
419 clock cycles counter≤431→bit "1"

If the number of the clock cycles is outside of this range, it may be assumed that no transmission has taken place or that the noise is too strong so that a meaningful decoding would not be possible.

Alternatively, a threshold may be placed approximately in the middle of the clock cycles. With more clock cycles, a bit with the value "0" may be assumed, with less clock cycles, a bit with the value "1" may be assumed. Telegrams that are incorrectly received may be detected by means of an error correction and/or error detection, e.g. by encoding and/or CRC.

Figure 5A:
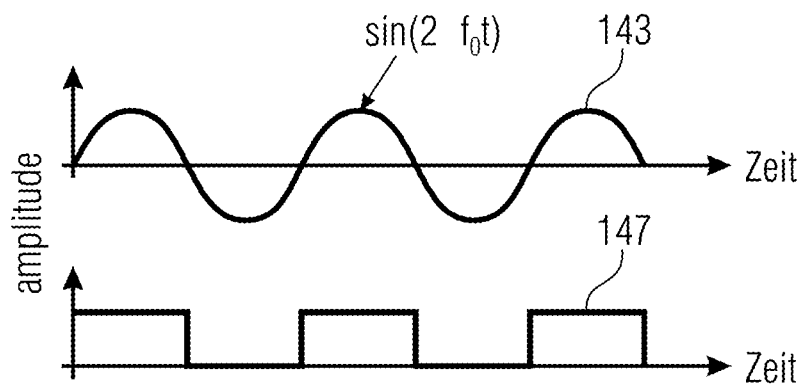
FIG. 5a shows in a diagram a comparison between sections of the input signal having the frequency $f_0$ (i.e. in the transmission of a bit with the value "0") present at the comparator input as well as an output signal present at the comparator output.

FIG. 5a shows in diagrams a comparison between sections of the input signal present at the comparator input (=reception signal 143 provided by the resonant circuit) with the frequency $f_0$ (i.e. during the transmission of a bit with the value "0") as well as a corresponding output signal 147 present at the comparator output. Here, the ordinates describe the amplitudes and the abscissas describe the time.

Figure 5B:
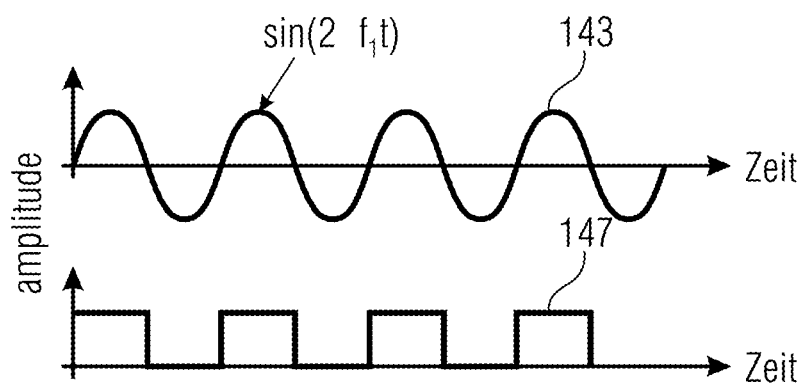
FIG. 5b shows in a diagram a comparison between sections of the input signal having the frequency $f_1$ (i.e. in the transmission of a bit with the value "1") present at the comparator input as well as an output signal present at the comparator output.

FIG. 5b shows in diagrams a comparison between sections of the input signal present at the comparator input (=reception signal 143 provided by the resonant circuit) with the frequency $f_1$ (i.e. during the transmission of a bit with the value "1") as well as a corresponding output signal 147 present at the comparator output. Here, the ordinates describe the amplitudes and the abscissas describe the time.

Thus, the upper part of FIG. 5a shows a section of the input signal of a transmitted bit with the value "0". This is a pure tone of the length of a symbol duration on the frequency $f_0$. This input signal is compared by means of the comparator against a reference potential (e.g. ground), wherein each positive half-wave of the signal sets the output of the comparator to a first voltage level (e.g. high, high voltage level) and each negative half-wave of the signal sets it to a second voltage level (e.g. low, low voltage level). In other words, the output of the comparator is a square-wave signal whose frequency depends on the frequency of the input signal (=reception signal 143 provided by the resonant circuit).

Similar to FIG. 5a, FIG. 5b shows the input signal and output signal of the comparator, wherein FIG. 5b shows in sections the signal for a bit with the value "1". The function of the comparator is the same, however, the output of the comparator has a different frequency.

The output signal is applied to the microcontroller 144, which may, as described above, count the rising and/or falling edges during a symbol duration and derive therefrom the modulated bits.

In the case of reception, there is also the difficulty that symbol timing has to be adhered to in order to obtain the correct points in time for a decision between bits with the values "1" and "0".

To this end, similarly to case of transmission, an accumulator may be used.

As soon as a signal is detected and the optimum sample time for the symbols is determined, the accumulator is set to the value 0.

The microcontroller 144 may be configured such that an interrupt is triggered with each increasing edge of the comparator (equivalently with each falling edge). The duration of the last oscillation (measured in clock cycles of the hardware capture register) may be added up in an accumulator. If the added-up time is equal to or exceeds the time of the symbol duration of 0.83333 ms, this means that the optimum point in time for sampling the new symbols has been reached. The microcontroller 144 determines whether it is a bit with the value "1" or "0" and stores the same. The microcontroller 144 then subtracts from the accumulator a number that corresponds as closely as possible to the symbol duration.

Using this approach, a correct symbol timing is achieved.

The decision as to whether a bit with the value "1" or "0" has been transmitted may be performed directly based on the measurement of a period of oscillation. The mean or median across several period of oscillations may also be formed. Short interferences leading to an edge may be corrected in this way.

If the microcontroller 144 only has an insufficient time resolution when determining the period duration of the oscillation, the duration may be averaged across several periods. If averaging is performed before the symbol time determination described in the next section, its delay is automatically compensated by the symbol time determination.

In embodiments, the signal (reception signal 143) filtered by the resonant circuit may be applied to a timer with a capture function via a built-in comparator or via an external circuit. A square-wave signal with a period of oscillation depending on the transmitted bit is provided at the output of the comparator. With this, the clock cycles between rising and falling edges may be counted.

In embodiments, averaging (mean or median) is optionally carried out across several interrupts, i.e. across several period of oscillations whose duration is determined based on the edges).

In embodiments, the transmitted bits may be derived by means of threshold decisions.

In embodiments, the given symbol timing is maintained by accumulating each measured period duration and sampling the symbol as well as subtracting a symbol duration by the accumulator if the time in the accumulator symbol duration.

1.4 Symbol and Byte Synchronization by Means of Start and Stop Symbol

The previous sections 1.1 to 1.3 have dealt with optimizing the modulation and its demodulation. In addition to the demodulation on the microcontroller 144, a symbol synchronization to the reception signal has to be carried out prior to this.

This section deals with the design of the bits to be transmitted and the synchronization within the transmission.

Through the demodulation of the bits described in section 1.3, counting clock cycles between two rising or falling edges of the comparator output in the microcontroller 144, which does not have an infinitely accurate resolution, it is not possible to transmit, in contrast to typical radio systems, a preamble and to subsequently add data symbols of any length. Furthermore, quartz tolerances play a role so that the duration of a transmission without post-synchronization only includes a few symbols.

This problem occurs in a similar way in an asynchronous UART. In this case, for synchronization, a start bit used by the receiver for synchronization is introduced at the start of a "frame" (consisting of a start bit, 8 data bits and 1 or 2 stop bits). To terminate the frame, either one or two stop bits are transmitted. The data bits are introduced between the start and the stop bit(s). For example, more information with respect to the UART protocol can be found in [8].

Herein, a start and a stop bit are used in a similar manner when combining several symbols. The start bit is modulated as a bit with the value "0" and the stop bit as a bit with value "1".

In UART, start and stop bit as well as the symbols are signalized by voltage levels. A direct conversion in a carrier signal to 18.5 kHz on or off for a bit with the value "0" or "1" has several disadvantages:

- A threshold value has to be set. The same depends on the received noise/interference signals in the environment.
- The signal power has to be detected in order to compare it against a threshold value.

The following describes a simplified method without the described disadvantages. In contrast to the UART protocol, bits with the value "0" and "1" are not mapped by means of voltage levels, but by means of different frequencies, as described in the previous sections. In contrast to UART, this results in a signal with a constant envelope.

A certain number of stop bits (e.g. at least 3) is transmitted before the first start bit.

1. If the receiver searches for the symbol synchronization, it waits until it detects a transition from symbols with 1-period duration (425 clocks) to a symbol with 0-period duration (440 clocks). In this case, a value of approximately 433 is set as the threshold.
2. If the transition is identified, the microcontroller 144 weights between a quarter and half of a symbol duration, i.e. approximately three to seven period of oscillations, and then starts the above-described method in order to sample with the help of an accumulator eight symbols after a symbol duration in the symbol clock.

3. After eight symbols and therefore eight bits have been decoded, the microcontroller switches again into the search for a 1-0 transition, i.e. from a stop bit to a start bit, thus, the process starts again at 1.

In embodiments, each byte is transmitted with a start and stop symbol, which are transmitted by means of two different frequencies, same as the data itself.

In embodiments, the microcontroller 144 may detect a start bit by means of the change of the measured period duration.

In embodiments, the microcontroller may decode 8 bits and may then again search for a start bit.

In embodiments, blocks of a start bit, eight data bits and a stop bit may follow each other directly or be separated by any number of stop bits.

1.5 Efficient Wake-Up Mode (Peeking Mode) for Minimizing the Power Consumption

If there is no data transmitted to the other device 140, it should consume as little power as possible, e.g., so that a battery of the device 140 lasts as long as possible.

In embodiments, to this end, there is a multi-stage so-called peeking method (wake-up method (or eavesdropping method)) determining whether a signal is present. If this is not the case, the microcontroller 144 should switch as quickly as possible into a so-called energy-saving mode (power-down mode) in which it needs little power. The microcontroller 144 periodically wakes up (wake-up mode (or eavesdropping mode)) and performs peeking (e.g. eavesdropping or spying). If there is no signal present, the microcontroller again switches into the energy-saving mode, otherwise it starts the decoding process described in the previous sections.

To ensure that the wake-up method is as energy-saving as possible and therefore able be processed on an inexpensive microcontroller 144, several stages are used to determine whether a valid signal is present. Assuming that the other device 140 is in the energy-saving mode, a so-called wake-up sequence is transmitted by the device 120 (e.g. user terminal device, control computer or controller) prior to a data transmission.

Figure 6:
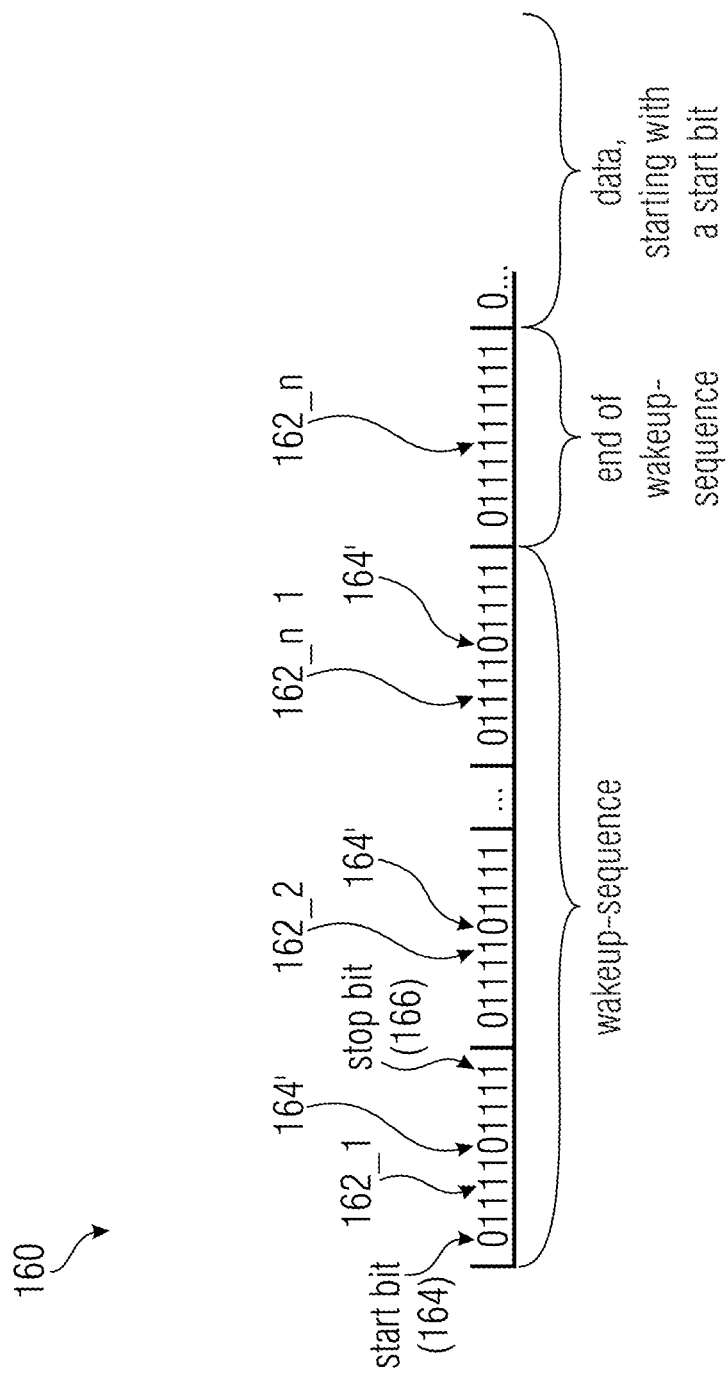
FIG. 6 shows a schematic view of a wake-up sequence preceding a data transmission according to an embodiment of the present invention.

FIG. 6 shows a schematic view of a wake-up sequence 160 preceding a data transmission according to an embodiment of the present invention.

As can be seen in FIG. 6, the wake-up sequence 160 includes several groups 162_1-162_n of several specified data bits (e.g. 8 data bits) each being preceded by a start bit 164 and each having attached thereto at least one stop bit 166.

In this case, the groups 162_1-162_n−1 of several specified data bits may each comprise at least one pseudo start bit 164' (e.g. a bit whose value corresponds to a value of a start bit), whereas the last group 162_n of several specified data bits does not comprise a pseudo start bit 164'.

For example, the wake-up sequence may have a length of 180 ms.

The peeking method may have the following steps.

In a first step, the microcontroller 144 may periodically wake up (e.g. every 150 ms) and may count cycles for a given time (approximately 200-300 µs). In detail, after waking up, the microcontroller 144 may count the number of clocks between the edges of the comparator output according to section 1.3 within a given time (e.g. approximately 200-300 µs (corresponds to approximately ¼-⅓ of a symbol duration)). If the counted mean frequency of the comparator signal (calculation by means of period duration from the counted clocks between the edges) is within the range of 18000≤frequency≤19000, the process continues with the second step. Otherwise, a transmission has not been detected and the microcontroller 144 again switches into the energy-saving mode until it is again awakened for peeking.

In a second step, a start bit 164 or a pseudo start bit 164' may be identified. Since a signal that could also originate from an interference source randomly generating an alternating magnetic field in the range of 18000-19000 kHz has been detected in the first step, as a second criterion, the microcontroller may be set into the reception mode in order to search in the second step for a frequency change from one/several 1-symbol(s) to a 0-symbol, i.e. a start bit. To this end, the characteristic of the MSK and its two different frequencies which have been converted into a square-wave signal by means of the comparator can be exploited.

As already exemplarily described in the previous sections, the MSK corresponds to a frequency modulation, wherein the symbols have been introduced into the frequency information. According to section 1.2, the following exemplarily applies:

bit "0": sinusoidal signal of the duration $1/f_{sym}=0.8333$ ms on the frequency $f_0=f_c-f_{sym}/4=18.2$ kHz bit "1": sinusoidal signal of the duration $1/f_{sym}=0.8333$ ms on the frequency $f_1=f_c+f_{sym}/4=18.8$ kHz That is, when transmitting a bit with the value "0", there are 18200 oscillations per second. Similarly, when transmitting a bit with the value "1", there are 18800 oscillations per second. These oscillations are converted into a square-wave signal of the same frequency by means of the comparator according to section 1.3.

As described in section 1.4, a start bit 164 is introduced at the beginning of a byte and a stop bit 166 is introduced at the end of a byte. According to section 1.4, the start bit 164 is modulated as a bit with the value "0" and the stop bit 166 is modulated as a bit with the value "1". Thus, there is a change of frequency from the end of the last byte to the beginning of the next byte.

This change of frequency is used for determining a start bit 164.

If the microcontroller 144 wakes up directly after the start bit 164, the microcontroller would have to wait for nine symbols until the next start bit 164. Thus, the byte 0xF7 is transmitted as the wake-up sequence. Thus, if the microcontroller 144 is switched on directly after a start bit 164, this results in a pseudo start bit 164' for the microcontroller 144.

If a start bit 164 has not been detected after five symbols, the microcontroller 144 switches into the energy-saving mode again. Otherwise, the reception of bytes is carried out.

In a third step, bytes are received. Regardless of whether the microcontroller 144 has detected a start bit 164 or a pseudo start bit 164', it will receive bytes with the value 0xF7 if it receives a wake-up sequence 160. If the first 0xF7 byte is received, the microcontroller changes from the wake-up mode (peeking mode) into the normal reception mode.

In a fourth step, a data search, or a data reception is performed in the normal reception mode. Now, the microcontroller 144 continuously receives bytes that are made of a start bit 164, eight data bits with the value 0xF7 and a stop bit 166. If the microcontroller 144 receives the byte with the value 0xF7, it discards these bytes and continues to receive.

If the microcontroller 144 has detected a real start bit 164 in the second step of the peeking method, the microcontroller 144 will receive a 0xFF byte—and discard the same—prior to receiving the data.

If the microcontroller 144 has detected a pseudo start bit 164' in the second step of the peeking method, the continuous byte reception ends four symbols before the start bit 164. Since these four symbols are 1-symbols, the microcontroller will correctly synchronize to the start bit 164 of the data, as described in section 1.4.

A 0xB7 byte may be transmitted as a first data byte. Thus, the microcontroller 144 may safely distinguish the beginning of the data from the 0xF7 and/or 0xFF bytes of the wake-up sequence 160.

The distinguishability of the wake-up sequence 160 from the data block allows a wake-up sequence to be transmitted prior to each transmission.

In embodiments, transmission of a wake-up sequence 160 according to FIG. 6 is carried out.

In embodiments, the wake-up sequence 160 includes one or several bytes with the value 0xF7, containing a pseudo start bit 164' and resulting in the same reception byte in an offset reception (i.e. start at the pseudo start bit 164').

In embodiments, the last byte of the wake-up sequence 160 comprises the value 0xFF in order to allow a correct detection of the start bit 164 of the first data in an offset reception.

In embodiments, the peeking method is a multi-stage peeking method (e.g. according to the above-described steps) in order to set the microcontroller 144 as quickly as possible into the energy-saving mode if a real signal 130 is not transmitted.

1.6 Partially Suppressing the Transmission of the Wake-Up Sequence

In principle, transmitting a wake-up sequence 160 prior to a data transmission is inefficient, in particular with small amounts of data of only a few bytes. However, the transmission of the wake-up sequence 160 ensures that the power consumption may be significantly reduced with the method described in section 1.5.

There are several approaches to avoid transmitting a wake-up sequence in some transmissions.

First approach. If a device 120, e.g. a controller, is not powered by a battery, but via USB, for example, there is no need to significantly optimize its power consumption. However, since the transmission of a wake-up sequence 106 to transmit data from the other device 140 to the controller 120 would consume power in the battery-operated other device 140, the system 110 is operated in an unbalanced manner: The controller 120 will continuously remain in the mode of "receiving a byte" (cf. section 1.5, third step of the peeking method). The other device 140 does not transmit a wake-up sequence 160.

Second approach. After receiving the last byte of a transmission, the other device stays in the mode of "receiving a byte" (cf. section 1.5, third step of the peeking method) for a defined period of time X. If the controller 120 receives from the other device a response to a transmission (e.g. a write confirmation or requested parameter values), the controller 120 knows that the node will only be in the mode of "receiving a byte" for the defined period of time. If there is a new communication from the controller 120 to the other device 140 within the period of time Y, the controller 120 does not transmit a wake-up sequence 160. Since the clocks of the controller 120 and the other device 140 may be slightly different due to quartz tolerances, the period of time Y will be selected to be slightly smaller than X. This avoids that the controller 120 transmits data although the other device is in the energy-saving mode. However, this also means that the controller 120 possibly transmits a wake-up sequence within a short time range although the other device is still in the mode of "receiving a byte". However, as described in section 1.5, this is not relevant since the other device 140 may distinguish a wake-up sequence 160 from a start of a data transmission, and discards the same in any case.

Third approach. If a low latency is desired for a certain amount of time for the communication between the controller 120 and the other device 140, the controller 120 transmits, if there is no communication from the other device 140 to the controller 120 for a period of time Y, a special ping data packet which the other device 140 responds to with a special pong packet. Thus, data is transmitted from the other device 140 to the controller 120 and a new period of time Y is opened up.

In embodiments, the wake-up sequence 160 may be transmitted prior to any data.

In embodiments, the wake-up sequence 160 is not always transmitted, but only when the other device is expected to be in the power-saving mode.

In embodiments, the other device 140 may be prevented from switching into the power-saving mode, if necessary.

1.7 0xFF Preamble Byte in the Transmission without Wake-Up Sequence

If another device according to section 1.4 is operated in an environment without large interference signals or noise, or if the comparator described in section 1.3 comprises a large hysteresis, in case there is no transmission from a user terminal device 120 (controller) to another device 140 (node), there are no edges at the timer/capture input (e.g. input of a capture/compare module in the capture mode) of the microcontroller 144 of the other device 140. In this scenario, a soon as the user terminal device 120 transmits data, the other device 140 may correctly decode the transmitted bytes with the aid of the embodiments described in section 1.4.

If an amplifier is connected in front of the comparator, as is exemplarily described in section 2.4, or there are further signals that lead even without transmissions to edges at the timer/capture input of the microcontroller 144 of the other device 140, the other device 140 may incorrectly detect the start of a byte transmission in the random signal. This continuously leads to the fact that the other device 140 misses the actual start of a transmission and at least the first byte(s) are decoded incorrectly. This is illustrated in FIG. 7a.

Figure 7A:
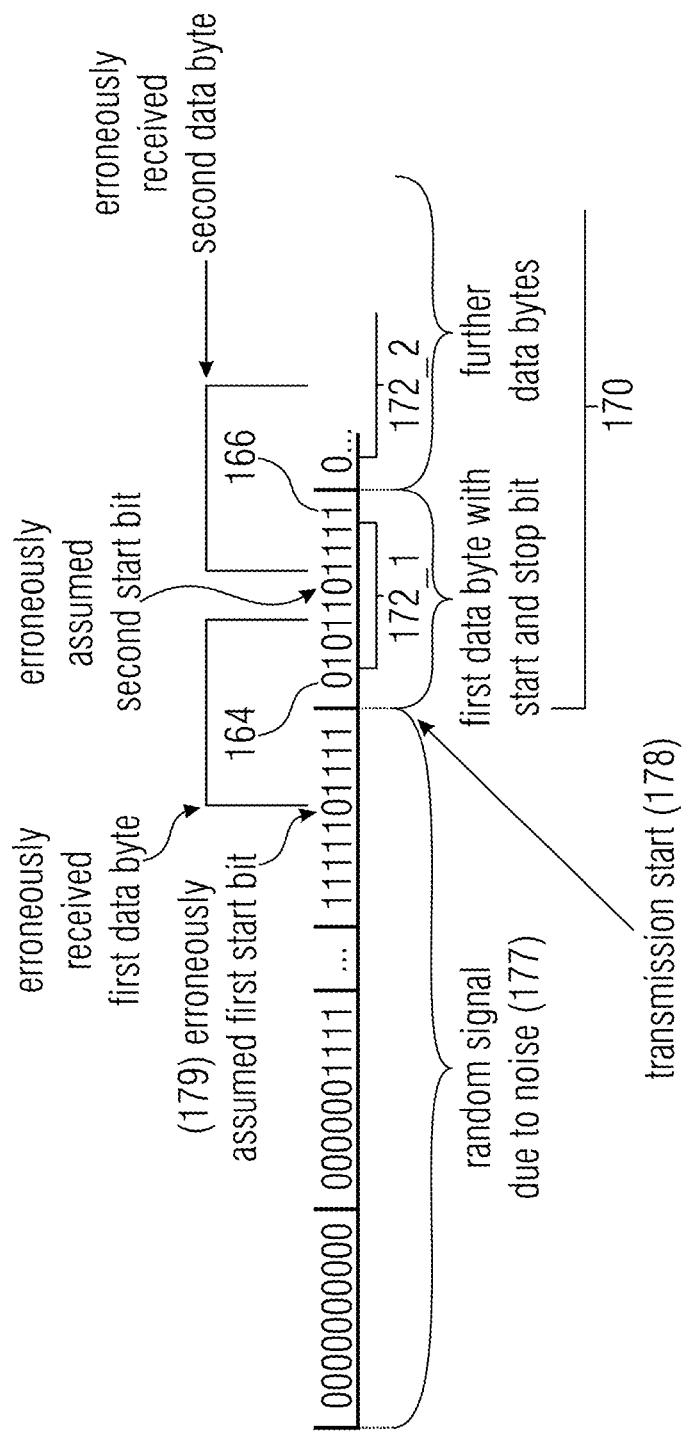
FIG. 7a shows a schematic view of a bit sequence of the data to be transmitted to the other device, wherein the bit sequence is preceded by several bits caused by a random signal or noise.

In detail, FIG. 7a shows a schematic view of a bit sequence 170 of the data to be transmitted to the other device 140, wherein the bit sequence comprises the groups 172_1-172_2 of several data bits, each being preceded by a start bit 164 and each having attached thereto a stop bit 166, wherein the bit sequence is preceded by several bits 177 caused by a random signal or noise. In other words, FIG. 7a shows a possibly faulty byte synchronization without a 0xFF preamble byte.

The transmission from the user terminal device 120 starts at point 178 ("start of the transmission). Since the other device 140 has already found an incorrect start bit 179 ("incorrectly assumed first start bit"), the start bit of the first byte 172_1 (and possibly also that of further bytes 172_2) is missed. The microcontroller 144 is not byte-synchronous and receives incorrect data.

Figure 7B:
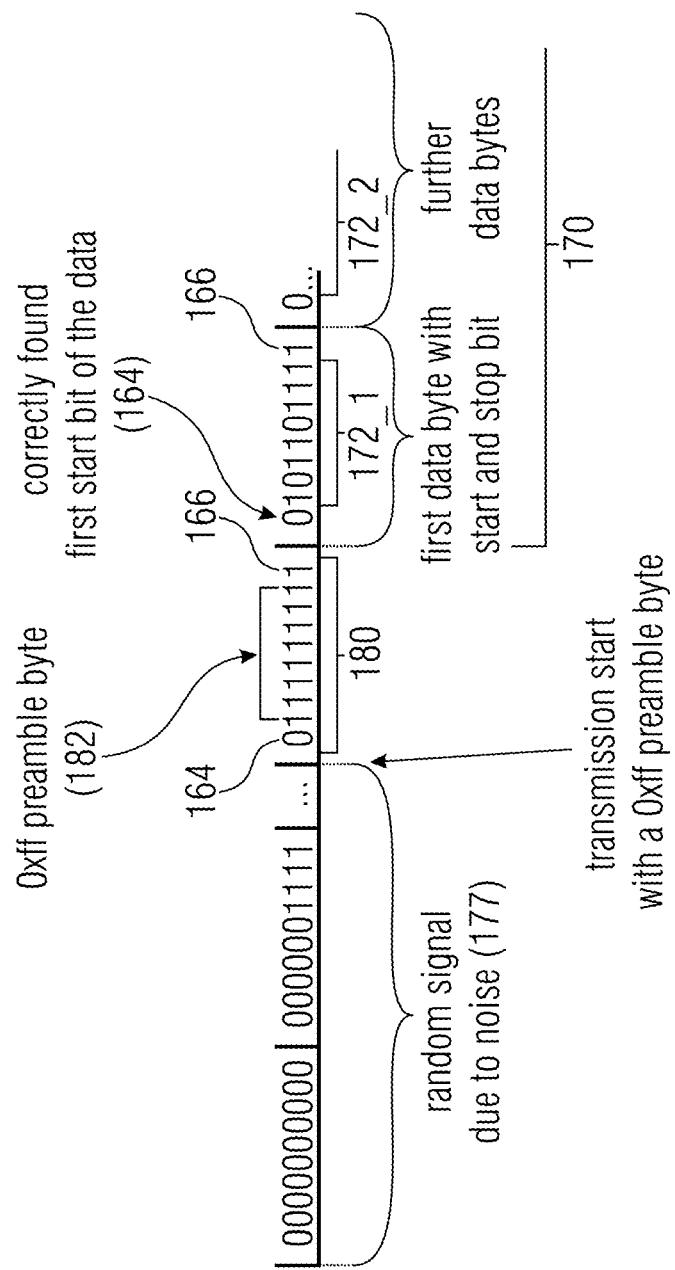
FIG. 7b shows a schematic view of a bit sequence of the data to be transmitted to the other device, wherein a preamble bit sequence is placed in front of the bit sequence, and wherein the preamble bit sequence is preceded by several bits caused by a random signal or noise.

The method according to FIG. 7b solves this problem by transmitting a 0xFF preamble byte (or alternatively nine 1-symbols) prior to the transmission of the start bit 164 of the first byte 172_1 to be transmitted.

In detail, FIG. 7b shows a schematic view of a bit sequence 170 of the data to be transmitted to the other device 140, wherein the bit sequence comprises the groups 172_1-

172_2 of several data bits each being preceded by a start bit 164 and each having attached thereto a stop bit 166, wherein the bit sequence 170 is preceded by a preamble bit sequence 180, and wherein the preamble bit sequence 180 is preceded by several bits 177 caused by a random signal or noise.

As can be seen in FIG. 7b, the preamble bit sequence 180 may comprise a group 182 of several preamble bits (e.g. 8 preamble bits) each being preceded by a start bit 164 and at least one stop bit 166. The group 182 of several preamble bits may correspond to one byte with the value 0xFF. Thus, the preamble bit sequence includes a start bit 164 and nine stop bits 166 following the start bit 164.

Even if the other device 140 incorrectly detects a start bit in a range without transmission, the associated incorrectly started byte reception of the other device 140 ends within the preamble byte 182. Since the same does not comprise any further 0-symbols, the first following 0-symbol is the start byte 164 of the first data byte 172_1 which has therefore been correctly found and which allows for the first data bit 172_1 to be received correctly. Thus, the method only works for preamble symbols having at least nine 1-symbols before the start bit of the first data byte.

In embodiments, a 0xFF preamble byte may be used.

In embodiments, at least nine 1-preamble symbols may be used prior to the transmission of the first start bit 164 of the first data byte 172_1.

1.8 No Need for Tuning Due to Transmitting on Different Frequencies

If a user terminal device such a mobile telephone is used as the device 120, it has sufficient computing power and may distribute the audio signal 124 output via the built-in loudspeaker 126 across a larger frequency range in order to be able to address another device 140 with a poorly tuned, or de-tuned, electromagnetic resonant circuit 142 in a better (e.g. optimum) manner. To this end, the transmission signal (FSK-modulated magnetic signal 130) may be radiated repeatedly, or advantageously simultaneously, on several different carrier frequencies. The actually required signal (e.g. FSK, MSK or GMSK) becomes a multi-signal (multicarrier) with offset subcarriers, so to speak. This allows the other device 140 to be able to receive the transmission signal (e.g. FSK-, MSK- or GMSK-modulated magnetic signal 130) even in the case in which its electromagnetic resonant circuit 142 is poorly tuned or not re-tuned. In the best case, the overall tuning algorithm and the additionally needed components may be omitted.

If unambiguous identifiers within the data symbols (header bits) are used for the transmission signals on the different sub-carriers, they may be used by the other device 140 in order to improve the internal tuning, or tracking of the tuning, of the electromagnetic resonant circuit 142, since the other device 140 may then associate the effectively strongest (and therefore selected) transmission frequency with the current resonance frequency of the electromagnetic resonant circuit 142. The other device 140 may then tune the electromagnetic resonant circuit 142 upwards or downwards in order to be able to receive in a more ideal manner next time. For example, this would be needed if there were other transmission stations that do not have a broadband loudspeaker to generate signals, but are only coupled in via a resonant circuit as well.

In addition, the further device may store the transmission signal received and encoded via symbols/bits and may transfer the same to a central database via one of the described methods for return communication. There, the associated resonant circuit frequency is stored per other device 140 (e.g. sensor node) in order to, when re-addressing this other device 140, directly adjust the transmission signal to its resonance frequency.

Embodiments have the advantage that addressing the other device 140 is possible even though the electromagnetic resonant circuit 142 of the other device 140 is not tuned correctly.

Embodiments have the advantage that addressing the other device 140 is possible even though the electromagnetic resonant circuit 142 of the other device 140 is not tunable.

In embodiments, transmitting a transmission signal offset in frequency takes place via a broadband transmission device 120 such as a mobile telephone having a loudspeaker.

In embodiments, a feedback of the received transmission frequency (or its identifier) to the device 120 (e.g. controller) is carried out by the other device 140.

In embodiments, a narrowband controller, e.g. which does not comprise a loudspeaker but an electromagnetic resonant circuit, may return in a manner adapted to the other device 140 (e.g. adjustable across a few tuning steps).

2. Tuning the Electromagnetic Resonant Circuit

Figure 8:
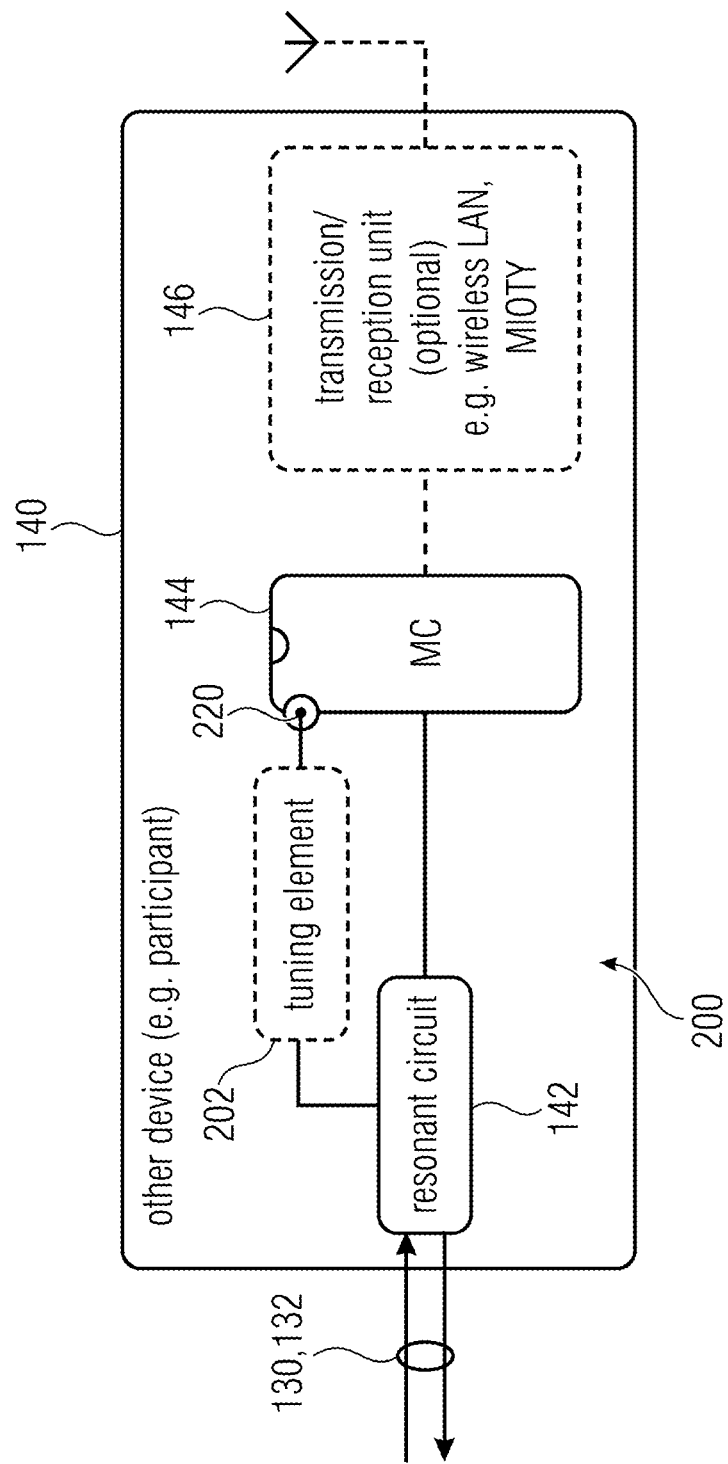
FIG. 8 shows a schematic block circuit diagram of the other device according to an embodiment of the present invention.

FIG. 8 shows a schematic block circuit diagram of the other device 140 according to an embodiment of the present invention.

The other device 140 may comprise a microcontroller 144 and a configuration interface 200, wherein the configuration interface 200 includes an electromagnetic resonant circuit 142 connected to the microcontroller 144, configured to detect and/or to generate a magnetic signal 130, 132 comprising data to be transmitted to and/or from the other device 140.

In embodiments, the microcontroller 144 may be connected to at least one tuning element 202 for tuning the electromagnetic resonant circuit 142, wherein the microcontroller 144 may be configured to switch at least one pin 220 (e.g. an input/output pin) of the microcontroller 144, connected to the at least one tuning element 202, to one of several different operating modes in order to tune the electromagnetic resonant circuit 142.

In embodiments, the several different operating modes may be at least two of a high-impedance input mode, a pull-up input mode and an output mode in which a reference potential (e.g. ground) or a supply potential (e.g. Vcc) is provided at the respective pin.

For example, the microcontroller 144 may be configured to switch the at least on pin 220 between at least two of the several different operating modes in order to tune the electromagnetic resonant circuit.

In embodiments, the at least one tuning element 202 may be connected to the electromagnetic resonant circuit 142 and is exemplarily shown in FIG. 8. Alternatively (or additionally), the at least on tuning element may also be part of the electromagnetic resonant circuit 142. For example, the electromagnetic resonant circuit 142 may comprise a coil and one or several capacitors, wherein the one capacitor or at least one of the several capacitors may be used as the at least one tuning element.

In embodiments, the microcontroller 144 may be configured to tune the electromagnetic resonant circuit 142 as a function of a carrier frequency of the magnetic signal 130, 132 to be detected and/or to be generated. For example, the microcontroller may be configured to tune a resonance frequency of the electromagnetic resonant circuit and the carrier frequency of the magnetic signal to be detected and/or to be generated with respect to each other, as is described above in detail in section 1.

As can be seen in FIG. 8, in embodiments, the other device 140 may be a participant of a communication system. In this case, the other device may comprise a radio interface 146, as is described above with respect to FIGS. 2a to 2c.

In the following, detailed embodiments of the other device 140 are described.

The embodiments described in the following concern the components involved in the transmission of the data to and/or from the other device 140 via simple magnetic coupling at low frequencies. As described above, this may be used to configure the other device 140 (e.g. IoT node or WLAN camera).

As the other device 140 is very price sensitive, e.g. especially when used in the IoT environment, simple circuits are advantageous. Haptic interfaces such as switches and buttons are often too large and too expensive for these devices 140. Complex radio interfaces for the configuration, such as infrared and Bluetooth, are also too complex. For this reason, the data transmission via magnetic coupling at low frequencies described with respect to FIGS. 2a to 2c is used, wherein the magnetic signal 130 is either generated via a loudspeaker 126 of the user terminal device 120 (cf. FIG. 2a) or an electromagnetic resonant circuit 127 connected to the user terminal device 120 (cf. FIGS. 2b and 2c).

As mentioned above, the magnetic field is received with a simple electromagnetic resonant circuit 142 of the other device, which allows the same to be configured in an inexpensive and energy-efficient manner. For example, the transmission takes place in the ultrasound range (16-20 kHz). This allows reception even with inexpensive microcontrollers by means of direct measurements of period of oscillations, as was described in detail in section 1.

2.1 Tuning the Resonant Circuit by Input/Output Setting Ports of the Microcontroller With magnetic coupling, the electromagnetic resonant circuit 142 serves as an antenna. As with any antenna, it is advantageous if the resonant circuit frequency (resonance frequency of the electromagnetic resonant circuit 142) matches the carrier frequency of the magnetic signal 130, 132. In addition, it is advantageous if the electromagnetic resonant circuit 142 is frequency-selective since less interference frequencies are received in this way. This is difficult to realize with inexpensive standard components since these have a high component variance. Thus, the resonant circuit has to be tuned individually.

Figure 9:
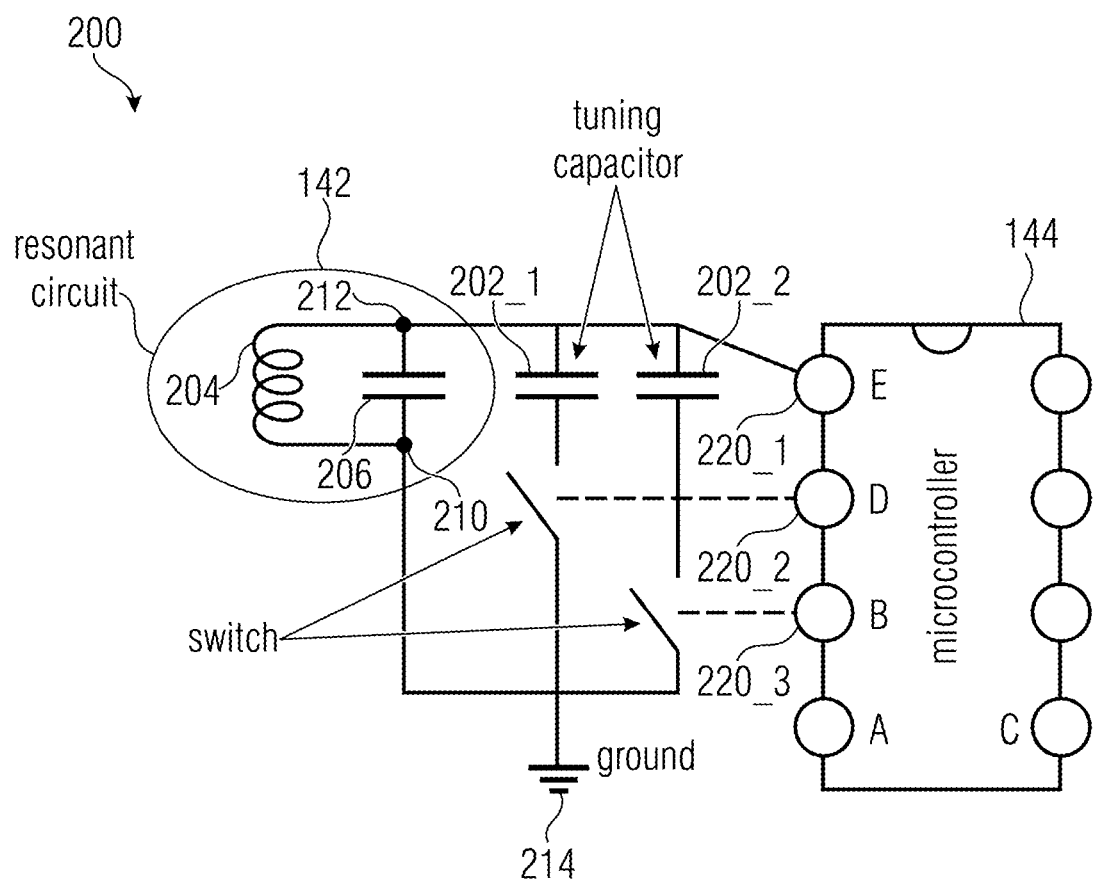
FIG. 9 shows a schematic block circuit diagram of the other device according to an embodiment of the present invention.

FIG. 9 shows a schematic block circuit diagram of the other device 140 according to an embodiment of the present invention. The other device 140 includes the microcontroller 144 and the configuration interface 200 with the electromagnetic resonant circuit 142.

As can be seen in FIG. 9, the electromagnetic resonant circuit 142 may include a first coil 204 and a first capacitor 206. The first coil 204 and the first capacitor 206 may be connected in parallel between a first terminal 210 and a second terminal 212 of the electromagnetic resonant circuit 142.

The first terminal 210 of the electromagnetic resonant circuit 142 may be switched to a reference potential 214 (e.g. ground), whereas the second terminal 212 of the electromagnetic resonant circuit 142 may be connected to a first pin 220_1 (e.g. pin E) of the microcontroller 144.

Tuning capacitors 202_1 and 202_2 may be connected in series between the first terminal 212 of the electromagnetic resonant circuit 142 and the reference potential 214 via controllable switches in order to tune the electromagnetic resonant circuit 142. The controllable switches may be controlled via pins 220_2 and 220_3 (e.g. pins B and D) of the microcontroller 144, for example.

In other words, FIG. 9 illustrates an exemplary structure of a resonant circuit 142 with the possibility for tuning. The resonant circuit 142 comprises one or several coils 204 and one or several capacitors 206. Conventionally, further capacitors 202_1 and 202_2 or coils are connected into the resonant circuit 142 for tuning. Usually, this is done via electronic switches, e.g. transistors. For example, these are switched via the outputs of the microcontroller 144.

Figure 10:
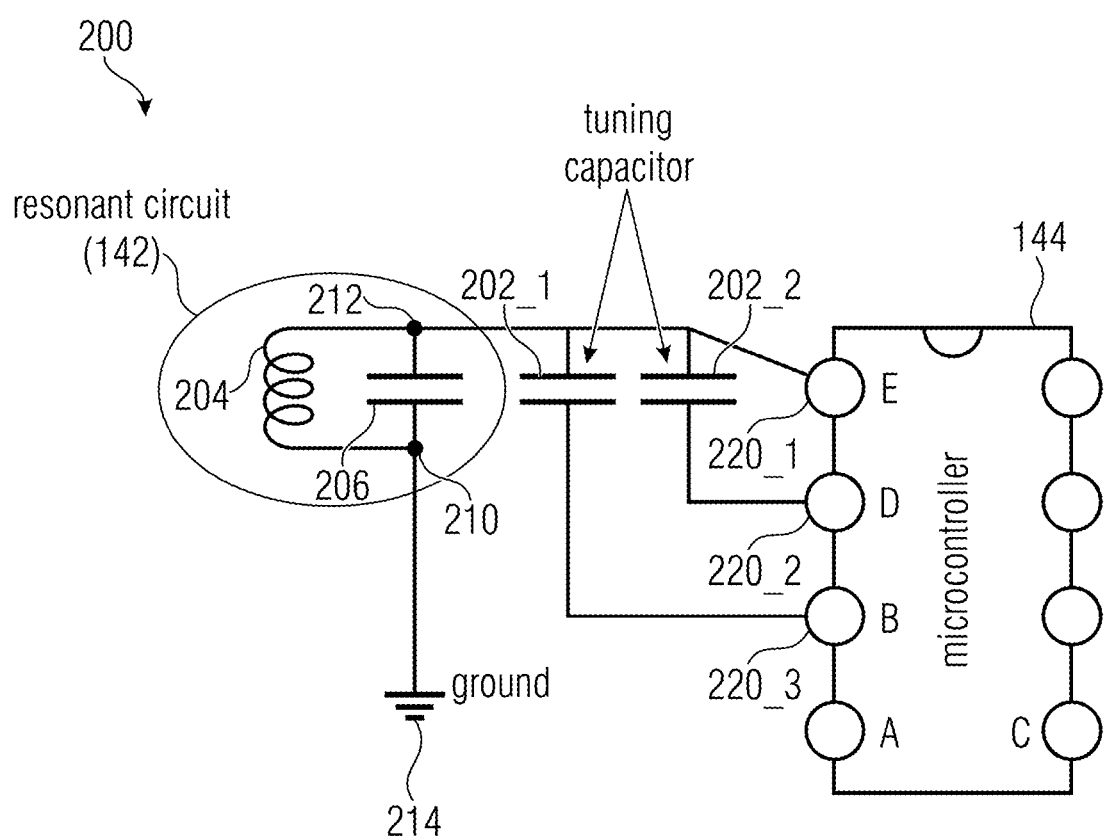
FIG. 10 shows a schematic block circuit diagram of the other device according to a further embodiment of the present invention.

FIG. 10 shows a schematic block circuit diagram of the other device 140 according to an embodiment of the present invention. The other device 140 includes the microcontroller 144 and the configuration interface 200 with the electromagnetic resonant circuit 142.

The electromagnetic resonant circuit 142 may comprise a first coil 204 and a first capacitor 206, which may be connected in parallel between a first terminal 210 and a second terminal 212 of the electromagnetic resonant circuit 142.

The first terminal 210 of the electromagnetic resonant circuit 142 may be switched to a reference potential 214 (e.g. ground), whereas a second terminal 212 of the electromagnetic resonant circuit 142 may be connected to a first pin 220_1 (e.g. pin E) of the microcontroller 144 so that the electromagnetic resonant circuit 142 is connected in series between the first pin (e.g. pin E) of the microcontroller 144 and a reference potential terminal 214 (e.g. ground terminal).

A first tuning capacitor 202_1 may be connected between the second terminal 212 of the electromagnetic resonant circuit 142 and a second pin 220_2 (e.g. pin D) of the microcontroller 144, whereas a second tuning capacitor 202_2 may be connected between the second terminal 212 of the electromagnetic resonant circuit 142 and a third pin 220_3 (e.g. pin B) of the microcontroller 144.

The microcontroller 144 may be configured to switch the first pin 220_1 (e.g. pin D) and the second pin 220_2 (e.g. pin B) to one of several different operating modes, respectively, in order to tune the electromagnetic resonant circuit 142.

For example, the microcontroller 144 may be configured to tune the electromagnetic resonant circuit 142 by switching the first pin 220_1 (e.g. pin D) and the second pin 220_2 (e.g. pin B) to one of the following different operating modes, respectively:
a high-impedance input mode, and
an output mode in which a reference potential (e.g. ground) is provided at the respective pin.

In other words, FIG. 10 illustrates a resonant circuit 142 having the same components as the resonant circuit 142 shown in FIG. 9. However, there is no need for external switches.

This works by having electronic switches that switch the capacitors 202_1 and 202_2 between high-impedance and connection to ground. This is also possible with each microcontroller pin. If the same is configured as an input, it is of high-impedance. If it is configured as an output, it connects the capacitors with Vcc or ground.

Embodiments have the advantage that there is no need for external electronic switches.

Embodiments have the advantage of being able to achieve a higher number of tuning states than capacitors and switches.

In embodiments, tuning capacitors 202_1 and 202_2 may be directly connected to the microcontroller 144.

In embodiments, the tuning capacitors 202_1 and 202_2 may be switched (to ground) by setting the microcontroller pins to input or output, respectively.

2.2 Tuning by Voltage-Dependency of Capacitors

In order to actively tune resonant circuits 142, varicap diodes are known from the literature [12]. However, these are relatively expensive. By exploiting the parasitic effect of the voltage dependency of inexpensive capacitors [13], [14], tuning may be carried out by simple means via the voltage Ua, as is illustrated in FIG. 11.

Figure 11:
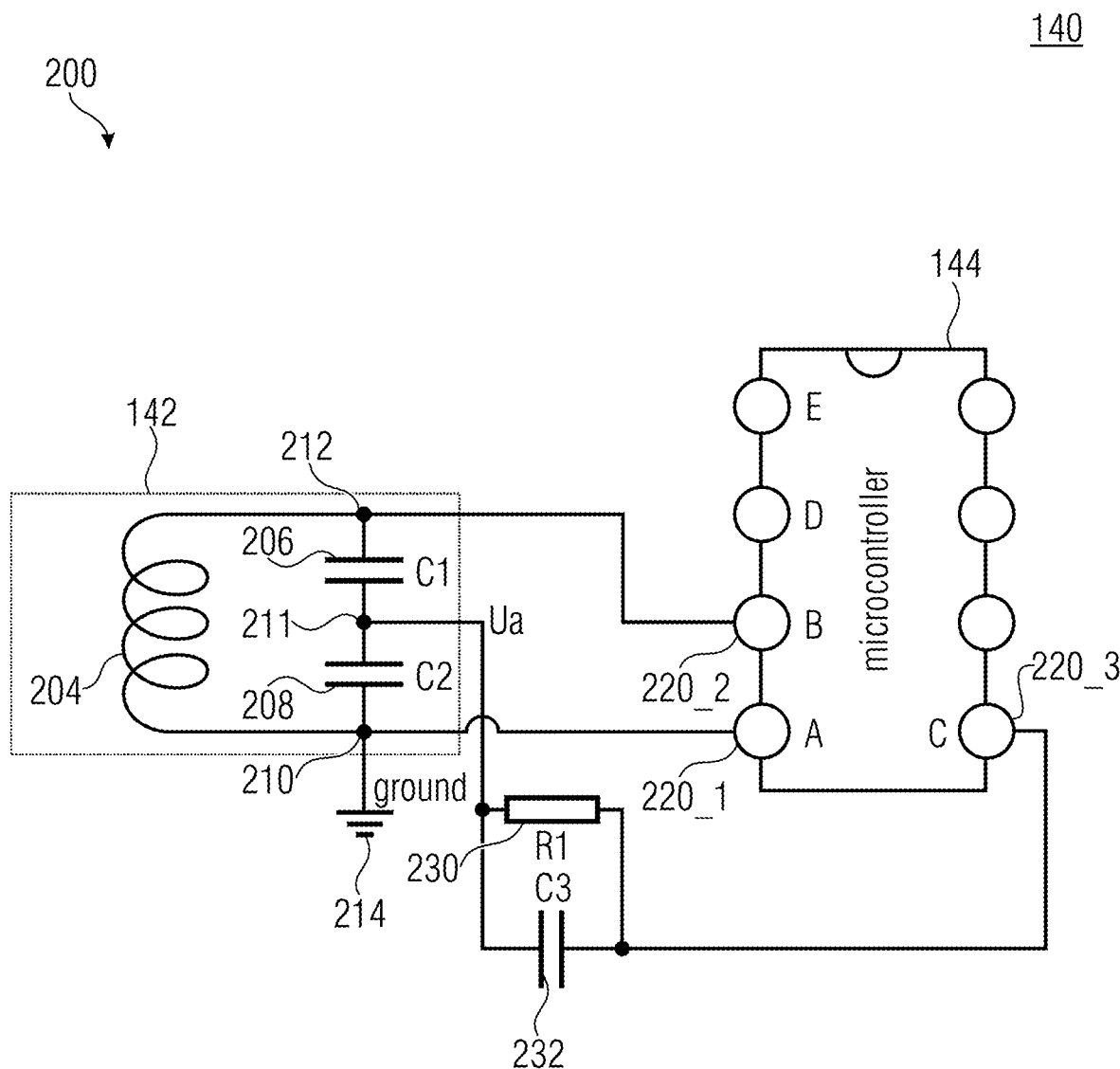
FIG. 11 shows a schematic block circuit diagram of the other device according to a further embodiment of the present invention.

FIG. 11 shows a schematic block circuit diagram of the other device 140 according to a further embodiment of the present invention. The other device 140 includes the microcontroller 144 and the configuration interface 200 with the electromagnetic resonant circuit 142.

The electromagnetic resonant circuit 142 may comprise a first coil 204 and two capacitors 206 and 208 connected in series (e.g. a first capacitor 206 (e.g. C1) and a second capacitor 208 (e.g. C2)). The first coil 204 and the two capacitors 206 and 208 connected in series may be connected in parallel between a first terminal 210 and a second terminal 212 of the electromagnetic resonant circuit 142.

The first terminal 210 of the e electromagnetic resonant circuit 142 may be connected to a first pin 220_1 (e.g. pin A) of the microcontroller 144, whereas a second terminal 212 of the electromagnetic resonant circuit 142 may be connected to a second pin 220_2 (e.g. pin B) of the microcontroller 144 so that the electromagnetic resonant circuit 142 may be connected in series between the first pin 220_1 (e.g. pin A) of the microcontroller 144 and the second pin 220_2 (e.g. pin B) of the microcontroller 144. The first terminal 210 of the electromagnetic resonant circuit 142 may further be connected to a reference potential terminal 214 (e.g. ground terminal).

A terminal 211 between the two capacitors 206 and 208 connected in series (e.g. C1 and C2) may be connected to a third pin 220_3 (e.g. pin C) of the microcontroller 144. For example, the terminal 211 between the two capacitors 206 and 208 connected in series (e.g. C1 and C2) may be connected to the third pin 220_3 (e.g. pin C) of the microcontroller via a first resistor 230 (e.g. R1) and a third capacitor 232 (e.g. C3) connected in parallel to the first resistor 230 (e.g. R1), as can be seen in FIG. 11. Alternatively, the terminal 211 between the two capacitors 206 and 208 connected in series (e.g. C1 and C2) may be connected to the third pin 220_3 (e.g. pin C) of the microcontroller solely via the first resistor 230 (e.g. R1).

In the embodiment shown in FIG. 11, a voltage dependency of the capacitances of the two capacitors 206 and 208 connected in series (e.g. C1 and C2) may be used as the at least one tuning element.

Accordingly, the microcontroller 144 may be configured to switch the third pin 220_3 (e.g. pin C) to one of several different operating modes in order to tune the electromagnetic resonant circuit 142.

For example, the microcontroller 144 may be configured to tune the electromagnetic resonant circuit 142 by:

switching the third pin 220_3 (e.g. pin C), for a defined time T, from an output mode in which a reference potential (e.g. ground) is provided at the respective pin to a pull-up input mode or an output mode in which a supply potential is provided at the respective pin, and switching the third pin, after the defined time T, into a high-impedance input mode.

Here, the microcontroller 144 may be configured to adaptively adapt the defined time T (e.g. as a function of a target resonance frequency of the electromagnetic resonant circuit 142 or a carrier frequency of the magnetic signal 130) in order to tune the electromagnetic resonant circuit 142.

In embodiments, the other device 140 may be switchable between different operating modes such as a (normal) reception mode and a transmission mode.

Here, the microcontroller 144 may be configured to tune, in the reception mode, the electromagnetic resonant circuit 142 prior to detecting the magnetic signal 130, and to detect, after tuning the electromagnetic resonant circuit 142, the magnetic signal 130 with the electromagnetic resonant circuit 142.

In addition, the microcontroller 144 may be configured to switch, in the reception mode, the first pin 220_1 (e.g. pin A) and the second pin 220_2 (e.g. pin B) to a comparator input mode in order to evaluate the signal (reception signal) provided by the electromagnetic resonant circuit.

In the transmission mode, the microcontroller 144 may switch the third pin 220_3 (e.g. pin C) to a PWM output mode in which a PWM signal is provided at the respective pin in order to generate a magnetic signal 132 with the electromagnetic resonant circuit 142.

Here, the microcontroller may be configured to tune, in the transmission mode, the electromagnetic resonant circuit 142 by setting a pulse-width ratio of the PWM signal, and to modulate the data to be transmitted by the other device 140 by changing a pulse duration of the PWM signal.

In other words, FIG. 11 shows a circuit diagram of a resonant circuit 142 with the possibility for tuning via parasitic effects of the capacitors 206 and 208 (e.g. C1 and C2). For logical reasons, the capacitors 206 and 208 (e.g. C1 and C2) may be selected to have the same size. If a voltage Ua unequal 0 V is applied between the capacitors 206 and 208, the capacitance of both capacitors 206 and 208 decreases due to the negative capacitance coefficients at an increasing voltage Ua, and the resonance frequency of the electromagnetic resonant circuit increases.

The voltage Ua may be set as is described in the following. Before switching into an energy-saving mode (cf. section 1), the third pin 220_3 (e.g. pin C) is set to ground. After switching into the reception mode, a positive voltage Ua is output for a defined time T at the third pin 220_3 (e.g. pin C). The capacitors 206 and 208 (e.g. C1 and C2) are charged according to the exponential function of the capacitor charging curve. After the time T, the third pin 220_3 (e.g. pin C) is switched to input (i.e. high-impedance). Thus, the capacitors 206 and 208 (e.g. C1 and C2) hold the adjusted voltage Ua for a certain time. It is still possible to introduce a third capacitor 232 (e.g. C3). In addition to charging via the first resistor 230 (e.g. R2) the same may be used for a pulse-width modulation (PWM). The additional charging effect of the capacitors 206 and 208 (e.g. C1 and C2) may be compensated by the third capacitor 232 (e.g. C3) if, prior to switching the third pin 220_3 (e.g. pin C) to input (i.e. high-impedance), the voltage is again briefly switched to 0 V.

The ideal voltage Ua may be determined by measuring the resonance frequency (for method, cf. section 2.5). By measuring the resonance frequency with the setting Ua=0 and Ua=Vcc (supply voltage of the microcontroller), the tuning range may be determined, and therefore the correctly needed tuning voltage through interpolation.

By additionally measuring the resonance frequency at a defined time T, the tuning voltage Ua may be determined more precisely. For example, when using the pull-up input mode for the third pin 220_3 and knowing the size of the two capacitors 206 and 208 connected in series (e.g. C1 and C2), the pull-up current may be determined and the time T for reaching a certain voltage Ua may therefore be calculated.

Embodiments have the advantage of a low price.

In embodiments, the voltage dependency of conventional capacitors may be exploited (e.g. for tuning the electromagnetic resonant circuit).

In embodiments, the same capacitor may be used twice, wherein the voltage Ua is applied at the center point and the other sides are switched to ground. In embodiments, the voltage Ua at the capacitor may be set by charging for a certain time, e.g. via a first resistor 230 (e.g. R1) connected to the third pin 220_3 (e.g. pin C).

In embodiments, one pin may be omitted by additionally using the charging pin as PWM pin.

In embodiments, the ideal tuning point/tuning range may be determined by measuring the resonance frequency at different settings of the voltage Ua.

2.3 BIAS Setting in the Transmission Case

In the circuit according to FIG. 11, the pins 220_1 and 220_2 (e.g. pins A and B) are comparator inputs (cf. section 1.3). The circuit works well for low transmission powers with voltages of up to 0.6 volts at the resonant circuit 142 and therefore at the second pin 220_2 (e.g. pin B). An increasing amplitude of the oscillation results in a clipping effect, as is illustrated in FIG. 12.

Figure 12:
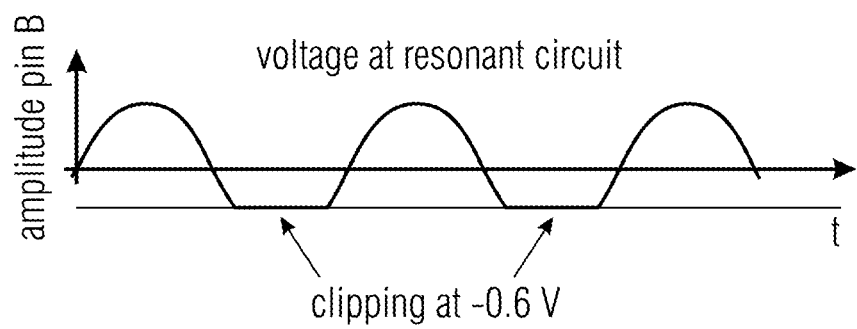
FIG. 12 shows in a diagram a time curve of the voltage at the second pin of the microcontroller at an amplitude of more than 0.6 V, plotted across the time.

In detail, FIG. 12 shows in a diagram a time curve of the voltage at the second pin 220_2 (e.g. pin B) of the microcontroller 144 at an amplitude of more than 0.6 V, applied across the time.

The cause for this effect is the input protective circuit of all digital components, in particular of microcontrollers (cf. [15]).

Voltages below −0.6 V lead to the diode to be conducting. The circuit in FIG. 13 avoids this effect.

Figure 13:
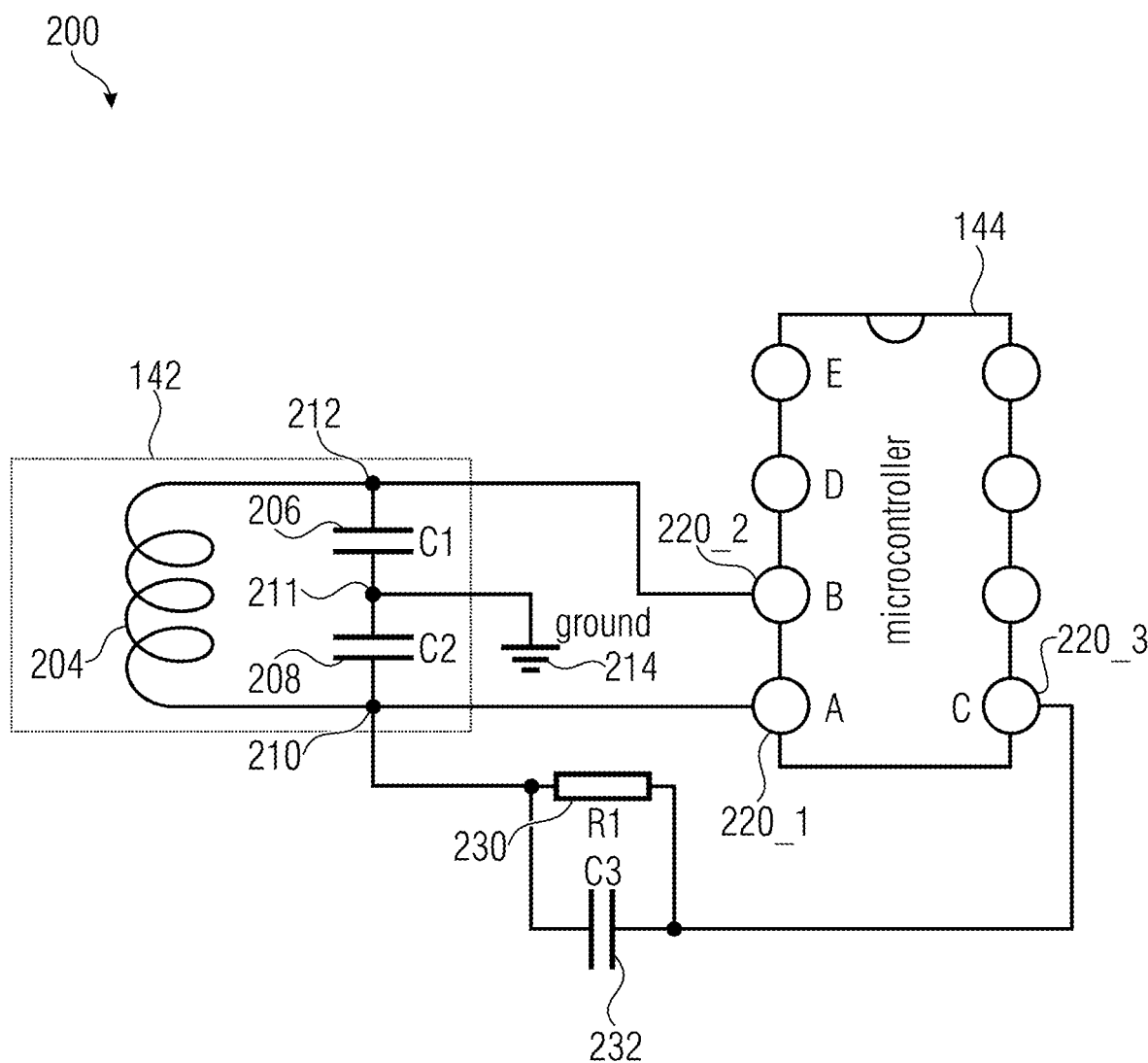
FIG. 13 shows a schematic block circuit diagram of the other device according to a further embodiment of the present invention.

In detail, FIG. 13 shows a schematic block circuit diagram of the other device 140 according to a further embodiment of the present invention. The other device 140 includes the microcontroller 144 and the configuration interface 200 with the electromagnetic resonant circuit 142.

The electromagnetic resonant circuit 142 may comprise a first coil 204 and two capacitors 206 and 208 connected in series (e.g. a first capacitor 206 (e.g. C1) and a second capacitor 208 (e.g. C2)). The first coil 204 and the two capacitors 206 and 208 connected in series may be connected in parallel between a first terminal 210 and a second terminal 212 of the electromagnetic resonant circuit 142.

The first terminal 210 of the electromagnetic resonant circuit 142 may be connected to a first pin 220_1 (e.g. pin A) of the microcontroller 144, whereas a second terminal 212 of the electromagnetic resonant circuit 142 may be connected to a second pin 220_2 (e.g. pin B) of the microcontroller 144 so that the electromagnetic resonant circuit 142 may be connected in series between the first pin 220_1 (e.g. Pin A) of the microcontroller 144 and the second pin 220_2 (e.g. pin B) of the microcontroller 144. A terminal 211 between the two capacitors 206 and 208 connected in series (e.g. C1 and C2) may be connected to a reference potential terminal 214 (e.g. ground terminal).

In addition, the first terminal 210 of the electromagnetic resonant circuit 142 may be connected to a third pin (e.g. pin C) 220_3 of the microcontroller 144. For example, as is shown in FIG. 13, the first terminal 210 may be connected to the third pin 220_3 (e.g. pin C) of the microcontroller 144 via a first resistor 230 (e.g. R1) and a third capacitor 23 (e.g. C3) connected in parallel to the first resistor 230 (e.g. R1). Alternatively, the terminal 211 between the two capacitors 206 and 208 connected in series (e.g. C1 and C2) may be connected to the third pin 220_3 (e.g. pin C) of the microcontroller only via the first resistor 230 (e.g. R1).

In the embodiment shown in FIG. 13, the microcontroller 144 may be configured to charge, prior to generating a magnetic signal with the electromagnetic resonant circuit, the two capacitors 206 and 208 connected in series (e.g. C1 and C2) (e.g. each to half of the supply potential; e.g. Vcc/2) by:

switching the third pin 220_3, for a defined charging time $T_L$, to an output mode in which a supply potential is provided at the respective pin, and switching the third pin, after the defined charging time $T_L$, to a high-impedance input mode.

The microcontroller may further be configured to generate the magnetic signal 132 with the electromagnetic resonant circuit 142 after charging the two capacitors 206 and 208 connected in series (e.g. C1 and C2). To this end, the third pin 220_3 (e.g. pin C) of the microcontroller 144 may be switched into a PWM output mode in order to generate the magnetic signal 132 with the electromagnetic resonant circuit 142.

In other words, FIG. 13 shows a circuit that circumvents the clipping effect. By selectively charging the two capacitors 206 and 208 connected in series (e.g. C1 and C2) of the electromagnetic resonant circuit 142 prior to the transmission, an appropriate BIAS voltage of approximately half the supply voltage at the first capacitor 206 (e.g. C1), or at the second pin 220_2 (e.g. pin B), is set to be equal to the voltage at the second capacitor 208 (e.g. C2), or at the third pin (e.g. pin C).

Thus, the possible clipping-free range of the oscillation amplitude increases from 0.6 V to 0.6 V+Vcc/2.

The circuit shown in FIG. 13 also functions without specifically pre-setting the BIAS. If a clipping effect arises during transmission due to the flyback diode conducting, this applies a charge to the two capacitors 206 and 208 connected in series (e.g. C1 and C2) and an appropriate BIAS will arise.

Figure 14:
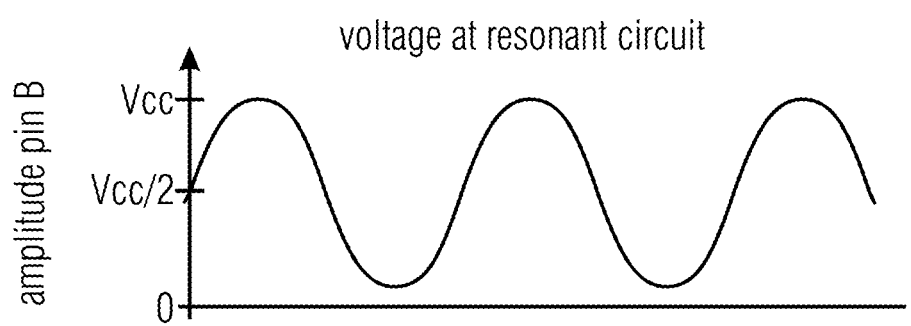
FIG. 14 shows in a diagram a time curve of the voltage at the second pin 220_2 of the microcontroller at an amplitude of more than 0.6 V, plotted across the time.

FIG. 14 shows in a diagram a time curve of the voltage at the second pin 220_2 (e.g. pin B) of the microcontroller 144 at an amplitude of more than 0.6 V, applied across the time.

As can be seen in FIG. 14, transmission without a clipping effect is possible at voltages of up to Vcc/2+0.6 V. Thus, the embodiment shown in FIG. 13 enables an increased oscillation amplitude and therefore a larger range in the transmission case.

Obviously, the circuit described in FIG. 13 may not only be used for generating a magnetic signal 132 (transmission mode), but also for detecting a magnetic signal 130 (reception mode).

In the reception case, the electromagnetic resonant circuit 142 should be advantageously tuned.

To this end, as already described with respect to section 2.2, the voltage dependency of the capacitances of the two capacitors 206 and 208 connected in series (e.g. C1 and C2) may be used as the at least one tuning element. For example, the microcontroller 144 may be configured to tune, in the reception case, prior to detecting the magnetic signal 130 with the electromagnetic resonant circuit 142, the electromagnetic resonant circuit 142 by switching the third pin 220_3 (e.g. pin C) to one of several different operating modes, for example by:

switching the third pin, for a defined time T, from an output mode in which a reference potential (e.g. ground) is provided at the respective pin to a pull-up input mode or an output mode in which a supply potential is provided at the respective pin, and switching the third pin, after the defined time T, into a high-impedance input mode.

Alternatively or additionally, the tuning capacitors 202_1 and 202_2 of section 1.2 may be used for tuning the electromagnetic resonant circuit 142, enabling tuning for the transmission mode and for the reception mode.

2.4 Optimized Receiver Circuit without Comparator Input

Some microcontrollers do not comprise a comparator input. For reasons of cost efficiency, a simple circuit having the following capabilities is desirable:

tuning the resonance frequency,
receiving magnetic signals in an ultrasound frequency range,
transmitting magnetic signals in the ultrasound frequency range, and
energy-saving mode with optimized current consumption when no reception or transmission takes place.

In the following, a circuit having the above capabilities is described based on FIG. 15.

Figure 15:
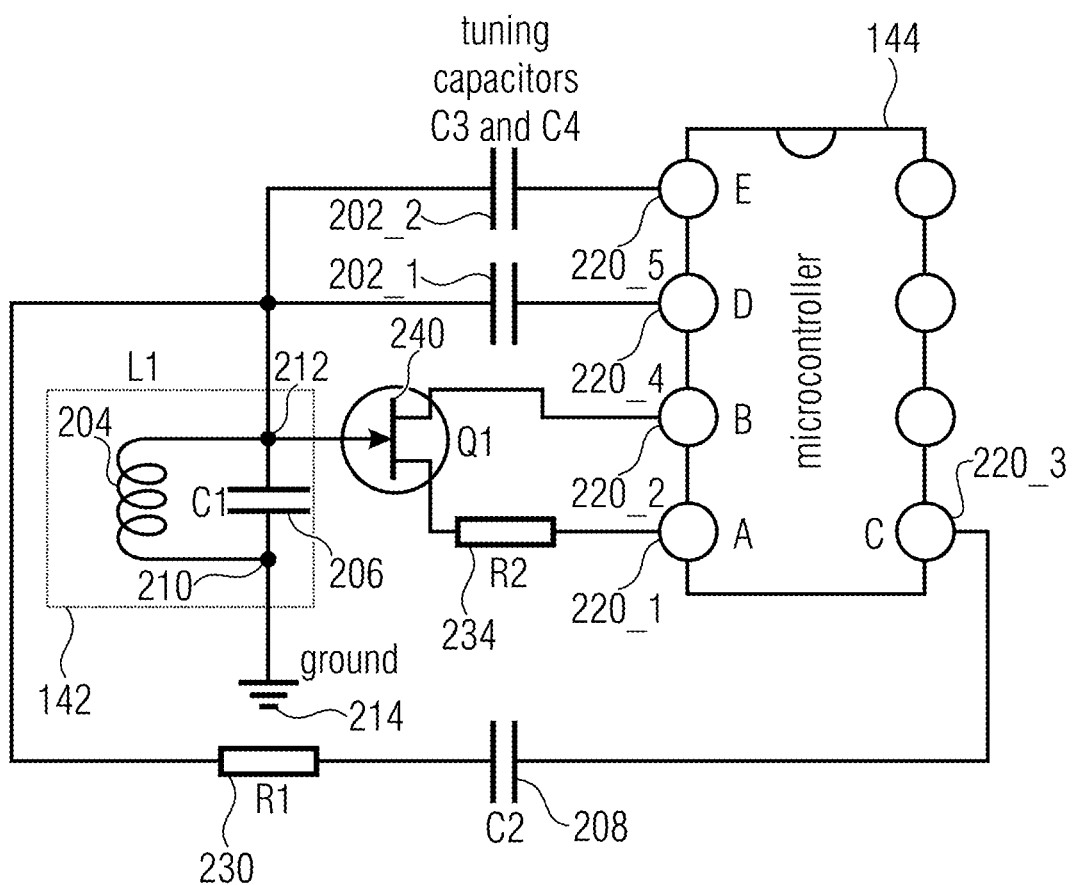
FIG. 15 shows a schematic block circuit diagram of the other device according to a further embodiment of the present invention.

In detail, FIG. 15 shows a schematic block circuit diagram of the other device 140 according to a further embodiment of the present invention. The other device 140 includes the microcontroller 144 and the configuration interface 200 with the electromagnetic resonant circuit 142.

The electromagnetic resonant circuit 142 may comprise a first coil 204 (e.g. L1) and a first capacitor 206 (e.g. C1). The first coil 204 and the first capacitor 206 may be connected in parallel between a first terminal 210 and a second terminal 212 of the electromagnetic resonant circuit 142.

The first terminal of the electromagnetic resonant circuit 142 may be connected to a reference potential terminal 214 (e.g. ground terminal), whereas the second terminal 212 of the electromagnetic resonant circuit 142 may be connected (e.g. directly) to a gate of a transistor 240 (e.g. ECM transistor (ECM=Electret Condenser Microphone)) whose drain terminal is directly connected to a second pin 220_2 (e.g. pin B) of the microcontroller 144. The source terminal of the transistor 240 may be connected to a first pin 220_1 (e.g. pin A) of the microcontroller 144.

As already mentioned in section 1, the other device may be operated in different operating modes. In detail, in an energy-saving mode, a (periodic) wake-up mode (e.g. peeking mode) which checks whether a magnetic signal with a wake-up sequence is received, a normal reception mode.

In embodiments, the microcontroller 144 may be configured to switch the second pin 220_2 (e.g. pin B) to a pull-up input mode only in active phases of the (e.g. periodic) wake-up mode (e.g. and to otherwise switch into the high-impedance input mode) in order to keep the energy consumption as low as possible. Thus, the current supply of the transistor 240 is carried out via the current that is delivered from the microcontroller 144 by the pull-up current source. Here, the first pin 220_1 (e.g. pin C) may be switched to an output mode in which a reference potential (e.g. ground) is provided at the respective pin.

In addition, the microcontroller may be configured to switch, in a normal reception mode, the second pin 220_2 (e.g. pin B) to a pull-up input mode. Here, the first pin 220_1 (e.g. pin C) may be switched to an output mode in which a reference potential (e.g. ground) is provided at the respective pin.

In the energy-saving mode, the microcontroller 144 may switch the second pin 220_2 (e.g. pin B) to a high-impedance input mode.

Thus, the second pin 220_2 (e.g. pin B) is only switched to the pull-up input mode in active phases of the wake-up mode and in the normal reception mode, and is otherwise switched to a high-impedance input mode in order to save energy.

Obviously, the circuit shown in FIG. 15 may also be used for generating a magnetic signal.

To this end, as is shown in FIG. 15, the second terminal 212 of the electromagnetic resonant circuit 142 may be connected to a third pin 220_3 (e.g. pin C) of the microcontroller 144 via a series connection of a first resistor (e.g. R1) and a second capacitor 208 (e.g. C2). Alternatively, the second terminal 212 of the electromagnetic resonant circuit 142 may be connected to the third pin 220_3 (e.g. pin C) of the microcontroller 144 only via the second capacitor 208 (e.g. C2).

Here, the microcontroller 144 may be configured to switch, in the transmission mode, the third pin 220_3 (e.g. pin C) to a PWM output mode. For example, the third pin 220_3 (e.g. pin C) may be a PWM pin or an input/output pin that is switched, in the PWM output mode, between a supply potential (e.g. Vcc) and a reference potential (e.g. ground).

As previously mentioned, the electromagnetic resonant circuit 142 should be advantageously tuned in the reception mode (and also in the (periodic) wake-up mode).

In the reception mode (and also in the (periodic) wake-up mode), the second capacitor 208 (e.g. C2) may be used as the tuning element, for example. Here, the microcontroller 144 may be configured to tune, in the normal reception mode (and also in the (periodic) wake-up mode), the electromagnetic resonant circuit 142 by switching the third pin 220_3 (e.g. pin C) to one of the following different operating modes:

a high-impedance input mode, and
an output mode in which a reference potential (e.g. ground) is provided at the respective pin.

Alternatively or additionally, the tuning capacitors 202_1 and 202_2 of section 1.2 may be used for tuning the electromagnetic resonant circuit 142, enabling tuning for the transmission mode and also for the reception mode. In detail, a third capacitor 202_1 may be connected in series between a second terminal 212 of the electromagnetic resonant circuit 142 and a fourth pin 220_4 (e.g. pin D) of the microcontroller 144, and a fourth capacitor 202_2 may be connected in series between the second terminal 212 of the electromagnetic resonant circuit 142 and a fifth pin 220_5 (e.g. pin E) of the microcontroller 144, wherein the microcontroller 144 may be configured to tune the electromagnetic resonant circuit 142 by switching the fourth pin 220_4 (e.g. pin D9) and the fifth pin 220_5 (e.g. pin E) each to one of the following different operating modes:

a high-impedance input mode, and
an output mode in which a reference potential (e.g. ground) is provided at the respective pin.

In other words, FIG. 15 shows an optimized circuit for RX and TX tuning. It may be used in microcontrollers without comparators. The second pin 220_2 (e.g. pin B) is an input, advantageously of a capture-capable timer (i.e. a timer with a capture function). The third pin 220_3 (e.g. pin C) may be switched to input (i.e. high-impedance) or to output with a low level.

2.4.1 ECM Transistor/BIAS

The core of the circuit is a so-called ECM transistor 240 (Q1, N-channel, JFet e.g. 2SK3230). This type of transistor is developed particularly for the operation of so-called electret microphones. These are JFETs that are usually operated at gate voltage of 0 V. Thus, the first terminal 210 of the electromagnetic resonant circuit 142 may be directly switched to ground 214, whereas the second terminal 212 of the electromagnetic resonant circuit 142 may be directly connected to the gate of the ECM transistor 240. Due to the fact that there is no need for a BIAS voltage, an efficient operation is also possible in a so-called wake-up mode with peeking (spying, eavesdropping). In this case, the microcontroller 144 periodically wakes up and checks whether a signal is present. If a BIAS voltage were to be needed, it may advantageously be stabilized. Capacitors are used to this end. If the BIAS voltage is switched off in order to save power in the energy-saving mode, some time is needed after waking up until the BIAS voltage has again set to an operating value. This increases the current consumption since the microcontroller 144 has to be awake for a longer time.

In embodiments, a ECM transistor, e.g. 2SK3230, whose gate is directly connected to an electromagnetic resonant circuit 142 (resonant frequency in the ultrasound range) having its second terminal connected to ground may be used.

In embodiments, the transistor may be operated in a peeking mode without an additional BIAS voltage.

2.4.2 Supplying the Transistor via a Pull-Up Output of the Microcontroller

In order to save components and to achieve as large an amplification of the ECM transistor 240 as possible, the drain of the transistor 240 may be directly connected to an input pin (second pin 220_2) (e.g. pin B)) of the microcontroller 144. During the reception cycle, this pin may be switched to a pull-up input mode. In this operating mode, the microcontroller 144 switches the respective pin as input and switches on a current source with a low current having the level of the supply voltage. In the energy-saving mode, the second pin 220_2 (e.g. pin B) may be switched to a high-impedance input mode (equivalent to high-Z, i.e. the pin is open). For this reason, a supply current does not flow and the current consumption is optimized.

For the microcontroller input (second pin 220_2 (e.g. pin B)) to be switched between high and low at the lowest possible levels at the electromagnetic resonant circuit 142, the level at the input (second pin 220_2 (e.g. pin B)) of the microcontroller 144, if no signal is received by the electromagnetic resonant circuit 142, should approximately be in the middle of the supply voltage. The ECM transistors 240 usually comprises a so-called RANK. This indicates the range in which the current of the transistor is at a gate voltage of 0 V. This RANK may be selected such that it is in the range of the current of the current source of the microcontroller in the pull-up input mode.

In embodiments, the ECM transistor 240 may be supplied by a pull-up current source of the microcontroller 144.

In embodiments, the pull-up current source may only be switched on in the reception mode.

In embodiments, the ECM transistor may be selected appropriately to the current strength of the pull-up current source through the RANK.

2.4.3 Double Use of the Connection of the PWM Output

In order to save components and installation space, the same electromagnetic resonant circuit 142 (LC resonant circuit) may also be used for transmitting. To this end, a PWM output (e.g. the third pin 220_3 (e.g. pin C)) is connected to the electromagnetic resonant circuit 142 on one side via a second capacitor 208 (e.g. C2) (cf. section 1). In the transmission case, the transmission energy is coupled into the electromagnetic resonant circuit 142 via the second capacitor 208 (e.g. C2). The other side of the electromagnetic resonant circuit 142 may be set to ground. If the first resistor 230 (e.g. R1) is small enough or if the first resistor 230 (e.g. R1) is not present, the PWM output (third pin 220_3 (e.g. pin C)) may either be switched to be open (input) or to ground (output) in the case in which it is not used for the transmission. This makes it possible for the second capacitor 208 (e.g. C2)—in addition to its function as a coupling capacitor for the energy in the transmission case—to serve as a tuning capacitor in the reception case.

In embodiments, the third pin 220_3 (e.g. pin C) of the microcontroller may obtain three functions:
PWM output in the transmission mode,
open in the reception mode, and
closed for tuning the electromagnetic resonant circuit 142.

In embodiments, the second capacitor 208 (e.g. C2) may be used twice:
to couple in energy into the electromagnetic resonant circuit 142 in the transmission mode, and
for tuning in the reception mode.

2.4.4 Switching the Source Pin of the ECM Transistor to be Open

If the source terminal of the transistor 240 (e.g. Q1) is directly connected to the ground, a problem similar to that illustrated in FIG. 12 would arise: All ECM-FETs comprise a PN transition from gate to drain and source (as a principle in JFET transistors). Thus, clipping will again occur in the transmission mode starting from a voltage of 0.6 V at the electromagnetic resonant circuit.

In embodiments, the source terminal of the transistor 240 (e.g. ECM transistor) may therefore be connected to the first pin 220_1 (e.g. pin A) of the microcontroller 144 either directly or via a second resistor 234 (e.g. R2), wherein the microcontroller 144 may be configured to switch, in the normal reception mode or in the wake-up mode, the first pin 220_1 (e.g. pin A) to an output mode in which a reference potential (e.g. ground) is provided at the respective pin, and to switch, in the transmission mode, the first pin 220_1 (e.g. pin A) to a high-impedance input mode.

In other words, the source terminal of the transistor 240 (e.g. Q1) is not connected to the ground, but to a first pin 220_1 (e.g. pin A) of the microcontroller 144 either directly or via a resistor 234, in order to avoid the clipping effect. Prior to the transmission operation, the microcontroller 144 switches the first pin 220_1 (e.g. pin A) to input, i.e. to be of high-impedance. Analogously to section 2.3, this increases the possible clipping-free range from an oscillation amplitude of 0.6 V to 0.6 V+Vcc/2.

In embodiments, the source of the ECM-FETs 240 may be switched to be of high-impedance (through an input/output switch of the microcontroller 144) in the transmission case and may be set in the reception case with a lower impedance to a lower level.

In embodiments, the second pin 220_2 (e.g. pin B) connected to the drain of the transistor 240 may (e.g. additionally) be switched to a pull-up input mode in the reception case and to an impedance input mode in the transmission case.

2.5 Measuring the Resonance Frequency

If, as described in section 2.1, the electromagnetic resonant circuit 142 is to be adapted, it is of advantage to determine the current resonance frequency. After exciting the electromagnetic resonant circuit 142 once, the electromagnetic resonant circuit 142 continues to oscillate at its resonance frequency. Subsequently, this may be measured through evaluating the zero crossings with the aid of a comparator (e.g. of the microcontroller or an external comparator) or with the circuit having the ECM transistor 240. This may be done by switching the connected microcontroller PWM pin (e.g. the third pin 220_3 (e.g. pin C)) or equivalently by transmitting a message (e.g. generating the magnetic signal 132). The measurement may be performed for each combination of tuning capacitors in order to achieve the resonant circuit frequency as exactly as possible.

The built-in quartz on the other device 140 may function as the reference frequency for measuring the resonance frequency.

There are two intelligent possibilities as to when such a measurement is to be performed without disturbing the reception of another message (e.g. detection of a magnetic signal 130):

1. The microcontroller 144 checks in regular intervals (peeking method, cf. section 1) whether a signal is received. If no signal is received, a measurement of the resonance frequency is carried out from time to time by transmitting a test message. If a signal is detected directly after the measurement process, the measurement is discarded since it could have been influenced by the signal.
2. The communication protocol is designed such that, after transmitting a message, there is no direct response, but only with a delay D. Thus, the resonance frequency may be determined directly after each transmitted message through the analysis of the period of oscillation of the decaying and no longer excited electromagnetic resonant circuit 142.

This has the advantage that the resonance frequency may be determined without additional hardware efforts.

In addition, this has the advantage that the resonance frequency may be determined such that reception is not disturbed.

In embodiments, the frequency of the electromagnetic resonant circuit 142 may be measured via direct measurement of the period of oscillation after excitation (of the electromagnetic resonant circuit 142). The excitation does not have to take place on an adapted frequency, since the fact that the electromagnetic resonant circuit 142, after being excited once, continues to oscillate at its resonance frequency may be exploited.

In embodiments, the excitation may be carried out by transmitting a test message directly after unsuccessful peeking.

In embodiments, the excitation may be carried out by transmitting communication messages, wherein the communication protocol used may be defined such that there is a pause after transmitting (e.g. the generation of the magnetic signal 132) before the communication partners respond/transmit (e.g. a magnetic signal 130 is detected).

In embodiments, different combinations of capacitors may be tested after different excitations, wherein the best combination tested may be switched to after the measurement (e.g. of the respective period of oscillations).

2.6 External Comparator—Interrupt Wake-Up

By using an external comparator, an even more power-saving operation is possible than with the above-described peeking method, as is subsequently described based on FIG. 16.

Figure 16:
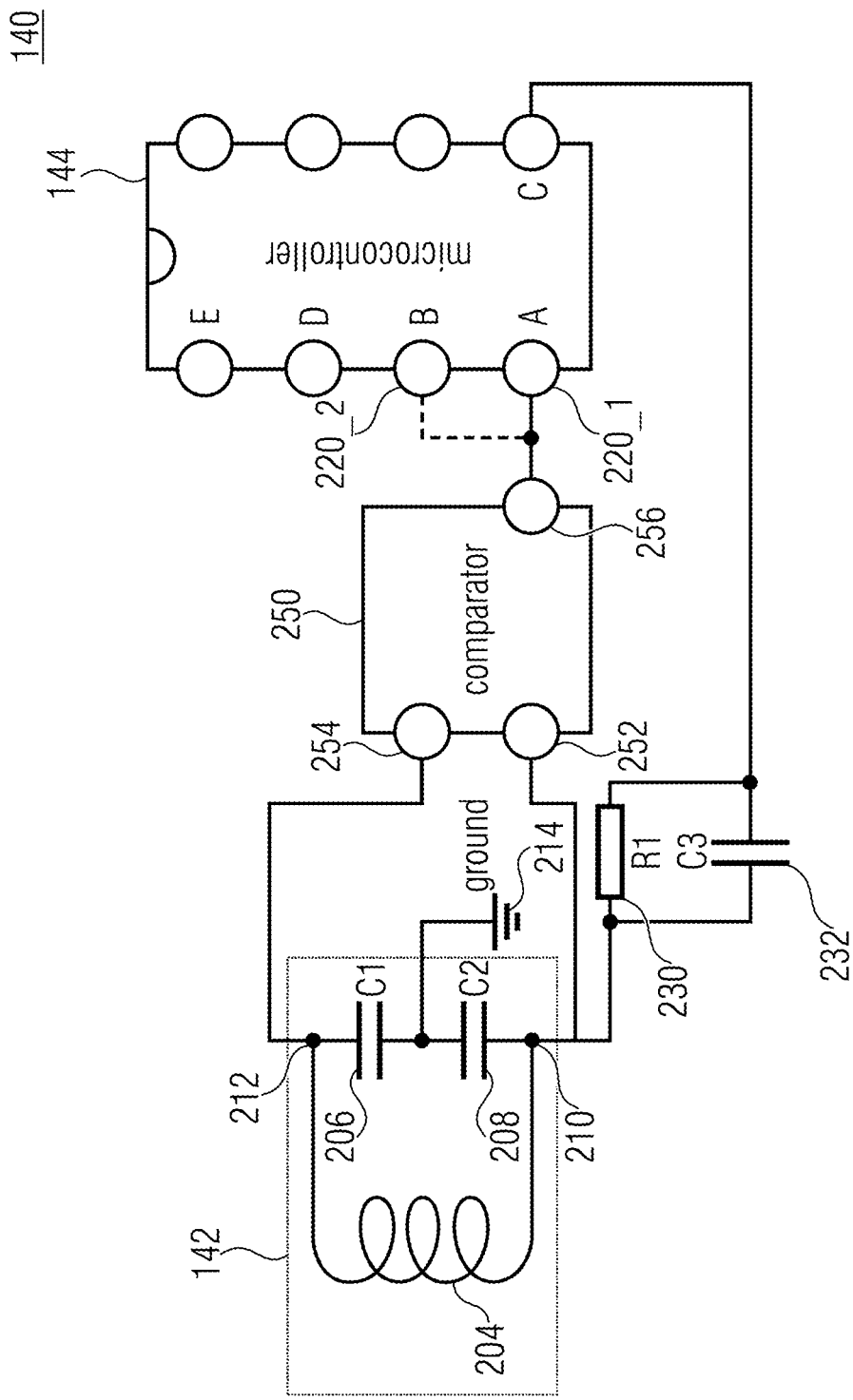
FIG. 16 shows a schematic block circuit diagram of the other device according to a further embodiment of the present invention.

FIG. 16 shows a schematic block circuit diagram of the other device 140 according to a further embodiment of the present invention. The other device 140 includes the microcontroller 144 and the configuration interface 200 with the electromagnetic resonant circuit 142.

The electromagnetic resonant circuit 142 may comprise a first coil 204 and two capacitors 206 and 208 connected in series (e.g. a first capacitor 206 (e.g. C1) and a second capacitor 208 (e.g. C2)). The first coil 204 and the two capacitors 206 and 208 connected in series may be connected in parallel between a first terminal 210 and a second terminal 212 of the electromagnetic resonant circuit 142. A terminal 211 between the two capacitors 206 and 208 connected in series (e.g. C1 and C2) may be connected to a reference potential terminal 214 (e.g. ground terminal).

The first terminal 210 of the electromagnetic resonant circuit 142 may be connected to a first input 252 of the comparator 250, whereas the second terminal 212 of the electromagnetic resonant circuit 142 may be connected to a second input 254 of the comparator 250. An output 256 of the comparator 250 may be connected to a first pin 220_1 (e.g. pin A) of the microcontroller 144.

Here, the microcontroller 144 may be configured to switch, responsive to an interrupt generated by the first pin 220_1 (e.g. pin A), from an energy-saving mode into the normal reception mode or wake-up mode (e.g. peeking mode).

For example, the microcontroller 144 may be configured to switch the first pin 220_1 (e.g. pin A) into a capture mode (e.g. recording mode; e.g. of a capture/compare module) in which the interrupt may also be generated with a signal at this pin 220_1. Alternatively, the output 256 of the comparator 250 may further be connected to a second pin 220_2 (e.g. pin B) of the microcontroller 144, wherein the microcontroller 144 may be configured to switch the second pin 220_2 (e.g. in the normal reception mode or in the wake-up mode) into a capture mode (e.g. recording mode; e.g. of a capture/compare module), wherein the first pin 220_1 may be used for triggering the interrupt.

As already mentioned, the electromagnetic resonant circuit should be advantageously tuned in the reception mode (or in the wake-up mode).

To this end, the electromagnetic resonant circuit 142 may be connected to a third pin 220_3 (e.g. pin C) of the microcontroller 144 via a parallel connection of a first resistor 230 (e.g. R1) and a third capacitor 232 (e.g. C3), wherein the microcontroller 144 may be configured to tune, in the normal reception mode and/or in the wake-up mode, the electromagnetic resonant circuit 142 by switching the third pin 220_3 (e.g. pin C) to one of the following different operating modes:

a high-impedance input mode, and an output mode in which a reference potential (e.g. ground) is provided at the respective pin.

Alternatively or additionally, the tuning capacitors 202_1 and 202_2 of section 1.2 may be used for tuning the electromagnetic resonant circuit 142, enabling tuning for the transmission mode and for the reception mode.

The microcontroller 144 may switch the third pin 220_3 (e.g. pin C) into a PWM output mode in order to generate a magnetic signal 132 with the electromagnetic resonant circuit 142.

In the energy-saving mode, the microcontroller 144 may switch the third pin 220_3 (e.g. pin C) to an output mode in which a supply potential (e.g. Vcc) or reference potential (e.g. ground) is provided at the respective pin.

In other words, FIG. 16 shows a circuit in which a comparator 250 is used at an interrupt pin (e.g. first pin 220_1 (e.g. pin A)).

Energy-efficient (up to 1 µA) comparators for the frequency range around 20 kHz are available.

The output 256 of the comparator 250 is applied to an interrupt pin (e.g. first pin 220_1 (e.g. pin A)) of the microcontroller (pin A is an interrupt pin in FIG. 16, pin A was a comparator input or a switch output in the previous figures).

If an alternating magnetic field near the resonance frequency of the electromagnetic resonant circuit 142 is present, the microcontroller 144 is woken up by an interrupt. In some microcontrollers 144, it is possible to generate an interrupt upon variations at the timer/capture input. If this is not possible, the timer/capture input (e.g. the second pin 220_2 (e.g. pin B)) may additionally be connected to the comparator output 256. Thus, the comparator 250 provides a wake-up signal and the signal decoded according to section 1.

Since it is not possible to tune the electromagnetic resonant circuit 142 via the voltage at the two capacitors 206 and 208 connected in series (e.g. C1 and C2) (cf. section 1.2) as the microcontroller 144 does not regularly wake-up and is not able to set the correct resonance frequency via the voltage at the two capacitors 206 and 208 (e.g. C1 and C2) connected in series, resonance frequency may be tuned via additional capacitors according to section 1.1.

Alternatively (or additionally), there is the possibility to set the third pin 220_3 (e.g. pin C) to Vcc in the energy-saving mode (output mode in which a supply potential is provided at the respective pin). This results in a higher resonance frequency. The wake-up signal used may be adapted accordingly so that it also contains higher spectral components. As described in section 1.2, after waking up, the microcontroller 144 may set the correct resonance frequency, and the data transmission may be carried out, as described in section 1. During the energy-saving mode (power-down), a higher resonance frequency may be used so that the wake-up signal does not have any interfering audible frequency portions, since it is possibly transmitted by a mobile telephone.

2.7 Return Channel via a Magnetic Field Sensor of the Mobile Telephone

A feedback from the other device 140 (e.g. sensor node) to the configuring device 120 is desired for many applications. A feedback may be done in a very cost-efficient and space-saving manner by generating one/several magnetic impulses via the coil of the electromagnetic resonant circuit 142. These magnetic impulses may be detected by the magnetic sensor of the compass conventionally built into mobile telephones. However, relatively large current strengths are needed for this.

Figure 17:
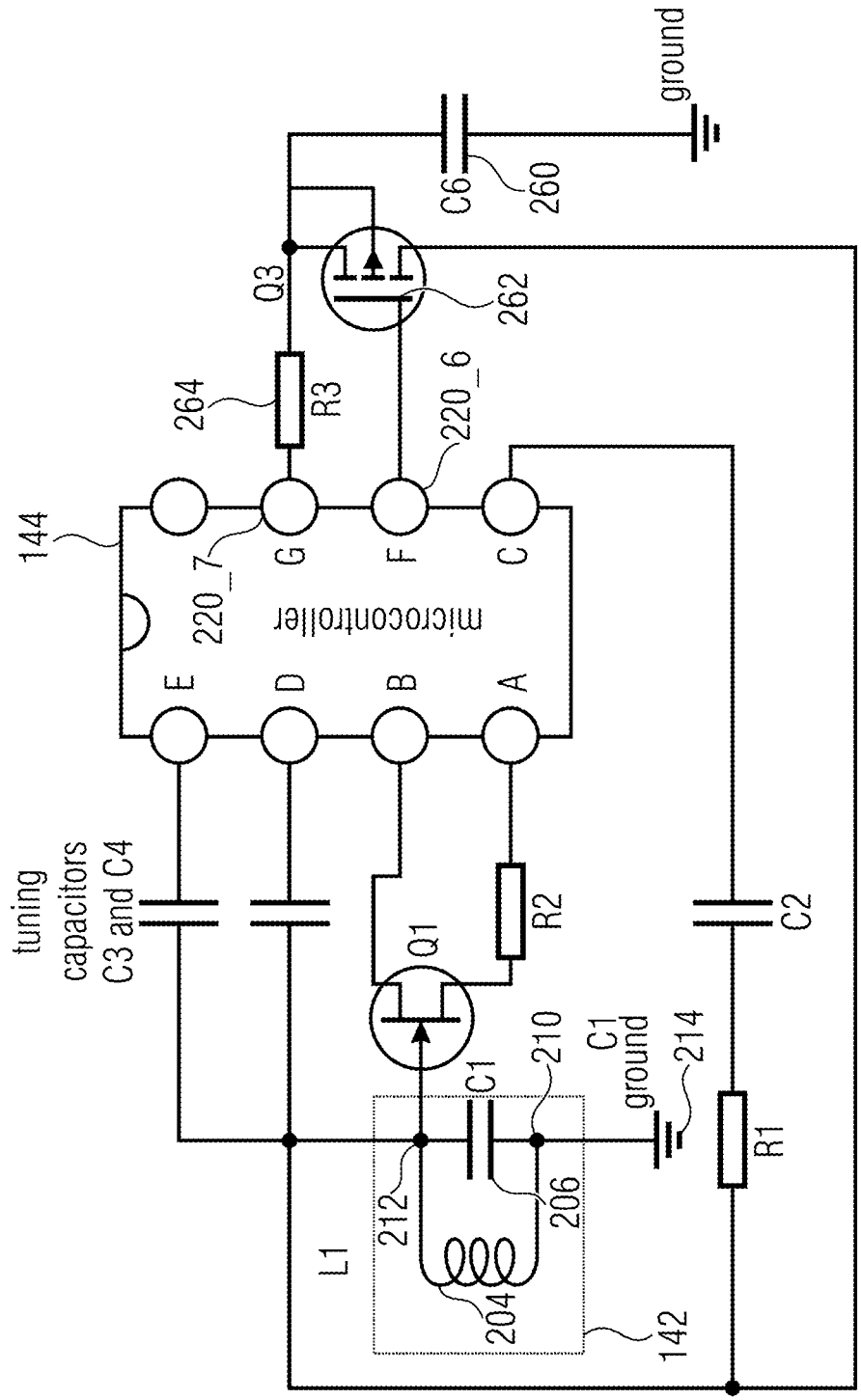
FIG. 17 shows a schematic block circuit diagram of the other device according to a further embodiment of the present invention.

FIG. 17 shows a schematic block circuit diagram of the other device 140 according to a further embodiment of the present invention. The other device 140 includes the microcontroller 144 and the configuration interface 200 with the electromagnetic resonant circuit 142.

The microcontroller 144 may be configured to generate a magnetic impulse with the electromagnetic resonant circuit 142 by discharging a sixth capacitor 260 (e.g. C6).

As can be seen in FIG. 17, the sixth capacitor 260 (e.g. C6) may be connected to the electromagnetic resonant circuit 142 via a controllable switch 262 (e.g. a transistor), wherein a sixth pin 220_6 (e.g. pin F) is connected to a control terminal of the controllable switch 262, wherein the microcontroller 144 may be configured to discharge the sixth capacitor 260 by switching the sixth pin 220_6 (e.g. pin F) from one operating mode to another operating mode (e.g. a pull-up input mode and an output mode in which a reference potential (e.g. ground) is provided at the respective pin). Furthermore, the microcontroller 144 may be configured to charge the sixth capacitor 260 by switching a seventh pin 220_7 (e.g. pin G), connected to the sixth capacitor 260, from one operating mode to another operating mode.

For example, the controllable switch 262 may be a field-effect transistor (e.g. MOSFET, p-channel MOSFET), wherein the fifth pin 220_5 (e.g. pin F) of the microcontroller 144 may be connected to a gate of the field effect transistor 262, wherein the sixth pin 220_6 (e.g. pin G) of the microcontroller 144 may be connected to a drain of the field effect transistor 262, wherein the drain of the field effect transistor 262 may be connected to the sixth capacitor 260 via a third resistor 264 (e.g. R3). The microcontroller 144 may be configured to charge the sixth capacitor 260 by switching the seventh pin 220_7 (e.g. pin G), connected to the sixth capacitor, to an output mode in which a supply potential (e.g. Vcc) is provided at the respective pin, and to discharge the sixth capacitor 260 by switching the sixth pin 220_6 (e.g. pin F) from a pull-up input mode into an output mode in which a reference potential (e.g. round) is provided at the respective pin.

In other words, FIG. 17 shows a circuit for generating magnetic impulses with a coil of the electromagnetic resonant circuit 142. The relevant components of the third resistor 264 (e.g. R3), the field effect transistor 262 (e.g. Q3), the sixth capacitor 260 (e.g. C6) and the first coil 204 (e.g. L1) of the electromagnetic resonant circuit. The remaining circuit is exemplarily taken from section 1.4 and may also be replaced by the ones in the sections 1.1 to 1.3 and 1.6.

The sixth capacitor 260 (e.g. C6) is typically a tantalum or electrolyte capacitor in the range of several hundred microfarads. These capacitors usually have a high leakage current. If they are permanently connected to the operating voltage, the idle current consumption of the circuit is massively increased. This problem may be solved by the method described in the following. The sixth capacitor 260 (e.g. C6) is charged via the third resistor 264 (e.g. R3) just shortly (in the range of seconds) before a magnetic impulse is to be transmitted, by the microcontroller setting the seventh pin 220_7 (e.g. pin G) to Vcc. Otherwise, the seventh pin 220_7 (e.g. pin G) is switched to ground or to be of high-impedance.

In order to transmit the magnetic impulse, the sixth pin 220_6 (e.g. pin F) connected to the gate of the field effect transistor 262 (e.g. Q3) is switched by the microcontroller 144 from a pull-up input mode to an output mode in which a ground potential is provided. For this reason, the field effect transistor 262 (e.g. Q3) is discharged by the first coil 204 (L1) and generates a magnetic impulse.

Data may be transmitted by the presence of an impulse, the time at which the impulse arises, the magnetic polarity of the pulse or the sequence of several impulses as well as their polarities.

In embodiments, the sixth capacitor 260 (e.g. C6) may be charged just shortly before generating the magnetic impulse.

In embodiments, a magnetic impulse may be generated by discharging a capacitor in order to transmit information.

In embodiments, a magnetic sensor may be used for the data transfer.

3. Further Embodiments

FIG. 18 shows a flow diagram of a method 300 for tuning an electromagnetic resonant circuit of a configuration interface of a participant of a communication system, wherein the electromagnetic resonant circuit is configured to detect and/or to generate a magnetic signal comprising data to be transmitted to and/or from the participant, wherein the electromagnetic resonant circuit is connected to a microcontroller of the participant, wherein the microcontroller is connected to at least one tuning element for tuning the electromagnetic resonant circuit. The method 300 includes a step 302 of tuning the electromagnetic resonant circuit by switching at least one pin of the microcontroller, with which the at least one tuning element is connected, to one of several different operating modes.

FIG. 19 shows a flow diagram of a method 310 for operating an electromagnetic resonant circuit of a configuration interface of a participant of a communication system, wherein the electromagnetic resonant circuit is configured to detect and/or to generate a magnetic signal comprising data to be transmitted to and/or from the participant, wherein the electromagnetic resonant circuit is connected to a microcontroller of the participant, wherein the electromagnetic resonant circuit is connected in series between a first pin and a second pin of the microcontroller, wherein the electromagnetic resonant circuit is further connected to a third pin of the microcontroller, wherein the electromagnetic resonant circuit comprises two capacitors connected in series, wherein a terminal between the two capacitors connected in series is connected to a reference potential terminal. The method 310 includes a step 312 of charging the two capacitors connected in series prior to generating a magnetic signal with the electromagnetic resonant circuit by:
  switching the third pin, for a defined charging time $T_L$, to an output mode in which a supply potential is provided at the respective pin, and
  switching the third pin, after the defined charging time $T_L$, to a high-impedance input mode.

FIG. 20 shows a flow diagram of a method 320 for operating an electromagnetic resonant circuit of a configuration interface of a participant of a communication system, wherein the electromagnetic resonant circuit is configured to detect and/or to generate a magnetic signal comprising data to be transmitted to and/or from the participant, wherein the electromagnetic resonant circuit is connected to a microcontroller of the participant, wherein a first terminal of the electromagnetic resonant circuit is switched to a reference potential, wherein a second terminal of the electromagnetic resonant circuit is connected to a gate of a transistor connected to the microcontroller, wherein a drain terminal of the transistor is directly connected to a second pin of the microcontroller. The method 320 includes a step of switching the second pin of the microcontroller to a pull-up input mode only in active phases of a wake-up mode which checks whether a magnetic signal with a wake-up sequence is received.

Even though some aspects have been described within the context of a device, it is understood that said aspects also represent a description of the corresponding method, so that a block or a structural component of a device is also to be understood as a corresponding method step or as a feature of a method step. By analogy therewith, aspects that have been described within the context of or as a method step also represent a description of a corresponding block or detail or feature of a corresponding device. Some or all of the method steps may be performed while using a hardware device, such as a microprocessor, a programmable computer or an electronic circuit. In some embodiments, some or several of the most important method steps may be performed by such a device.

Depending on specific implementation requirements, embodiments of the invention may be implemented in hardware or in software. Implementation may be effected while using a digital storage medium, for example a floppy disc, a DVD, a Blu-ray disc, a CD, a ROM, a PROM, an EPROM, an EEPROM or a FLASH memory, a hard disc or any other magnetic or optical memory which has electronically readable control signals stored thereon which may cooperate, or cooperate, with a programmable computer system such that the respective method is performed. This is why the digital storage medium may be computer-readable.

Some embodiments in accordance with the invention thus comprise a data carrier which comprises electronically readable control signals that are capable of cooperating with a programmable computer system such that any of the methods described herein is performed.

Generally, embodiments of the present invention may be implemented as a computer program product having a program code, the program code being effective to perform any of the methods when the computer program product runs on a computer.

The program code may also be stored on a machine-readable carrier, for example.

Other embodiments include the computer program for performing any of the methods described herein, said computer program being stored on a machine-readable carrier.

In other words, an embodiment of the inventive method thus is a computer program which has a program code for performing any of the methods described herein, when the computer program runs on a computer.

A further embodiment of the inventive methods thus is a data carrier (or a digital storage medium or a computer-readable medium) on which the computer program for performing any of the methods described herein is recorded. The data carrier, the digital storage medium, or the recorded medium are typically tangible, or non-volatile.

A further embodiment of the inventive method thus is a data stream or a sequence of signals representing the computer program for performing any of the methods described herein. The data stream or the sequence of signals may be configured, for example, to be transmitted via a data communication link, for example via the internet.

A further embodiment includes a processing unit, for example a computer or a programmable logic device, configured or adapted to perform any of the methods described herein.

A further embodiment includes a computer on which the computer program for performing any of the methods described herein is installed.

A further embodiment in accordance with the invention includes a device or a system configured to transmit a computer program for performing at least one of the methods described herein to a receiver. The transmission may be electronic or optical, for example. The receiver may be a computer, a mobile device, a memory device or a similar device, for example. The device or the system may include a file server for transmitting the computer program to the receiver, for example.

In some embodiments, a programmable logic device (for example a field-programmable gate array, an FPGA) may be used for performing some or all of the functionalities of the methods described herein. In some embodiments, a field-programmable gate array may cooperate with a microprocessor to perform any of the methods described herein. Generally, the methods are performed, in some embodiments, by any hardware device. Said hardware device may be any universally applicable hardware such as a computer processor (CPU), or may be a hardware specific to the method, such as an ASIC.

For example, the apparatuses described herein may be implemented using a hardware device, or using a computer, or using a combination of a hardware device and a computer.

The apparatuses described herein, or any components of the apparatuses described herein, may at least be partially implement in hardware and/or software (computer program).

For example, the methods described herein may be implemented using a hardware device, or using a computer, or using a combination of a hardware device and a computer.

The methods described herein, or any components of the methods described herein, may at least be partially implement by performed and/or software (computer program).

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

BIBLIOGRAPHY

[1] U.S. Pat. No. 2,381,097 A
[2] U.S. Pat. No. 4,415,769 A
[3] U.S. Pat. No. 3,764,746 A
[4] Optimalfilter, https://de.wikipedia.org/wiki/Optimalfilter, last accessed: Apr. 11, 2019
[5] Schwingkreis, https://elektroniktutor.de/analogtechnik/par_swkr.html, last accessed: Apr. 16, 2019
[6] (G)MSK-Spektrum, https://en.wikipedia.org/wiki/Minimum-shift_keying#/media/File:GMSK_PSD.png, last accessed: Apr. 16, 2019
[7] Pulsdauermodulation, https://de.wikipedia.org/wiki/Pulsdauermodulation, last accessed: Apr. 16, 2019
[8] UART-Kommunikation, https://de.wikipedia.org/wiki/Universal_Asynchronous_Receiver_Transmitter, last accessed: Apr. 17, 2019
[9] ETSI TS 103 357
[10] IEEE 802.15.4w
[11] Datenblatt 2SK3230
[12] https://de.wikipedia.org/wiki/Kapazit%C3%A4tsdiode
[13] https://fahrplan.events.ccc.de/camp/2015/Fahrplan/system/attachments/2671/original/Mythen_der_Elektronikentwicklung_v2.pdf
[14] https://www.analog-praxis.de/fallstricke-beim-einsatz-von-mlccs-a-535573/
[15] https://www.digikey.com/en/articles/techzone/2012/apr/protecting-inputs-in-digital-electronics

The invention claimed is:

1. A method for transferring data from a device to another device, the method comprising:
generating a magnetic signal with an electromagnetic functional unit, wherein the electromagnetic functional unit is an actuator of a loudspeaker of the device or wherein the electromagnetic functional unit is an electromagnetic resonant circuit connected to the device, wherein the magnetic signal carries the data to be transferred from the device to the other device,
detecting the magnetic signal with an electromagnetic resonant circuit of the other device in order to acquire the data to be transferred from the device to the other device,
wherein the magnetic signal is FSK-modulated,
wherein a resonance frequency of the electromagnetic resonant circuit of the other device and a carrier frequency of the FSK-modulated magnetic signal are tuned with respect to each other,
wherein the electromagnetic resonant circuit of the other device is an LC resonant circuit,
wherein a data rate of the FSK-modulated magnet signal is smaller than or equal to a bandwidth between an upper and a lower cut-off frequency of the frequency response of the electromagnetic resonant circuit of the other device.

2. The method according to claim 1, wherein a data rate of the FSK-modulated magnetic signal is adapted to a frequency response of the electromagnetic resonant circuit of the other device.

3. The method according to claim 1,
wherein the magnetic signal is a first magnetic signal,
wherein the method comprises generating a modulated square-wave signal for driving the electromagnetic resonant circuit of the other device, wherein the modulated square-wave signal is generated depending on the data to be transferred from the other device to the device,
wherein the method further comprises driving the electromagnetic resonant circuit of the other device with the modulated square-wave signal in order to generate, by means of the electromagnetic resonant circuit of the other device, a second magnetic signal carrying the data to be transferred from the other device to the device,
wherein the resonance frequency of the electromagnetic resonant circuit of the other device and a carrier frequency of the modulated square-wave signal are tuned with respect to each other,
wherein the method further comprises detecting the second magnetic signal with the electromagnetic functional unit of the device in order to acquire the data to be transferred from the other device to the device.

4. The method according to claim 3,
wherein the resonance frequency of the electromagnetic resonant circuit of the other device and a carrier frequency of the modulated square-wave signal are tuned with respect to each other so that, by means of the electromagnetic resonant circuit of the other device, the modulated square-wave signal is converted into a magnetic signal with a FSK-comparable modulation.

5. The method according to claim 1,
wherein the magnetic signal is a first magnetic signal,
wherein the first magnetic signal comprises a wake-up sequence preceding a transfer of the data to be transferred from the device to the other device,
wherein the other device is switchable between different operation modes, wherein the operation modes comprise an energy-saving mode and a reception mode,
wherein the other device switches from the energy-saving mode into the reception mode in specified time intervals in order to identify a transfer of the wake-up sequence,
wherein the data to be transferred from the device to the other device is received by the other device as a response to the identification of the wake-up sequence,
wherein the other device still remains in the reception mode for a defined time span after the reception of the data to be transferred from the device to the other device in order to be able to receive further data to be transferred from the device to the other device.

6. A device, comprising:
a signal generator configured to generate a FSK-modulated signal for driving an electromagnetic functional unit, wherein the electromagnetic functional unit is an actuator of a loudspeaker of the device or wherein the electromagnetic functional unit is an electromagnetic resonant circuit connected to the device, wherein the signal generator is configured to drive the electromagnetic functional unit with the FSK-modulated signal in order to generate, by means of the electromagnetic functional unit, a magnetic signal carrying data to be transferred from the device to the other device, wherein a carrier frequency of the FSK-modulated signal is tuned to a resonance frequency of an electromagnetic resonant circuit with which the other device detects the magnetic signal, wherein the electromagnetic resonant circuit of the other device is an LC resonant circuit, wherein a data rate of the FSK-modulated signal is smaller than or equal to a bandwidth between an upper and a lower cut-off frequency of the frequency response of the electromagnetic resonant circuit of the other device.

7. The device according to claim 6, wherein the magnetic signal is a first magnetic signal, wherein the electromagnetic functional unit is configured to detect a second magnetic signal carrying data to be transferred from the other device to the device, wherein the device is configured to evaluate a signal provided by the electromagnetic functional unit and dependent on the detected second magnetic signal in order to acquire the data to be transferred from the other device to the device which the second magnetic signal carries.

8. The device according to claim 7, wherein the electromagnetic functional unit comprises the electromagnetic resonant circuit, wherein the second magnetic signal is FSK-modulated, wherein a resonance frequency of the electromagnetic resonant circuit connected to the device and the carrier frequency of the FSK-modulated second magnetic signal are tuned with respect to each other so that the electromagnetic resonant circuit acts like a reception filter or a matched filter.

* * * * *